(12) United States Patent
Michihata et al.

(10) Patent No.: US 10,308,727 B2
(45) Date of Patent: Jun. 4, 2019

(54) MYOGLOBIN-CONTAINING FOOD FRESHNESS DETERIORATION SUPPRESSING MATERIAL AND USE THEREOF

(71) Applicant: SEKISUI PLASTICS CO., LTD., Osaka (JP)

(72) Inventors: Naoki Michihata, Nara (JP); Shinji Ishida, Shiga (JP); Takenori Terada, Shiga (JP); Atsushi Takahara, Shiga (JP); Masahiko Ariji, Wakayama (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 195 days.

(21) Appl. No.: 15/314,603

(22) PCT Filed: May 27, 2015

(86) PCT No.: PCT/JP2015/065961
§ 371 (c)(1),
(2) Date: Nov. 29, 2016

(87) PCT Pub. No.: WO2015/182791
PCT Pub. Date: Dec. 3, 2015

(65) Prior Publication Data
US 2017/0190804 A1 Jul. 6, 2017

(30) Foreign Application Priority Data
May 30, 2014 (JP) .................. 2014-113518

(51) Int. Cl.
| | | |
|---|---|---|
| *C08C 1/04* | (2006.01) | |
| *A23L 3/3481* | (2006.01) | |
| *A23L 3/3508* | (2006.01) | |
| *A23L 3/3544* | (2006.01) | |
| *A23B 4/00* | (2006.01) | |
| *A23B 4/12* | (2006.01) | |
| *A23B 4/14* | (2006.01) | |
| *B32B 27/18* | (2006.01) | |
| *B65D 85/50* | (2006.01) | |
| *A23L 13/00* | (2016.01) | |
| *A23L 17/00* | (2016.01) | |
| *C08C 2/02* | (2006.01) | |
| *C08C 2/06* | (2006.01) | |
| *C08C 3/02* | (2006.01) | |
| *C08G 83/00* | (2006.01) | |
| *C08L 97/02* | (2006.01) | |

(52) U.S. Cl.
CPC .................. *C08C 1/04* (2013.01); *A23B 4/00* (2013.01); *A23B 4/12* (2013.01); *A23B 4/14* (2013.01); *A23L 3/3481* (2013.01); *A23L 3/3508* (2013.01); *A23L 3/3544* (2013.01); *A23L 13/00* (2016.08); *A23L 17/00* (2016.08); *B32B 27/18* (2013.01); *B65D 85/50* (2013.01); *C08C 2/02* (2013.01); *C08C 2/06* (2013.01); *C08C 3/02* (2013.01); *C08G 83/00* (2013.01); *C08L 97/02* (2013.01); *C08L 2205/03* (2013.01)

(58) Field of Classification Search
CPC .... C08C 1/04; C08C 3/02; C08C 2/02; C08C 2/06; C08L 97/02; C08L 2205/03; C08G 83/00
USPC ......................................................... 524/575
See application file for complete search history.

(56) References Cited

U.S. PATENT DOCUMENTS

| | | | | |
|---|---|---|---|---|
| 2007/0014953 | A1* | 1/2007 | Siegel ...................... | A23B 4/14 428/35.7 |
| 2008/0044540 | A1 | 2/2008 | Kido | |

FOREIGN PATENT DOCUMENTS

| | | |
|---|---|---|
| CN | 1930269 A | 3/2007 |
| JP | 05-130829 | 5/1993 |
| JP | 07-135895 A | 5/1995 |
| JP | 07-135896 A | 5/1995 |
| JP | 11-266792 A | 10/1999 |
| JP | 11-332535 | 12/1999 |
| JP | 2000-110099 A | 4/2000 |
| JP | 2000110099 A * | 4/2000 |
| JP | 2002-249770 | 9/2002 |
| JP | 2002-345397 A | 12/2002 |
| JP | 2003-093016 A | 4/2003 |
| JP | 2004-173579 A | 6/2004 |
| JP | 2004173579 A * | 6/2004 |

(Continued)

OTHER PUBLICATIONS

Moore et al., Journal of Food Science, vol. 68, No. 1, 99-104, 2003. (Year: 2003).*

(Continued)

*Primary Examiner* — Hui H Chin
(74) *Attorney, Agent, or Firm* — Greenblum & Bernstein, P.L.C.

(57) ABSTRACT

An object of the present invention is to provide a simple measure which can suppress freshness deterioration of a myoglobin-containing food. The present invention relates to a myoglobin-containing food freshness deterioration suppressing material for suppressing freshness deterioration of a myoglobin-containing food, comprising: a substrate comprising a polymer; and an antioxidant with which at least a part of the surface of the substrate is covered, and/or an antioxidant supported in a layer forming at least a part of the surface of the substrate; wherein 0.01 g/m² or more and 20 g/m² or less of the antioxidant is included relative to the area of the part in which the antioxidant is present, of the surface of the substrate.

38 Claims, 22 Drawing Sheets
(6 of 22 Drawing Sheet(s) Filed in Color)

(56) References Cited

FOREIGN PATENT DOCUMENTS

| | | | |
|---|---|---|---|
| JP | 2005-298816 A | | 10/2005 |
| JP | 2006-025681 | | 2/2006 |
| JP | 2006-212004 A | | 8/2006 |
| JP | 2006-345797 A | | 12/2006 |
| JP | 2008-007203 A | | 1/2008 |
| JP | 2009-029491 A | | 2/2009 |
| JP | 2009029491 A | * | 2/2009 |
| JP | 2009-232864 A | | 10/2009 |
| JP | 4391029 B2 | | 12/2009 |
| JP | 2011-030490 A | | 2/2011 |
| JP | 2011-206042 A | | 10/2011 |
| JP | 2012-196181 A | | 10/2012 |
| WO | 2005/097486 A1 | | 10/2005 |

OTHER PUBLICATIONS

Noriyuki Ishihara et al., "Suppressive Effect of Green Tea Polyphenols on Oxidation in Yellowtail (*Seriola quinqueradiata*) Meat during Round Iced Storage", Journal of the Japanese Society for Food Science and Technology, Oct. 2000, pp. 767-772, vol. 47, No. 10.

Moore et al., "Effects of Antioxidants in Polyethylene Film on Fresh Beef Color", Journal of Food Science, 2003, pp. 99-104, vol. 68, No. 1.

"Visual Observation of Fish Freshness-Commitment to Palatability and Safety-, edited by Etsuo Watanabe et al., First Edition Published by Seizando-Shoten Publishing Co., Ltd.", Dec. 18, 2007, pp. 46-55.

Nerin et al., "Stabilization of Beef Meat by a New Active Packaging Containing Natural Antioxidants", J. Agric. Food Chem., 2006, pp. 7840-7846, vol. 54, No. 20.

International Search Report issued with respect to Application No. PCT/JP2015/065961, dated Aug. 8, 2015.

International Preliminary Report on Patentability issued with respect to Application No. PCT/JP2015/065961, dated Dec. 6, 2016.

Taiwanese Office Action and Search Report in respect to Taiwanese Application No. 104117284, dated Mar. 13, 2018.

Japanese Notification of Observations Submitted by Third Parties with respect to Japanese Application No. 2016-523608, dated Jun. 20, 2018.

Japanese Notification of Observations Submitted by Third Parties with respect to Japanese Application No. 2016-523608, dated Oct. 31, 2017.

* cited by examiner

MYOGLOBIN-CONTAINING FOOD FRESHNESS DETERIORATION SUPPRESSING MATERIAL AND USE THEREOF

TECHNICAL FIELD

The present invention relates to a myoglobin-containing food freshness deterioration suppressing material for suppressing discoloration, offensive odor, deterioration in texture, and deterioration in freshness, such as the amount of drip, of a myoglobin-containing food, a food package comprising the same, and a method for preserving or transporting the food package.

The present invention also relates to a myoglobin-containing food discoloration suppressing material for suppressing discoloration of a myoglobin-containing food, a food package comprising the same, and a method for preserving or transporting the food package.

BACKGROUND ART

The market of fishery products in Japan has recently been on a declining trend due to population decline and the change in food culture. Japanese foods, such as sushi and slices of raw fish (sashimi), however, are spread in the world, and an increase in demand for luxury foodstuffs due to an increase in purchasing power in Asian countries and other areas is expected. In order to transport Japanese fishery products overseas, a transport technique and a freshness retention technique are required.

Fishes with high-fat flesh, typified by salmon, are abundantly consumed outside Japan. In addition, fishes with light-taste and high-lipid flesh are relatively less inhabited outside Japan, and freshwater fishes with such flesh may be consumed, but saltwater fishes with such flesh are less consumed.

On the other hand, fishes with light-taste and high-lipid flesh are abundantly inhabited in Japanese coastal waters, and for example, fishes belonging to the family Carangidae are abundantly inhabited. A representative example thereof is yellowtail. Yellowtail is currently actively aquacultured in Japan (including Ehime Prefecture, Kagoshima Prefecture, and other areas). Therefore, yellowtail is fish species suitable for exporting abroad.

The quality of fish meat is generally evaluated based on appearances (including color and shape), taste, texture, and other features. In particular, the quality of fish meat is evaluated in general retailers, with focusing on appearances easily evaluated. The quality of fish meat is thus usually evaluated by appearances, such as color and shape. The reason is because a labor time is required and it is not easy to confirm taste and texture with respect to each fish meat in order to confirm the freshness of fish meat to be sold in shopfronts. In addition, fish purchasers also often select a commercial product in shopfronts based on the color of the cross section of a slice of fish.

Meanwhile, when fish meat comprises dark colored flesh, like meat of yellowtail, a protein called myoglobin is present in the muscle of fish meat. Myoglobin is a main component constituting the dark colored flesh of fish meat. Since myoglobin is higher in affinity with an oxygen molecule than hemoglobin in blood, myoglobin receives oxygen in blood and releases it in metabolism, in vivo. The oxidation-reduction mechanism of myoglobin is thus constructed in vivo, making it possible to maintain ecological activity.

Normal myoglobin contains a divalent iron ion ($Fe^{2+}$) in home. An oxygen molecule coordinates thereto to thereby provide oxymyoglobin, and oxymyoglobin is further oxidized to provide metmyoglobin having a trivalent iron ion ($Fe^{3+}$). Since metmyoglobin is reduced by the enzyme action in fish, in vivo, to provide normal myoglobin containing $Fe^{2+}$, no metmyoglobin is accumulated therein. After the death of fish, however, a mechanism of donating and receiving of oxygen (oxidation-reduction reaction) is lost to cause the reduction action to be lost. That is, progression of the oxidation reaction (receiving of oxygen) is rapidly increased. Such progression of oxidation is generally referred to as "metmyoglobin formation" (auto-oxidation of myoglobin).

As such metmyoglobin formation progresses, the dark colored flesh in fish meat is changed in color from bright red to brown or gray, causing appearances of fish meat to remarkably deteriorate.

In addition, almost no metmyoglobin formation progresses under a temperature condition of −30° C. or lower. When fish meat including dark colored flesh, such as meat of yellowtail, is transported and/or preserved for a long time in Japan, it is distributed in a low-temperature distribution system (cold chain) by which a temperature of −30° C. or lower can be kept. Only a fresh food which can be distributed in a short time is transported under refrigeration (4° C.).

Cold chains used outside Japan are usually a distribution system at a temperature of −20°. The reason is because distribution of livestock meat accounts for the majority of the distribution outside Japan and such a distribution system sufficiently functions at −20° C. Such cold chains kept at a temperature of −2.0° C. can hardly suppress metmyoglobin formation in fish meat.

It is not easy to introduce cold chains allowing fish meat to be distributed at −30° C. or lower in such countries where they have not been introduced.

One measure for suppressing deterioration in appearances of fish meat where metmyoglobin formation easily occurs, in transport of such fish meat by the cold chain at −20° C. or higher, comprises transporting fish meat with the atmosphere in a packaging container being replaced with CO (carbon monoxide) gas when packaging the fish meat. CO can more strongly coordinate to myoglobin than oxygen. Thus, oxidation is suppressed and myoglobin (carboxymyoglobin) to which CO coordinates displays a bright red color.

Fish meat having myoglobin, however, when treated with CO, is kept red even after a long lapse of time after the treatment and does not deteriorate in appearance, and therefore causes consumers to misidentify such fish meat as fresh fish meat and can also cause food poisoning to occur. Therefore, the treatment of fish meat with CO has been prohibited under the Food Sanitation Act in 1994 in Japan. The treatment is also prohibited currently in Europe, and is also scheduled to be prohibited in USA. In addition, destruction of cells is also caused in such fish meat, and therefore such fish meat deteriorates in freshness while looking (color) thereof being fresh.

As described above, color is important as a discrimination index of freshness of a myoglobin-containing food, such as fish meat. The freshness of a myoglobin-containing food, however, needs to be evaluated comprehensively in terms of not only color, but also form, texture, odor, the amount of drip, K-value described later, and other viewpoints.

The K-value is known as an index for evaluation of freshness deterioration of a myoglobin-containing food, such as fish meat, by an objective numerical. Adenosine triphosphate (ATP) as an energy source is present in fish meat and such a substance is rapidly decreased by an enzyme action in the muscle after the death of fish to be thereby sequentially decomposed to adenosine diphosphate (ADP), adenosine monophosphate (AMP), and inosinic acid (IMP) (an umami component), and further decomposition progresses to allow inosine (HxR) and hypoxanthine (Hx) to accumulate. ATP, ADP, AMP and IMP are more accumulated in fresh fish. HxR and Hx are more accumulated in unfresh fish. The K-value refers to the value expressed in percentage of the total amount of inosine and hypoxanthine in the total amount of ATP-related compounds, as represented by (Formula A) proposed by Tsuneyuki Saito (professor emeritus at the University of Hokkaido) in 1959 (Non Patent Literature 2). The K-value represents the following numerical values: 10% or less in fish just after death, approximately 20% in slices of raw fish, and about 60% at initial decay. The rate of decrease in freshness, which can be evaluated based on such values, differs depending on the type of fish, and, in general, is high in the case of codfish and low in the case of white fish, such as porgy and flatfish.

$$K\text{-value }(\%)=HxR+Hx/[ATP+ADP+AMP+IMP+HxR+Hx]\times 100 \quad\quad (A)$$

Preventing oxidation of fish meat is required to prevent discoloration and freshness deterioration of fish meat comprising myoglobin. Conventional methods for preventing oxidation of fish meat without any CO treatment are roughly classified to two methods: (1) avoiding oxygen and fish meat from being in contact with each other; and (2) preventing oxidation of fish meat.

A representative method as the method (1) includes vacuum packing fish meat. It is, however, difficult to completely expel oxygen from fish meat. Expelling oxygen excessively can cause fish meat to be compressed and collapsed by atmospheric pressure. In addition, only vacuum packing can highly likely cause oxygen to enter into a pack through a sealing portion due to impact in distribution and/or long-term distribution.

Examples of the method (2) include:
(2-1) immersing fish meat in an antioxidant solution,
(2-2) mixing fish meat and an antioxidant,
(2-3) freezing fish meat in a specified condition,
(2-4) packaging fish meat by a film containing a chemical agent which supplies an agent acting as a ligand for myoglobin, and
(2-5) providing a fish feed having an antioxidative action to live fish.

The following methods are known as the method (2-1). Patent Literature 1 discloses immersing fish meat in a hinokitiol solution. Patent Literature 2 discloses immersing fish meat in a solution containing hinokitiol and one of kojic acid, ascorbic acid and sodium ascorbate. Patent Literature 3 discloses immersing fish meat in a solution containing trehalose and sodium carbonate or potassium carbonate. Patent Literature 5 discloses a color fading and/or discoloration preventing agent of fish meat, comprising ascorbic acid or sodium ascorbate, ferulic acid and a pH adjuster. Patent Literature 5 discloses a method of immersing fish meat in an aqueous solution of the color fading and/or discoloration preventing agent, and a method of directly adding the color fading and/or discoloration preventing agent to fish meat. Patent Literature 11 discloses immersing chicken in seawater containing a solution of rosemary extracted with warm water. Patent Literature 13 discloses immersing beef cut in an aqueous rosemary solution (rosmarinic acid, carnosic acid, carnosol).

The following methods are known as the method (2-2). Patent Literatures 1 and 2 disclose compounding of an antioxidant, such as hinokitiol, to mince of fish meat. Patent Literature 4 discloses compounding of an antioxidant (reductant), such as ascorbic acid and erythorbic acid, to mince obtained by pulverizing tuna flesh. Patent Literature 5 discloses direct addition of the color fading and/or discoloration preventing agent of fish meat, comprising ascorbic acid or sodium ascorbate, ferulic acid and a pH adjuster, to mince of fish meat. Patent Literatures 9 and 10 disclose, as a reference example, immersing of fish meat cut into dice in an aqueous rosemary extract solution. Patent Literature 12 discloses addition of ascorbic acids to mince of tuna flesh.

The following methods are known as the method (2-3). Patent Literature 6 discloses quickly freezing fish meat at a temperature of $-30°$ C.' or lower ($-50°$ C. in Examples) to thereby suppress discoloration of fish meat.

The following methods are known as the method (2-4). Patent Literature 7 discloses a food packaging article for suppression of discoloration of a myoglobin-containing food. The food packaging article comprises a food contact layer containing a myoglobin blooming agent, and an oxygen barrier layer. The myoglobin blooming agent is defined in Patent Literature 7 to mean any agent (or precursor thereof) that binds to or interacts with any undenatured myoglobin-containing structure (including, but not limited to, deoxymyoglobin, oxymyoglobin, metmyoglobin, carboxymyoglobin, and nitric oxide myoglobin) present in a fresh meat product to produce or preserve a desired color, such as a red color, indicative of fresh meat. The myoglobin blooming agent includes a nitric oxide-donating compound, a nitrogen heterocycle, a carbon monoxide-donating compound, a sulfur monoxide-donating compound, a nitrous oxide ($N_2O$)-donating compound, an ammonia ($NH_3$)-donating compound and a hydrogen sulfide-donating compound. In Patent Literature 7, it is considered that nitric oxide, a nitrogen heterocycle, carbon monoxide, nitrous oxide ($N_2O$), ammonia or hydrogen sulfide donated by such a myoglobin blooming agent can act as a ligand for myoglobin to maintain the color of myoglobin in fresh meat. Furthermore, Patent Literature 8 corresponds to the International Patent Application whose applicant is the same as that of Patent Literature 7, and discloses a food packaging film comprising a food contact layer containing a nitric oxide-containing compound, and an oxygen barrier layer. Patent Literature 8 discloses, as in Patent Literature 7, a technique where a packaging film compound containing nitrogen oxide interacting as a ligand for myoglobin, such as nitrite, is brought into contact with a myoglobin-containing food to thereby produce a color desirable for the myoglobin-containing food. Patent Literature 8 suggests that a rosemary extract can strengthen the action of the compound containing nitrogen oxide.

As the method (2-5), Non Patent Literature 1 reports that metmyoglobin formation hardly occurs in fish meat taken from young yellowtails to which 0.02% of a tea powder or a food containing 0.02% of a tea powder has been given over about one month. Patent Literatures 9 and 10 also teaches that specified feed given to fish can suppress the change in color tone of fish meat processed to slices of raw fish.

Patent Literature 14 discloses effectiveness of rosmarinic acid contained in a rosemary extract and other compounds, as a deterioration preventing agent for food other products. The literature also discloses a plastic product containing the deterioration preventing agent. Examples of the plastic product include a food packaging material. The proportion of the deterioration preventing agent to be used in the plastic product, however, is merely described to be in a very wide range from 0.0005 to 5% by weight even as the most specific range, and no specific embodiment is described.

CITATION LIST

Patent Literatures

Patent Literature 1: JP Patent Publication (Kokai) No. 7-135895 (1995)
Patent Literature 2: JP Patent Publication (Kokoku) No. 7-135896 (1995)
Patent Literature 3: JP Patent No. 4391029
Patent Literature 4: JP Patent Publication (Kokai) No. 2006-212004
Patent Literature 5: JP Patent Publication (Kokai) No. 2011-206042
Patent Literature 6: JP Patent Publication (Kokai) No. 2012-196181
Patent Literature 7: JP Patent Publication (Kokai) No. 2008-7203
Patent Literature 8: international Publication No. WO2005/097486
Patent Literature 9: JP Patent Publication (Kokai) No. 11-266792 (1999)
Patent Literature 10: JP Patent Publication (Kokai) No. 2009-232864
Patent Literature 11: JP Patent Publication (Kokai) No. 2003-93016
Patent Literature 12: JP Patent Publication (Kokai) No. 2006-345797
Patent Literature 13: JP Patent Publication (Kokai) No. 2011-30490
Patent Literature 14: JP Patent Publication (Kokai) No. 2005-298816

Non Patent Literatures

Non Patent Literature 1: Journal of the Japanese Society for Food Science and Technology, Vol. 47, No. 10, p. 767 to 772 (October 2000)
Non Patent Literature 2: Visual Observation of Fish Freshness-Commitment to Palatability and Safety-, edited by Etsuo Watanabe et al., First Edition Published by Seizando-Shoten Publishing Co., Ltd., p. 46 to 55 (Dec. 18, 2007)

SUMMARY OF INVENTION

The methods (2-1) to (2-5) have the following problems, and cannot be necessarily satisfactory as a measure for preventing metmyoglobin formation in fish meat and suppressing freshness deterioration along therewith, The method (2-1) is not cost-effective because the antioxidant and the solvent, such as water, are required in large amounts for preparation of various antioxidant solutions and most thereof are not absorbed in fish meat, and such a solution is required to be disposed as a waste liquid after immersion. The time for immersion of fish meat is also then required in no small part, and therefore metmyoglobin formation and freshness deterioration also progress in this immersion step (the solvent is mostly water and thus immersion therein at 0° C. or lower is impossible.). In particular, a considerable immersion time is required for thick fish in the form of fillet. When fish meat is then immersed continuously in an antioxidant liquid, the antioxidant deteriorates to thereby make it impossible to exert the antioxidant effect demanded. Another problem is that the immersion treatment in the solution causes physical properties, shape and taste of fish meat to be changed. Furthermore, if fish meat having both ordinary flesh and dark colored flesh is immersed in the antioxidant solution, the ordinary flesh may be colored and the effect is difficult to selectively and operationally exert at the dark colored flesh.

Moreover, many microorganisms, such as *Clostridium botulinum*, *Vibrio parahemolyticus* and *Escherichia coli*, are present on the skin (scale surface or skin surface) of a fish fillet. When the fish fillet is immersed in an aqueous solution with an antioxidant dissolved therein, the microorganisms can be moved over the entire flesh. In addition, when many fillets are continuously immersed, the microorganisms can also grow. Therefore, when the method (2-1) is applied to fish meat, not only freshness deterioration cannot be suppressed, but also further freshness deterioration can be promoted.

In addition, when many fish fillets are continuously immersed, the amount of the antioxidant to be absorbed is different among fish individuals, the concentration of the antioxidant in the solution can likely vary, and impregnation with the antioxidant cannot be quantitatively achieved.

In order to constantly keep the state of fish meat after immersion, the immersion time needs to be optimized depending on fish individuals. Specifically, the time for permeation into each fish body needs to be optimized depending on the firmness of flesh and the degree of rigor mortis of each individual, and other factors. Such optimization is difficult, and the method (2-1) is not suitable for industrial application.

The method (2-2) can suppress metmyoglobin formation and freshness deterioration of fish meat without using external elements, which the method (2-1) uses. However, the method (2-2) requires changing the shape of fish and therefore is not applicable to foods distributed with the shape of a slice of fish remaining. In addition, this method requires a separate step of pulverizing fish meat. Furthermore, when fish meat is pulverized, the water content of fish meat can flow out, resulting in a decrease in the quality of fish meat.

Performing the method (2-3) requires a dedicated facility for the method. In addition, performing quick freezing consumes further time.

Patent Literatures 7 and 8 disclose, as the method (2-4), using a substance as a ligand to be bound to myoglobin, to suppress discoloration of myoglobin. The technique disclosed in Patent Literatures 7 and 8 is essentially the same as a technique for preventing discoloration of myoglobin by a treatment of fish meat with carbon monoxide gas. Accordingly, fish meat is considered to be kept red even after a long lapse of time after the treatment, to result in no deterioration in appearances, and the technique can have the same problem as a conventional treatment of fish meat with carbon monoxide gas. That is, the method (2-4) merely modifies myoglobin so as to forcibly cause it to produce bright red, through which the discoloration due to freshness deterioration becomes hardly recognizable. This method cannot suppress freshness deterioration.

The method (2-5) requires giving the feed to live fish continuously for a long period before shipment of fish meat. In addition, the amount of feeding can cause the freshness retention effect to differ with respect to each fish. Most of the antioxidant, such as a tea extract, compounded in the feed is not consumed by fish, and the method (2-5) also has the problem of being not cost-effective.

An object of the present invention is then to provide a simple measure which can suppress freshness deterioration of a myoglobin-containing food. Another object of the present invention is to provide a simple measure which can prevent discoloration due to oxidation of a myoglobin-containing food of any structure, at a temperature of higher than −30° C.

The following inventions are herein disclosed as measures for solving the above problems.

(1) A myoglobin-containing food freshness deterioration suppressing material for suppressing freshness deterioration of a myoglobin-containing food, comprising:
a substrate comprising a polymer; and
an antioxidant with which at least a part of a surface of the substrate is covered, and/or an antioxidant supported in a layer forming at least a part of a surface of the substrate; wherein
the material comprises 0.01 g/m$^2$ or more and 20 g/m$^2$ or less of the antioxidant relative to the area of the part in which the antioxidant is present, of the surface of the substrate.

(2) A myoglobin-containing food freshness deterioration suppressing material for suppressing freshness deterioration of a myoglobin-containing food, comprising:
a substrate comprising a polymer; and
an antioxidant with which at least a part of a surface of the substrate is covered, and/or an antioxidant supported in a layer forming at least a part of a surface of the substrate; wherein
the material comprises, besides the antioxidant, no agent which binds to or interacts with myoglobin to produce, maintain or enhance a color derived from myoglobin, in an amount which can allow the color derived from myoglobin to be procuded, maintained or enhanced, more preferably comprises, besides the antioxidant, no agent which binds to or interacts with myoglobin.

(3) The myoglobin-containing food freshness deterioration suppressing material according to (2), wherein a case is excluded in which the antioxidant is at least one selected from the group consisting of a nitric oxide-donating compound, an inorganic cyanide compound, an inorganic fluoride, isothiocyanate, a bacterial culture that fixes nitrogen to provide a source of nitrogen oxide, betanine, erythrocine, a cochineal extract, a nitrogen heterocycle, a carbon monoxide-donating compound, a sulfur monoxide-donating compound, a nitrous oxide-donating compound, an ammonia-donating compound, a hydrogen sulfide-donating compound and a nitrogen oxide-containing compound.

(4) A myoglobin-containing food freshness deterioration suppressing material for suppressing freshness deterioration of a myoglobin-containing food, comprising:
a substrate comprising a polymer; and
an antioxidant with which at least a part of a surface of the substrate is covered, and/or an antioxidant supported in a layer forming at least a part of a surface of the substrate; wherein
at least one of the following conditions:
(I) the antioxidant comprises 0.92 mg/m$^2$ or more and 1840 mg/m$^2$ or less of rosmarinic acid relative to the area of a part of the surface of the substrate in which part the antioxidant is present;
(II) the antioxidant comprises 1.2 mg/m$^2$ or more and 2400 mg/m$^2$ or less of carnosol relative to the area of the part in which the antioxidant is present, of the surface of the substrate;
(III) the antioxidant comprises 0.74 mg/m$^2$ or more and 1480 mg/m$^2$ or less of carnosic acid relative to the area of the part in which the antioxidant is present, of the surface of the substrate; and
(IV) the antioxidant comprises 0.01 g/m$^2$ or more and 20 g/m$^2$ or less of ascorbic acid relative to the area of the part in which the antioxidant is present, of the surface of the substrate;
is satisfied.

(5) The myoglobin-containing food freshness deterioration suppressing material according to any of (2) to (4), comprising 0.01 g/m$^2$ or more and 20 g/m$^2$ or less of the antioxidant relative to the area of the part in which the antioxidant is present, of the surface of the substrate.

(6) The myoglobin-containing food freshness deterioration suppressing material according to any of (1) to (5), wherein the antioxidant comprises a polyphenol compound or ascorbic acid.

(7) The myoglobin-containing food freshness deterioration suppressing material according to (6), wherein the antioxidant comprises a rosemary extract and/or a tea extract comprising a polyphenol corn pound.

(8) The myoglobin-containing food freshness deterioration suppressing material according to (7), wherein the antioxidant comprises a water-soluble rosemary extract comprising a polyphenol compound.

(9) The myoglobin-containing food freshness deterioration suppressing material according to any one of (1) to (8), wherein the polymer is at least one selected from the group consisting of a polyester-based resin, a polyamide-based resin, a polyolefin-based resin, a polyvinyl-based resin and cellulose.

(10) The myoglobin-containing food freshness deterioration suppressing material according to any of (1) to (9), wherein when the mass of the antioxidant per square meter area of the part in which the antioxidant is present, of the surface of the substrate, is defined as T, and
one plate- or film-shaped sample piece of a square 5 cm on a side, of the myoglobin-containing food freshness deterioration suppressing material, is immersed in a volume of 1000 mL of distilled water at a temperature of 4° C.,
the following characteristics are exhibited:
a mass of 0.05 T or more per square meter area of the part, of the antioxidant, is eluted from the substrate into the distilled water at 10 seconds after the start of immersion,
a mass of 0.15 T or more per square meter area of the part, of the antioxidant, is eluted from the substrate into the distilled water 30 minutes after the start of immersion.

(11) A food package comprising at least:
the myoglobin-containing food freshness deterioration suppressing material according to any of (1) to (10);
a packaging material; and
a myoglobin-containing food; wherein
the myoglobin-containing food freshness deterioration suppressing material and the myoglobin-containing food are packaged by the packaging material so that a surface of the substrate, covered with the antioxidant, and/or a surface of the layer in which the antioxidant is supported, of the myoglobin-containing food freshness deterioration suppressing material, are/is in contact with at least a part of a surface of the myoglobin-containing food.

(12) A food package comprising at least:
a packaging material at least partially comprising the myoglobin-containing food freshness deterioration suppressing material according to any of (1) to (10); and a myoglobin-containing food; wherein
the myoglobin-containing food is packaged by the packaging material so that a surface of the substrate, covered with the antioxidant, and/or a surface of the layer in which the antioxidant is supported, of the myoglobin-containing food freshness deterioration suppressing material comprised in the packaging material, are/is in contact with at least a part of a surface of the myoglobin-containing food.

(13) A food package comprising at least:
a packaging material at least partially comprising the myoglobin-containing food freshness deterioration suppressing material according to any of (1) to (10);
an additional myoglobin-containing food freshness deterioration suppressing material according to any of (1) to (10); and
a myoglobin-containing food; wherein
the additional myoglobin-containing food freshness deterioration suppressing material and the myoglobin-containing food are packaged by the packaging material so that a surface of the substrate, covered with the antioxidant, and/or a surface of the layer in which the antioxidant is supported, of the myoglobin-containing food freshness deterioration suppressing material comprised in the packaging material, are/is in contact with at least a part of a surface of the myoglobin-containing food, and
the additional myoglobin-containing food freshness deterioration suppressing material and the myoglobin-containing food are packaged by the packaging material so that a surface of the substrate, covered with the antioxidant, and/or a surface of the layer in which the antioxidant is supported, of the additional myoglobin-containing food freshness deterioration suppressing material, are/is in contact with at least a part of a surface of the myoglobin-containing food.

(14) The food package according to any of (11) to (13), wherein an interior of the packaging material is degassed.

(15) The food package according to any of (11) to (14), wherein the myoglobin-containing food is fish meat containing myoglobin,

(16) The food package according to (15), wherein the fish meat is meat of fish belonging to the family Carangidae.

(17) The food package according to (15) or (16), wherein the fish meat is a fillet whose surface is partially covered with skin, loin whose surface is partially covered with skin, loin from which skin is stripped, or a slice of fish, and
the packaging is made in the packaging material so that a surface of the substrate, covered with the antioxidant, and/or a surface of the layer in which the antioxidant is supported, of the myoglobin-containing food freshness deterioration suppressing material comprised in the packaging material and/or the myoglobin-containing food freshness deterioration suppressing material separate from the packaging material, are/is in contact with at least a part of a surface covered with skin of the fillet, at least a part of a surface covered with skin of the loin whose surface is partially covered with skin, at least a part of a surface from which skin is stripped of the loin from which skin is stripped, or at least a part of a surface of the slice of fish.

(18) A method for preserving and/or transporting the food package according to any one of (11) to (17), comprising:
a step of preserving and/or transporting food package under a temperature condition of −30° C. to +10° C.

(19) A method for suppressing freshness deterioration of a myoglobin-containing food, comprising:
a step of bringing the myoglobin-containing food freshness deterioration suppressing material according to any of (1) to (10) into contact with the myoglobin-containing food so that a surface of the substrate, covered with the antioxidant, and/or a surface of the layer in which the antioxidant is supported, of the myoglobin-containing food freshness deterioration suppressing material, are/is in contact with at least a part of a surface of the myoglobin-containing food.

(20) The method according to (19), wherein the step is a step of using the myoglobin-containing food freshness deterioration suppressing material, a packaging material and the myoglobin-containing food, using the packaging material at least partially comprising the myoglobin-containing food freshness deterioration suppressing material, and the myoglobin-containing food, or using the packaging material at least partially comprising the myoglobin-containing food freshness deterioration suppressing material, the additional myoglobin-containing food freshness deterioration suppressing material and the myoglobin-containing food to form the food package according to any one of (11) to (17).

(21) The method according to (20), further comprising a step of preserving and/or transporting the food package under a temperature condition of −30° C. to +10° C.

(22) Use of the myoglobin-containing food freshness deterioration suppressing material according to any of (1) to (10), for suppressing freshness deterioration of a myoglobin-containing food.

(23) The use according to (22), for suppressing freshness deterioration of a myoglobin-containing food by using the myoglobin-containing food freshness deterioration suppressing material, a packaging material and the myoglobin-containing food, using the packaging material at least partially comprising the myoglobin-containing food freshness deterioration suppressing material, and the myoglobin-containing food, or using the packaging material at least partially comprising the myoglobin-containing food freshness deterioration suppressing material, the additional myoglobin-containing food freshness deterioration suppressing material and the myoglobin-containing food to form the food package according to any one of (11) to (17).

(24) A myoglobin-containing food discoloration suppressing material for suppressing discoloration of a myoglobin-containing food, comprising:
a substrate comprising a synthetic resin; and
an antioxidant with which at least a part of a surface of the substrate is covered, and/or an antioxidant supported in a layer forming at least a part of a surface of the substrate; wherein
the material comprises, besides the antioxidant, no agent which binds to or interacts with myoglobin.

(25) The myoglobin-containing food discoloration suppressing material according to (24), wherein a case is excluded in which the antioxidant is at least one selected from the group consisting of a nitric oxide-donating compound, an inorganic cyanide compound, an inorganic fluoride, isothiocyanate, a bacterial culture that fixes nitrogen to provide a source of nitrogen oxide, betanine, erythrocine, a cochineal extract, a nitrogen heterocycle, a carbon monoxide-donating compound, a sulfur monoxide-donating compound, a nitrous oxide-donating compound, an ammonia-donating compound and a hydrogen sulfide-donating compound.

(26) The myoglobin-containing food discoloration suppressing material according to (24) or (25), wherein the antioxidant comprises a polyphenol compound.

(27) The myoglobin-containing food discoloration suppressing material according to (26), wherein the antioxidant comprises the polyphenol compound in the form of a rosemary extract and/or a tea extract.

(28) The myoglobin-containing food discoloration suppressing material according to any of (24) to (27), comprising 0.01 g/m$^2$ or more and 20 g/m$^2$ or less of the antioxidant relative to the area of the part in which the antioxidant is present, of the surface of the substrate.

(29) A myoglobin-containing food discoloration suppressing material for suppressing discoloration of a myoglobin-containing food, comprising:
  a substrate comprising a synthetic resin; and
  an antioxidant with which at least a part of a surface of the substrate is covered, and/or an antioxidant supported in a layer forming at least a part of a surface of the substrate; wherein
  the antioxidant comprises a polyphenol compound, and
  the material comprises 0.001 g/m$^2$ or more and 20 g/m$^2$ or less of the antioxidant relative to the area of the part in which the antioxidant is present, of the surface of the substrate.

(30) The myoglobin-containing food discoloration suppressing material according to (29), wherein the antioxidant comprises the polyphenol compound in the form of a rosemary extract and/or a tea extract.

(31) The myoglobin-containing food discoloration suppressing material according to any of (24) to (30), wherein the synthetic resin is at least one selected from the group consisting of a polyester-based resin, a polyamide-based resin, a polyolefin-based resin and a polyvinyl-based resin.

(32) A food package comprising at least:
  the myoglobin-containing food discoloration suppressing material according to any of (24) to (30);
  a packaging material; and
  a myoglobin-containing food; wherein
  the myoglobin-containing food discoloration suppressing material and the myoglobin-containing food are packaged by the packaging material so that a surface of the substrate, covered with the antioxidant, and/or a surface of the layer in which the antioxidant is supported, of the myoglobin-containing food discoloration suppressing material, are/is in contact with at least a part of a surface of the myoglobin-containing food.

(33) The food package according to (32), wherein an interior of the packaging material is degassed.

(34) A food package comprising at least:
  a packaging material at least partially comprising the myoglobin-containing food discoloration suppressing material according to any of (24) to (30); and
  a myoglobin-containing food; wherein
  the myoglobin-containing food is packaged by the packaging material so that a surface of the substrate, covered with the antioxidant, and/or a surface of the layer in which the antioxidant is supported, of the myoglobin-containing food discoloration suppressing material comprised in the packaging material, are/is in contact with at least a part of a surface of the myoglobin-containing food.

(35) The food package according to (34), wherein an interior of the packaging material is degassed.

(36) The food package according to any one of (32) to (35), wherein the myoglobin-containing food is a slice of fish meat containing myoglobin.

(37) The food package according to (36), wherein the slice is a slice of yellowtail.

(38) A method for preserving and/or transporting the food package according to any of (32) to (37), comprising:
  a step of preserving and/or transporting the food package under a temperature condition of −30° C. to +10° C.

(39) A method for suppressing discoloration of a myoglobin-containing food, comprising:
  a step of bringing the myoglobin-containing food discoloration suppressing material according to any of (24) to (31) into contact with the myoglobin-containing food so that a surface of the substrate, covered with the antioxidant, and/or a surface of the layer in which the antioxidant is supported, of the myoglobin-containing food discoloration suppressing material, are/is in contact with at least a part of a surface of the myoglobin-containing food.

(40) The method according to (39), wherein the step is a step of using the myoglobin-containing food discoloration suppressing material, a packaging material, and the myoglobin-containing food, or using the packaging material at least partially comprising the myoglobin-containing food discoloration suppressing material, and the myoglobin-containing food to form the food package according to any one of (32) to (37).

(41) The method according to (40), further comprising a step of preserving and/or transporting the food package under a temperature condition of −30° C. to +10° C.

(42) Use of the myoglobin-containing food discoloration suppressing material according to any of (24) to (31) for suppressing discoloration of a myoglobin-containing food.

(43) The use according to (42), for suppressing discoloration of a myoglobin-containing food by using the myoglobin-containing food discoloration suppressing material, a packaging material and the myoglobin-containing food, or using the packaging material at least partially comprising the myoglobin-containing food discoloration suppressing material, and the myoglobin-containing food to form the food package according to any one of (32) to (37).

The present specification encompasses the content described in the specification and/or the drawings in Japanese Patent Application No. 2014-113518, which is a basis of the priority of the present application.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 14A is a photograph of the fillet after the treatment, according to Comparative Example 203, FIG. 14B is a photograph of the fillet after the treatment, according to Comparative Example 204, and FIG. 14C is a photograph of the fillet after the treatment, according to Comparative Example 205.

FIG. 16A shows the change over time in proportion of the antioxidant eluted from the myoglobin-containing food freshness deterioration suppressing material of the present invention in contacting of the material with the surface of a fillet of yellowtail. FIG. 16B shows the change over time in proportion of the antioxidant eluted from the myoglobin-containing food freshness deterioration suppressing material of the present invention in water.

FIG. 18A illustrates fish meat as a form called "round" which corresponds to the entire of fish. FIG. 18B illustrates fish meat as a form called "dress" where the head, gills, internal organs and fins are removed. FIG. 18C illustrates fish meat as a form called "fillet" where the left and right of the backbone are cut out from the dress. FIG. 18D illustrates fish meat as a form called "loin" which is obtained by separating the fillet to two portions: upper and lower portions. The figures illustrate dorsal loin 182, an example of loin from which skin is stripped, and ventral loin 183, an example of loin having skin.

DESCRIPTION OF EMBODIMENTS

Figure 1A:
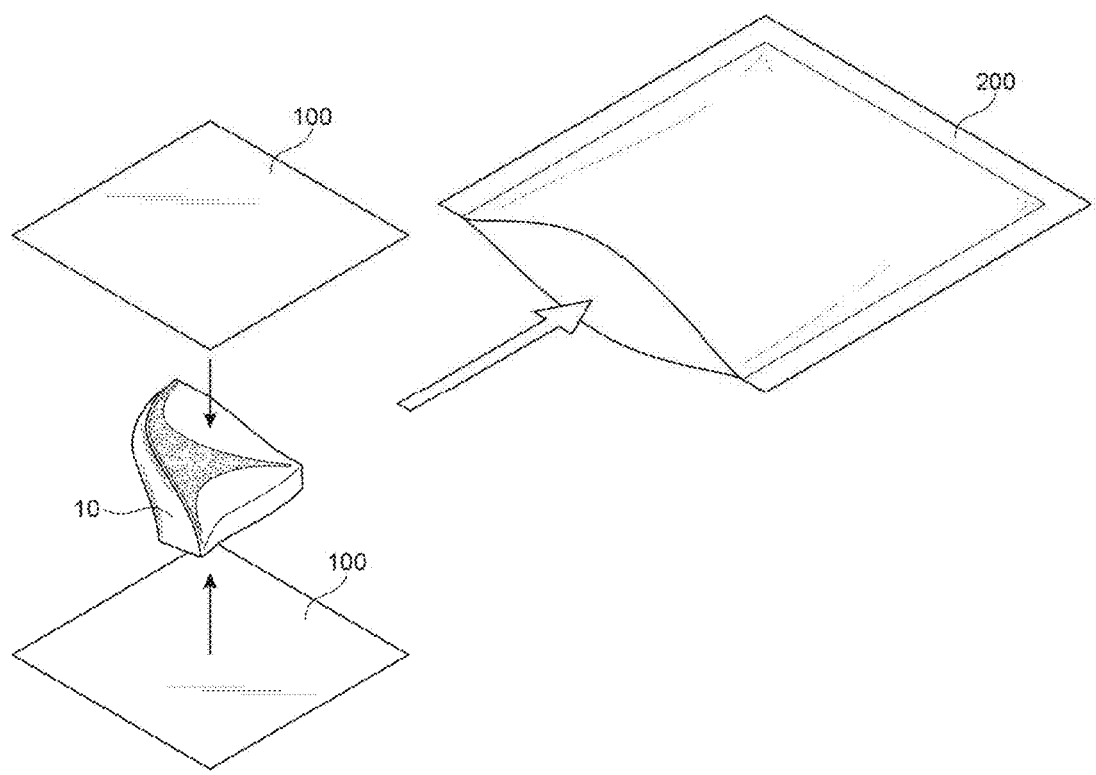
FIG. 1A is a schematic view for describing one example of the structure of the food package of the present invention.

1. Myoglobin-Containing Food Freshness Deterioration Suppressing Material or Myoglobin-Containing Food Discoloration Suppressing Material 1.1. Substrate A polymer forming a substrate is not limited. Examples of the polymer include at least one selected from the group consisting of a polyester-based resin, a polyamide-based resin, a polyolefin-based resin, a polyvinyl-based resin and cellulose. The polymer is preferably a synthetic resin.

Examples of the polyester-based resin include polyethylene terephthalate, polypropylene terephthalate, polybutylene terephthalate, polycyclohexanedimethylene terephthalate, polyethylene naphthalate and polybutylene naphthalate.

Examples of the polyamide-based resin include Nylons (such as Nylon 6, Nylon 11, Nylon 12, Nylon 66, Nylon 610, a copolymer of Nylon 6 and Nylon 66, a copolymer of Nylon 6 and Nylon 12), and polyvinylidene chloride-coated oriented Nylon.

Examples of the polyolefin-based resin include polyethylene (such as low-density polyethylene, linear low-density polyethylene, ultralow density polyethylene), polypropylene, a copolymer of ethylene and vinyl acetate, a copolymer of ethylene and vinyl alcohol, a copolymer of ethylene and acrylic acid, a copolymer of ethylene and methacrylic acid, and polyvinylidene chloride-coated oriented polypropylene.

Examples of the polyvinyl-based resin include polystyrene, polyvinyl acetate, acryl, polyvinyl chloride, polyvinylidene chloride, and polyvinyl alcohol.

The resins may be oriented or non-oriented, and may be resins processed for an increase in barrier property.

Examples of the substrate comprising cellulose include cellophane.

The substrate may have any shape, and may, for example, have a film shape or a plate shape. The shape of the myoglobin-containing food freshness deterioration suppressing material or myoglobin-containing food discoloration suppressing material can be any shape, such as a film shape and a plate shape, depending on the shape of the substrate. The film-shaped substrate can be processed to any form, such as a bag, and such a bag can be a gazette bag, a zipper bag or a vacuum packaging bag. The myoglobin-containing food freshness deterioration suppressing material or myoglobin-containing food discoloration suppressing material of the present invention is particularly preferably in the form of a bag, particularly a vacuum packaging bag, depending on the shape of the substrate.

When the myoglobin-containing food freshness deterioration suppressing material or myoglobin-containing food discoloration suppressing material of the present invention is in the form of a bag, such as a vacuum packaging bag, the substrate preferably comprises a layer of a polyolefin-based resin, preferably polyethylene, more preferably linear low-density polyethylene on at least a surface thereof, facing the inside of the bag. Such a resin is preferably adopted because of being easily thermally fused and easily heat-sealed.

In addition, when the myoglobin-containing food freshness deterioration suppressing material or myoglobin-containing food discoloration suppressing material of the present invention is used for an application where heat-sealing is not required, the substrate is preferably a substrate comprising at least one selected from a polyester-based resin, a polyolefin-based resin and a polyvinyl-based resin, more preferably a substrate comprising a polyester-based resin, particularly preferably a substrate comprising polyethylene terephthalate. The substrate comprising such a resin is advantageously adopted because of being relatively inexpensive and easily releasing an antioxidant with which the surface comprising the resin is covered, or an antioxidant supported in the resin.

It is preferable that at least the portion covered with the antioxidant or the portion supporting the antioxidant of the substrate is formed by a layer of the resin, as in an embodiment described later. The surface of the portion covered with the antioxidant or the portion supporting the antioxidant may or may not be subjected to a corona treatment, and preferably, is not subjected to a corona treatment. The reason is because a substrate surface not subjected to a corona treatment more easily releases the antioxidant with which the surface is covered or which is supported in the surface than a substrate surface subjected to a corona treatment.

The substrate may have a multilayer structure or may have a monolayer structure. When the substrate has a multilayer structure, the materials forming respective layers may be the same or different. Multiple layers forming a multilayer structure can be, if necessary, bonded by use of a proper adhesive. Such a substrate having a multilayer structure may be an aluminum-deposited substrate or other types of substrate. A substrate with two or more materials stacked can be manufactured by a co-extrusion method or a lamination method (including, for example, extrusion lamination, thermal lamination, solvent type dry lamination, non-solvent type dry lamination).

Figure 2:
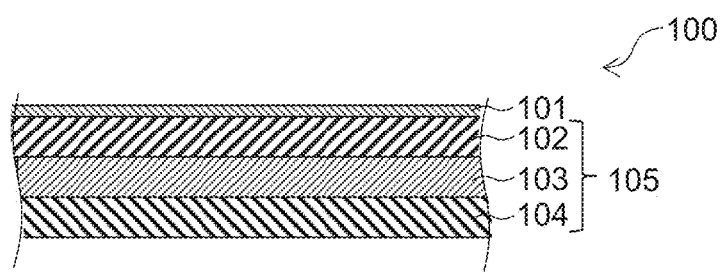
FIG. 2 is a schematic cross-sectional view illustrating one example of the myoglobin-containing food discoloration suppressing material having a layered structure of the present invention.
Figure 3:
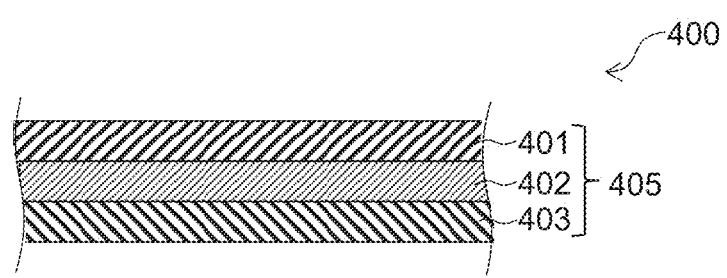
FIG. 3 is a schematic cross-sectional view illustrating one example of the myoglobin-containing food discoloration suppressing material having a layered structure of the present invention.
Figure 15:
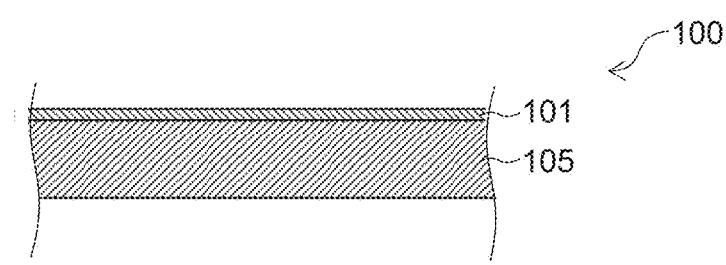
FIG. 15 is a schematic cross-sectional view illustrating one example of the myoglobin-containing food freshness deterioration suppressing material having a layered structure of the present invention.

Examples of the substrate include a film-shaped or plate-shaped substrate 105 as shown in FIG. 2 comprising a first polymer layer (first resin layer) 102, a second polymer layer (second resin layer) 104, and an adhesive layer 103 for bonding the layers, a film-shaped or plate-shaped substrate 405 as shown in FIG. 3 comprising a first polymer layer (first resin layer) 401, a second polymer layer (second resin layer) 403, and an adhesive layer 402 for bonding the layers, and a film-shaped or plate-shaped substrate 105 as shown in FIG. 15 comprising a single polymer layer.

When the substrate has a film shape, the thickness thereof is not limited, but is preferably 5 μm or more or 10 μm or more, preferably 200 μm or less. When the substrate is a film having a multilayer structure, the thickness of the substrate is preferably 30 to 200 μm, more preferably 40 to 175 μm. When the substrate is a film having a monolayer structure, the thickness of the substrate is preferably 5 to 200 μm, more preferably 5 to 175 μm.

Figure 17:
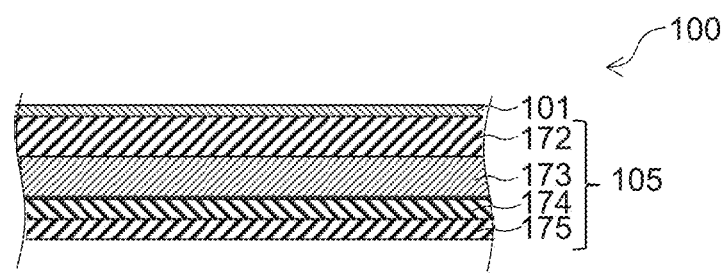
FIG. 17 is a schematic cross-sectional view illustrating one example of the myoglobin-containing food freshness deterioration suppressing material having a layered structure of the present invention.
Figure 18A:
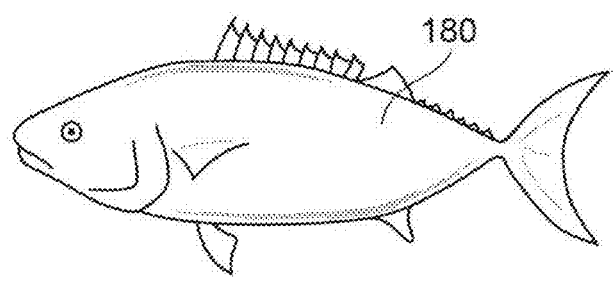
FIGS. 18A-18D include views for describing fish meat.
Figure 18B:
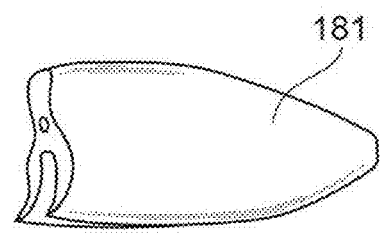
Figure 18C:
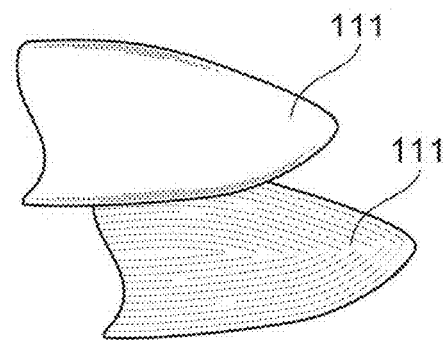
Figure 18D:
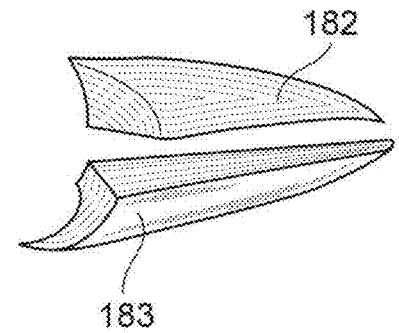

A substrate 105 comprised in a myoglobin-containing food freshness deterioration suppressing material 100, shown in FIG. 17, is a specific embodiment of the substrate 105 shown in FIG. 2, and comprises a linear low-density polyethylene layer 172, an adhesive layer 173, a Nylon layer 174 and a Nylon layer 175. In the substrate 105 shown in FIG. 17, the second polymer layer 104 in the substrate 105 shown in FIG. 2 is divided to two layers: the Nylon layer 174 and the Nylon layer 175. The Nylon layer 174 and the Nylon layer 175 can be bonded by solvent type dry lamination with a solvent and an adhesive.

In the substrate 105 shown in FIG. 2, the first polymer layer 102 is preferably a layer having a thickness of 30 to 90 μm, particularly preferably a linear low-density polyethylene layer. The adhesive layer 103 is preferably a layer having a thickness of 3 to 35 μm, particularly preferably a polyethylene layer. The second polymer layer 104 is preferably a layer having a thickness of 5 to 80 μm, particularly preferably a Nylon layer. The second polymer layer 104 may also be divided to a plurality of layers, as described above, and the total of the thicknesses of the respective layers is preferably within the above range as the thickness of the second polymer layer 104.

When the substrate 105 has a monolayer structure as shown in FIG. 15, it is preferably a layer having a thickness of 5 to 200 μm, particularly preferably a layer of at least one selected from polyethylene terephthalate, polyethylene and polystyrene.

1.2. Antioxidant

The antioxidant for use in the present invention is not limited in the present invention, and may, for example, be an antioxidant comprising at least one compound selected from the group consisting of a polyphenol compound, ascorbic acid (also including an ascorbic acid salt), vitamin E (for example, tocopherol), hinokitiol, ferulic acid (also including an ferulic acid salt) and ergothioneine, and derivatives thereof, or be a plant extract comprising at least one compound selected from the above group. The ascorbic acid may be L-ascorbic acid (vitamin C), D-ascorbic acid (erythorbic acid) or a mixture thereof, and is preferably L-ascorbic acid (vitamin C). A plurality of antioxidants may be used in combination. In the present invention, when the antioxidant or the constitutive component thereof is a compound having a specified structure, or a combination thereof, the amount of the compound is represented as the amount of its free form.

The polyphenol compound collectively means an organic compound having a plurality of phenolic hydroxyl groups, and specifically includes polyphenol compounds having a phenolic carboxylic acid structure, such as rosmarinic acid; polyphenol compounds classified as flavonoid, such as luteolin; polyphenol compounds having a diterpene polyphenol structure, such as carnosol, carnosic acid, rosmanol and epirosmanol; matairesinol; and catechins, such as epicatechin, epillogallocatechin, and gallic acid esters thereof, such as epicatechin gallate and epillogallocatechin gallate. In the present invention, an acid or base compound, such as rosmarinic acid, carnosic acid and ascorbic acid, may also be in the form of a salt, unless otherwise specified.

The polyphenol compound used to produce the myoglobin-containing food freshness deterioration suppressing material or myoglobin-containing food discoloration suppressing material of the present invention may be in the form of a plant extract comprising the polyphenol compound. Examples of such a plant extract include a rosemary extract and a tea extract. The extraction method is not limited. Usually, at least one solvent selected from the group consisting of water-soluble organic solvents, such as methanol, ethanol and acetone, water and hexane, and mixed solvents of two or more thereof can be used to extract components soluble in the solvent from a plant body, and the solvent can be appropriately removed to provide an extract. In the present invention, such extraction may be performed at multiple stages, and a different extraction solvent may be used at each stage. In the present invention, one embodiment of "extraction" includes removing an unnecessary component by extraction from a plant body raw material or from an extract obtained from the plant body raw material to provide a necessary component as the remaining component The necessary component obtained by this method is also referred to as "extract". For example, a solvent (for example, hydrous alcohol) which can elute both of a water-soluble component and an oil-soluble component can be used as an extraction solvent to provide a primary extract from a plant body raw material, and a water-soluble extraction solvent, such as water, can be subsequently used to provide a water-soluble extract from the primary extract, and then provide an oil-soluble extract as the remaining component; an oil-soluble extraction solvent, such as hexane, ethanol, or a mixed solvent of hexane/ethanol, can be used to provide an oil-soluble extract from the primary extract, and then to provide a water-soluble extract as the remaining component. The hydrous alcohol comprises an aqueous alcohol solution where the content of the alcohol is 1 to 99% by mass, preferably 3 to 97% by mass, and the alcohol is preferably ethanol.

The method for providing a water-soluble plant extract (for example, water-soluble rosemary extract) is preferably a method where hydrous ethanol is used as an extraction solvent to perform extraction from a plant body raw material, and then water is used as an extraction solvent to perform extraction from the resulting primary extract, providing a water-soluble plant extract.

The extraction solvent for providing an oil-soluble plant extract (for example, oil-soluble rosemary extract) is usefully at least one selected from the group consisting of hexane, ethanol and a mixed solvent thereof (for example, a mixed solvent where 0.5 to 4 volumes of hexane, preferably 1 to 3 volumes of hexane is mixed with 1 volume of ethanol). In addition, an oil-soluble plant extract, such as an oil-soluble rosemary extract, can also be obtained by using hydrous ethanol as an extraction solvent to perform extraction from a plant body raw material, and then water is used as an extraction solvent to perform extraction from the resulting primary extract for removal of a water-soluble component, thereby precipitating an oil-soluble plant extract.

When the antioxidant is a plant extract, the plant extract is preferably a water-soluble plant extract, particularly preferably a water-soluble rosemary extract. The water-soluble rosemary extract comprises rosmarinic acid, which is a phenolic carboxylic acid, as a main component, and additionally comprises flavonoids (including luteolins, luteolin derivatives, such as luteolin glycoside). Typically, the water-soluble plant extract, such as the water-soluble rosemary extract, is easily dissolved in water and hardly dissolved in oils and fats (including, for example, hexane) at ordinary temperature and pressure (25° C., 1 atm). The rosmarinic acid concentration in the water-soluble rosemary extract is not limited. The rosmarinic acid concentration may, for example, be 2% by mass or more, preferably 4% by mass or more, more preferably 6% by mass or more, more preferably 8% by mass or more. Rosmarinic acid purified may also be used as the antioxidant.

The antioxidant may be an oil-soluble plant extract. Specifically, an oil-soluble rosemary extract can be used. The oil-soluble rosemary extract comprises carnosol, carnosic acid and other components, as main active components. The rosemary extract is easily dissolved in oils and fats (including, for example, hexane) and is hardly dissolved in water. The oil-soluble plant extract, such as the oil-soluble rosemary extract, is typically easily dissolved in oils and fats (such as hexane) and hardly dissolved in water at ordinary temperature and pressure (25° C., 1 atm). The carnosol concentration in the oil-soluble rosemary extract is not limited. The carnosol concentration may, for example, be 2% by mass or more, preferably 4% by mass or more, more preferably 6% by mass or more, more preferably 8% by mass or more, more preferably 10% by mass or more. In addition, the carnosic acid concentration in the oil-soluble rosemary extract is not limited. The carnosic acid concentration may, for example, be 2% by mass or more, preferably 4% by mass or more, more preferably 6% by mass or more. Carnosol or carnosic acid purified may also be used as the antioxidant.

A commercially available composition comprising, at least in part, a plant extract can be purchased and used as the plant extract. For example, those sold under trade names "RM-21A base", "RM-21A", "RM-21B base" produced by Mitsubishi-Kagaku Foods Corporation or other products can be used for the commercially available rosemary extract composition, and those sold under trade names "Sunfood 100" produced by Mitsubishi-Kagaku Foods Corporation or other products can be used for the tea extract composition.

A polyphenol compound obtained by isolation or concentration from the plant extract or a polyphenol compound artificially synthesized may be used as the polyphenol compound in the present invention.

1.3. Addition of Antioxidant to Substrate

The antioxidant is integrated with the substrate by covering at least a part of the surface of the substrate therewith, or by supporting the antioxidant on a layer constituting at least a part of the surface of the film substrate.

FIG. 2 shows one example of the cross-sectional structure of the myoglobin-containing food freshness deterioration suppressing material or myoglobin-containing food discoloration suppressing material of the present invention in which the surface of the film-shaped or plate-shaped substrate is covered with the antioxidant. A myoglobin-containing food freshness deterioration suppressing material or myoglobin-containing food discoloration suppressing material 100 of the present invention has a structure where the surface of a film-shaped or plate-shaped substrate 105 comprising a first polymer layer 102, a second polymer layer 104, and an adhesive layer 103 for bonding the layers is covered with an antioxidant layer 101. The structure of the substrate 105 is not limited to such a structure, and the substrate 105 may also have other structure, such as a monolayer structure as in FIG. 15. The method for covering the surface of the substrate 105 with the antioxidant layer 101 is not limited, and for example, a printing method, such as gravure printing, can be used. In the printing method, the antioxidant can be dissolved or dispersed in a solvent (for example, ethanol) which can dissolve or disperse the antioxidant, to form varnish, and the surface of the substrate 105 can be coated with the resulting varnish and dried to thereby form the antioxidant layer 101. Before being coated with the varnish, the surface of the substrate 105 may also be subjected to a corona treatment in advance, in order to enhance the affinity of the substrate surface with the varnish.

In addition, a binder, a thickener or other additives may be added to the varnish to enhance printing property of the antioxidant on the substrate. Examples of the binder or the thickener that may be used includes shellac and hydroxypropylcellulose. For preventing being blocked, the substrate may have starch or other powder dredged on the surface.

FIG. 3 shows one example of the cross-sectional structure of the myoglobin-containing food freshness deterioration suppressing material or myoglobin-containing food discoloration suppressing material of the present invention in which the antioxidant is supported in a layer forming at least a part of the surface of a film-shaped or plate-shaped substrate. A myoglobin-containing food freshness deterioration suppressing material or myoglobin-containing food discoloration suppressing material 400 of the present invention can be formed by allowing the antioxidant to be supported in a first polymer layer 401 of a film-shaped or plate-shaped substrate 405 comprising the first polymer layer 401, a second polymer layer 403, and an adhesive layer 402 for bonding the layers. The structure of the substrate 405 is not limited to such an example. For example, the substrate 405 may have a monolayer structure in which the antioxidant is supported in the entire thickness direction, or in which the antioxidant is supported only in the vicinity of one surface of the monolayer structure in the thickness direction.

The method for allowing the antioxidant to be supported in the substrate is not limited. Appropriate methods can be used to form the substrate. Examples of such methods include a method in which the polymer and the antioxidant are molten and kneaded by extrusion to form the substrate, or a method in which the substrate is formed by the polymer, and then the surface thereof is coated with an antioxidant solution to allow the antioxidant to be supported in the layer constituting the surface of the substrate.

The amount of the antioxidant in the myoglobin-containing food freshness deterioration suppressing material or myoglobin-containing food discoloration suppressing material of the present invention is not limited, and the antioxidant is usually comprised in an amount of 0.001 g/m$^2$ or more and 20 g/m$^2$ or less relative to the area of the part in which the antioxidant is present, of the surface of the substrate. When the amount of the antioxidant is within the range, metmyoglobin formation can be suppressed and the antioxidant can be preserved with being favorably kept in the substrate. When the material of the present invention has the antioxidant with which at least a part of a surface of the substrate is covered, the "area of the part in which the antioxidant is present, of the surface of the substrate" refers to the area of the surface covered with the antioxidant of the substrate. When the material of the present invention has the antioxidant supported in a layer forming at least a part of a surface of the substrate, the term refers to the area of a surface of the layer which is to contact with a food.

Furthermore, the amount of the antioxidant in the myoglobin-containing food freshness deterioration suppressing material or myoglobin-containing food discoloration suppressing material of the present invention is preferably 0.01 g/m$^2$ or more, more preferably 0.1 g/m$^2$ or more, more preferably 0.25 g/m$^2$ or more, more preferably 0.3 g/m$^2$ or more, particularly preferably 0.5 g/m$^2$ or more, and preferably 20 g/m$^2$ or less, more preferably 15 g/m$^2$ or less, more preferably 10 g/m$^2$ or less, more preferably 7.5 g/m$^2$ or less, more preferably 5 g/m$^2$ or less, more preferably 3 g/m$^2$ or less, more preferably 2.5 g/m$^2$ or less, particularly preferably 2.2 g/m$^2$ or less relative to the area of the part in which the antioxidant is present, of the surface of the substrate. When the amount of the antioxidant is within the range, the effect of suppressing freshness deterioration and metmyoglobin formation of a myoglobin-containing food is particularly high, and the antioxidant can be favorably kept in the substrate. The amount of the antioxidant in the range is particularly suitable when the antioxidant is a water-soluble rosemary extract, an oil-soluble rosemary extract, a tea extract (in particular, water-soluble tea extract), or ascorbic acid. When the antioxidant is a plant extract, such as a water-soluble rosemary extract, an oil-soluble rosemary extract and a tea extract, the amount of the plant extract, obtained by conversion based on the amount of the compound (for example, rosmarinic acid, carnosol, and carnosic acid) comprised in the plant extract, may be within the range. In the present invention, the amount of ascorbic acid is represented as the amount of a free form, unless otherwise specified.

The proportion of the antioxidant on the substrate relative to the substrate mass (not including the antioxidant) differs depending on the specific gravity of the substrate and the thickness of the substrate and thus is not limited, but it is typically 0.001% by mass or more and 25% by mass or less, preferably 0.01% by mass or more, more preferably 0.1% by mass or more, more preferably 0.25% by mass or more, more preferably 0.3% by mass or more, more preferably 0.5% by mass or more, and preferably 20% by mass or less, more preferably 15% by mass or less, more preferably 10% by mass or less, more preferably 5.5% by mass or less, more preferably 4% by mass or less, more preferably 3% by mass or less, more preferably 2.4% by mass or less. This embodiment is particularly suitable for the case where the antioxidant is a water-soluble rosemary extract, an oil-soluble rosemary extract; a tea extract (in particular, water-soluble tea extract), or ascorbic acid.

A myoglobin-containing food freshness deterioration suppressing material or a myoglobin-containing food discoloration suppressing material according to other preferable embodiment of the present invention comprises a substrate comprising a polymer, and an antioxidant with which at least a part of the surface of the substrate is covered, and/or an antioxidant supported in a layer forming at least a part of the surface of the substrate, wherein at least one condition of the following conditions:

(I) the antioxidant comprises rosmarinic acid, and the amount of rosmarinic acid relative to the area of the part in which the antioxidant is present, of the surface of the substrate, is preferably 0.92 mg/m$^2$ or more, more preferably 9.2 mg/m$^2$ or more, more preferably 23 mg/m$^2$ or more, more preferably 27.6 mg/m$^2$ or more, more preferably 46 mg/m$^2$ or more, and preferably 1840 mg/m$^2$ or less, more preferably 1380 mg/m$^2$ or less, more preferably 920 mg/m$^2$ or less, more preferably 690 mg/m$^2$ or less, more preferably 460 mg/m$^2$ or less, more preferably 276 mg/m$^2$ or less, more preferably 230 mg/m$^2$ or less, more preferably 202 mg/m$^2$ or less;

(II) the antioxidant comprises carnosol, and the amount of carnosol relative to the area of the part in which the antioxidant is present, of the surface of the substrate, is preferably 1.2 mg/m$^2$ or more, more preferably 12 mg/m$^2$ or more, more preferably 30 mg/m$^2$ or more, more preferably 36 mg/m$^2$ or more, more preferably 60 mg/m$^2$ or more, and preferably 2400 mg/m$^2$ or less, more preferably 1800 mg/m$^2$ or less, more preferably 1200 mg/m$^2$ or less, more preferably 900 mg/m$^2$ or less, more preferably 600 mg/m$^2$ or less, more preferably 360 mg/m$^2$ or less, more preferably 300 mg/m$^2$ or less, more preferably 264 mg/m$^2$ or less;

(III) the antioxidant comprises carnosic acid, and the amount of carnosic acid relative to the area of the part in which the antioxidant is present, of the surface of the substrate, is preferably 0.74 mg/m$^2$ or more, more preferably 7.4 mg/m$^2$ or more, more preferably 18.5 mg/m$^2$ or more, more preferably 22.2 mg/m$^2$ or more, more preferably 37 mg/m$^2$ or more, and preferably 1480 mg/m$^2$ or less, more preferably 1110 mg/m$^2$ or less, more preferably 740 mg/m$^2$ or less, more preferably 555 mg/m$^2$ or less, more preferably 370 mg/m$^2$ or less, more preferably 222 mg/m$^2$ or less, more preferably 185 mg/m$^2$ or less, more preferably 163 mg/m$^2$ or less; and (IV) the antioxidant comprises ascorbic acid, and the amount of ascorbic acid relative to the area of the part in which the antioxidant is present, of the surface of the substrate, is preferably 0.01 g/m$^2$ or more, more preferably 0.1 g/m$^2$ or more, more preferably 0.25 g/m$^2$ or more, more preferably 0.3 g/m$^2$ or more, particularly preferably 0.5 g/m$^2$ or more, and preferably 20 g/m$^2$ or less, more preferably 15 g/m$^2$ or less, more preferably 10 g/m$^2$ or less, more preferably 7.5 g/m² or less, more preferably 5 g/m² or less, more preferably 3 g/m² or less, more preferably 2.5 g/m² or less, more preferably 2.2 g/m² or less;

is satisfied. Only one of the conditions (I) to (IV) may be satisfied. When the condition (II) is satisfied, it is preferable that the condition (III) is also satisfied. The myoglobin-containing food freshness deterioration suppressing material or myoglobin-containing food discoloration suppressing material of the present invention here particularly highly exerts the effect of suppressing freshness deterioration and metmyoglobin formation of a myoglobin-containing food, and the antioxidant can be favorably kept in the substrate. In particular, the antioxidant preferably comprises one or more selected from the group consisting of a rosemary extract (preferably water-soluble rosemary extract) comprising rosmarinic acid in an amount satisfying the condition (I); a rosemary extract (preferably oil-soluble rosemary extract) comprising carnosol in an amount satisfying the condition (II); a rosemary extract (preferably oil-soluble rosemary extract) comprising carnosic acid in an amount satisfying the condition (III); a rosemary extract (preferably oil-soluble rosemary extract) comprising carnosol and carnosic acid in amounts satisfying the conditions (II) and respectively; and ascorbic acid in an amount satisfying the condition (IV). More preferably the antioxidant comprises one selected from the group. In the present invention, the amounts of rosmarinic acid, carnosol, carnosic acid and ascorbic acid are represented as the amounts of their free forms uless otherwise specified.

When the myoglobin-containing food freshness deterioration suppressing material or myoglobin-containing food discoloration suppressing material of the present invention is in contact with water or a myoglobin-containing food which contains water, the elution rate of the antioxidant from the substrate is not limited, and it preferably has the following characteristics:

(A) when the mass of the antioxidant per square meter area of the part in which the antioxidant is present, of the surface of the substrate in the myoglobin-containing food freshness deterioration suppressing material or myoglobin-containing food discoloration suppressing material of the present invention, is defined as T, and
one plate- or film-shaped sample piece of a square 5 cm on a side, of the myoglobin-containing food freshness deterioration suppressing material or myoglobin-containing food discoloration suppressing material, is immersed in a volume of 1000 mL of distilled water temperature of 4° C., the following characteristics are exhibited:
a mass of 0.05 T or more per square meter area of the part, preferably 0.10 T or more, more preferably 0.20 T or more, particularly preferably 0.30 T or more, and preferably 0.75 T or less, more preferably 0.65 T or less, particularly preferably 0.55 T or less, of the antioxidant, is eluted from the substrate into the distilled water at 10 seconds after the start of immersion, and
a mass of 0.15 T or more per square meter area of the part, preferably 0.20 T or more, more preferably 0.30 T or more, particularly preferably 0.40 T or more, and preferably 0.80 T or less, more preferably 0.70 T or less, particularly preferably 0.60 T or less, of the antioxidant, is eluted from the substrate into the distilled water 30 minutes after the start of immersion; and
(B) when the mass of the antioxidant per square meter area of the part in which the antioxidant is present, of the surface of the substrate in the myoglobin-containing food freshness deterioration suppressing material or myoglobin-containing food discoloration suppressing material of the present invention, is defined as T, and
a plate- or film-shaped sample piece of a square 5 cm on a side, of the myoglobin-containing food freshness deterioration suppressing material or myoglobin-containing food discoloration suppressing material, is attached onto the surface of skin (scale surface) or flesh of fish meat (in particular, fillet of yellowtail) comprising water, and the fish meat is placed together with the sample piece into a vacuum packaging bag, vacuum-packaged at a pressure in the chamber of a vacuum packaging machine, of −100 kPa (−1.0 bar) (gauge pressure), and preserved at 4° C., the following characteristics are exhibited:
when the sample piece is attached onto the surface of skin (scale surface), a mass of 0.01 T or more per square meter area of the part, preferably 0.20 T or more, more preferably 0.40 T or more, particularly preferably 0.50 T or more, and preferably 0.99 T or less, more preferably 0.95 T or less, of the antioxidant, is eluted from the substrate into the fish meat and/or the vacuum packaging bag 180 minutes after the start of preservation, and
when the sample piece is attached onto the surface of flesh, a mass of 0.01 or more per square meter area of the part, preferably 0.30 T or more, more preferably 0.50 T or more, particularly preferably 0.60 T or more, and preferably 0.99 T or less, more preferably 0.98 T or less, of the antioxidant, is eluted from the substrate into the fish meat and/or the vacuum packaging bag 180 minutes after the start of preservation.

In the characteristic (B), the followings are further preferable:
when the sample piece is attached onto the surface of skin (scale surface), a mass of 0.01 T or more per square meter area of the part, preferably 0.20 T or more, more preferably 0.40 T or more, particularly preferably 0.50 T or more, and preferably 0.99 T or less, more preferably 0.95 T or less, of the antioxidant, is eluted from the substrate into the fish meat and/or the vacuum packaging bag 10 minutes after the start of preservation, and
when the sample piece is attached onto the surface of flesh, a mass of 0.01 T or more per square meter area of the part, preferably 0.30 T or more, more preferably 0.50 T or more, particularly preferably 0.60 T or more, and preferably 0.99 T or less, more preferably 0.98 T or less, of the antioxidant, is eluted from the substrate into the fish meat and/or the vacuum packaging bag 10 minutes after the start of preservation.

The substrate in the myoglobin-containing food freshness deterioration suppressing material or myoglobin-containing food discoloration suppressing material of the present invention having the characteristic (A) and/or the characteristic (B) is preferably a substrate comprising a polyolefin-based resin or polyester-based resin, the polyolefin-based resin preferably comprises polyethylene, more preferably LLDPE (linear low-density polyethylene), and the polyester-based resin preferably comprises polyethylene terephthalate. The antioxidant in the myoglobin-containing food freshness deterioration suppressing material or myoglobin-containing food discoloration suppressing material of the present invention having the characteristic (A) and/or the characteristic (B) is not limited and is preferably a rosemary extract or rosmarinic acid, and the rosemary extract is here preferably a water-soluble rosemary extract. The amount T of the rosemary extract may be the amount obtained by conversion based on the amount of the compound (for example, rosmarinic acid, carnosol, and carnosic acid) comprised in the extract.

The myoglobin-containing food freshness deterioration suppressing material or myoglobin-containing food discoloration suppressing material of the present invention exhibiting the characteristic (A) and/or the characteristic (B) can allows the antioxidant to efficiently permeate into the myoglobin-containing food, and can suppress freshness deterioration not only at the surface of the food, but also at the inside the food. In addition, the migration rate of the antioxidant from the substrate to the myoglobin-containing food (a particular moiety of it) can be controlled.

The myoglobin-containing food freshness deterioration suppressing material or myoglobin-containing food discoloration suppressing material of the present invention can be appropriately compounded with, besides the substrate and the antioxidant, other compounds, such as a pH adjuster (which may be an inorganic salt or an organic salt, and for example, potassium carbonate, sodium carbonate, citrate, or malate can be used therefor), a colorant, a preserving agent, a flavoring agent, a spice, a sweetener, an acidulant, a seasoning agent, an antimicrobial agent (for example, nitrite), and other additives (for example, tocopherol, citric acid, dextrin, cyclodextrin, oligosaccharide, glycerin, glycerin fatty acid ester, ascorbic acid, erythorbic acid, a smoke solution, a fruit juice, and a food material).

In one embodiment of the present invention, further preferably, the myoglobin-containing food freshness deterioration suppressing material or myoglobin-containing food discoloration suppressing material contains, besides the antioxidant, no agent which binds to or interacts with myoglobin. The agent which binds to or interacts with myoglobin specifically includes an agent which binds to or interacts with myoglobin to produce, maintain or enhance a color derived from myoglobin. That is, in one embodiment of the present invention, the myoglobin-containing food freshness deterioration suppressing material or myoglobin-containing food discoloration suppressing material contains, besides the antioxidant, no agent which binds to or interacts with myoglobin to produce, maintain or enhance a color derived from myoglobin, in an amount which can allow the color derived from myoglobin to be produced, maintained or enhanced, more preferably includes, besides the antioxidant, none of the agent. Here, the "myoglobin" refers to a structure including undenatured myoglobin present in fresh fish meat, and includes, for example, deoxymyoglobin, oxymyoglobin, metmyoglobin, carboxymyoglobin and nitric oxide myoglobin. The "agent which binds to or interacts with myoglobin" and the "agent which binds to or interacts with myoglobin to produce, maintain or enhance a color derived from myoglobin" also include precursors which supply such agents. The "agent which binds to or interacts with myoglobin" and the "agent which binds to or interacts with myoglobin to produce, maintain or enhance a color derived from myoglobin" include the "myoglobin blooming agent" defined in Patent Literature 7 and the "nitrogen oxide-containing compound" described in Patent Literature 8, The "myoglobin blooming agent" disclosed in Patent Literature 7 is specifically at least one selected from the group consisting of a nitric oxide-donating compound, an inorganic cyanide compound, an inorganic fluoride, isothiocyanate, a bacterial culture that fixes nitrogen to provide a source of nitrogen oxide, betanine, erythrocine, a cochineal extract, a nitrogen heterocycle, a carbon monoxide-donating compound, a sulfur monoxide-donating compound, a nitrous oxide-donating compound, an ammonia-donating compound and a hydrogen sulfide-donating compound. The "nitrogen oxide-containing compound" described in Patent Literature 8 specifically includes nitrogen oxide, a nitrite compound, and a nitrate compound. The myoglobin-containing food freshness deterioration suppressing material or myoglobin-containing food discoloration suppressing material of the present invention further preferably does not contain an agent which binds to or interacts with myoglobin to produce, maintain or enhance a color derived from myoglobin in an amount which can allow the color derived from myoglobin to be procuded, maintained or enhanced, regardless whether the agent is an antioxidant or not.

In one embodiment of the present invention, further preferably, the antioxidant is a component other than at least one selected from the group consisting of a nitric oxide-donating compound, an inorganic cyanide compound, an inorganic fluoride, isothiocyanate, a bacterial culture that fixes nitrogen to provide a source of nitrogen oxide, betanine, erythrocine, a cochineal extract, a nitrogen heterocycle, a carbon monoxide-donating compound, a sulfur monoxide-donating compound, a nitrous oxide-donating compound, an ammonia-donating compound, a hydrogen sulfide-donating compound and a nitrogen oxide-containing compound.

In the present invention, the nitric oxide-donating compound, the inorganic cyanide compound, the inorganic fluoride, the isothiocyanate, the bacterial culture that fixes nitrogen to provide a source of nitrogen oxide, the betanine, the erythrocine, the cochineal extract, the nitrogen heterocycle, the carbon monoxide-donating compound, the sulfur monoxide-donating compound, the nitrous oxide-donating compound, the ammonia-donating compound and the hydrogen sulfide-donating compound each include one described in Patent Literature 7, The nitrogen oxide-containing compound includes one described in Patent Literature 8.

(Nitric Oxide-Donating Compound)

The nitric oxide-donating compound is a NO donor which provides a nitric oxide (NO) molecule. The nitric oxide-donating compound releases nitric oxide or is a precursor. Examples of the nitric oxide-donating compound include nitrate, nitrosodisulfonate, such as a Fremy's salt [NO(SO$_3$Na)$_2$ or NO(SO$_3$K)$_2$]; inorganic nitrate (MNO$_3$) including, as a suitable counter ion (M$^+$), an alkali metal (for example, sodium or potassium), an alkali earth metal (for example, calcium), a transition metal, a protonated primary, secondary or tertiary amine, or a quaternary amine or ammonium, such as saltpeter; and inorganic nitrite (MNO$_2$) including, as a suitable counter ion (M$^+$), an alkali metal (for example, sodium or potassium), an alkali earth metal (for example, calcium), a transition metal, a protonated primary, secondary or tertiary amine, or a quaternary amine or ammonium.

Other nitric oxide-donating compounds include nitric oxide-donating compounds disclosed in U.S. Pat. Nos. 6,706,274, 5,994,444 and 6,939,569, and U.S. Patent Publication No. 2005/0106380.

Other examples of the nitric oxide-donating compound include the following: organic nitroso compounds (containing a NO functional group attached to carbon), such as 3-ethyl-3-nitroso-2,4-pentanedione; organic nitro compounds (containing a NO$_2$ functional group attached to carbon), such as nitroglycerin and 6-nitrobenzo[α]pyrene; and organic nitrate (—O—NO$_2$), such as ethyl nitrate, glyceryl mono-, di- or trinitrate, pentaerythritol tetrainitrate, erythrityl tetrainitrate, isosorbide mono- or dinitrate and trinitrate.

Other examples of the nitric oxide-donating compound include the following: O-nitrosylated compounds (—O—NO), such as alkyl nitrites, for example, butyl nitrite, amyl nitrite and dodecyl nitrite, and dicyclohexylamine nitrite; S-nitrosylated compounds (—S—NO) also known as nitrosothiol, such as S-nitrosothioglycerol, S-nitroso-penicillamine, S-nitrosoglutathione, glutathione, S-nitrosylated derivatives of captopril, S-nitrosylated-protein, S-nitrosylated-peptide, S-nitrosylated-oligosaccharide and S-nitrosylated-polysaccharide; and N-nitrosylated compounds (—N—NO), such as N-nitrosoamine; N-hydroxy-N-nitrosoamine; and N-nitrosoimine.

Further examples of the nitric oxide-donating compound include nonoate compounds containing a functional group N(O)—NO (also similarly referred in the art to as N-oxo-N-nitroso compound, N-hydroxy-N'-diazeniumoxide, diazeniumdiolate (diolates) and NONOate"), such as 3,3,4,4-tetramethyl-1,2-diazetine 1,2-dioxide.

Further examples of the nitric oxide-donating compound include the following: transition metal/nitroso complexes, such as sodium nitroprusside, a dinitrosyl iron thiol complex, iron-sulfur cluster nitrosyl, ruthenium nitrosyl, a nitroso/home/transition metal complex and a nitroso ferrous protoporphyrin complex; furoxan, such as 1,2,5-oxadiazole N-oxide; benzofuroxan, oxatriazol-5-imine, such as 3-aryl-1,2,3,4-oxatriazol-5-imine; sydnonimine, such as molsidomine; oximes, such as cyclohexanone oxime; hydroxylamine, N-hydroxyguanidine, and hydroxyurea.

The nitric oxide-donating compound may donate one molecule of nitric oxide or multiple nitric oxide molecules. The nitric oxide-donating compound can also be a polymeric material which contains one or more nitric oxide-donating sites and which can release one or more nitric oxide molecules. Examples of such a polymeric material include one disclosed in U.S. Pat. No. 5,525,357, one disclosed in U.S. Pat. No. 5,770,645, and one disclosed in U.S. Pat. No. 6,087,479, The polymeric material which can release a nitric oxide molecule also includes a polymeric material including a nitric oxide-donating compound, and a polymeric material having a nitric oxide-donating functional group chemically bound to a polymer chain.

(Inorganic Cyanide Compound)

The inorganic cyanide compound includes inorganic cyanide compounds (MCN) including, as a counter ion (M'), an alkali metal (for example, sodium or potassium), an alkali earth metal (for example, calcium), a transition metal, a protonated primary, secondary or tertiary amine, or a quaternary amine or ammonium.

(Inorganic fluoride)

The inorganic fluoride includes inorganic fluoride (MF) including, as a counter ion ($M^+$), an alkali metal (for example, sodium or potassium), an alkali earth metal (for example, calcium), a transition metal, a protonated primary, secondary or tertiary amine, or a quaternary amine or ammonium.

(Isothiocyanate)

Examples of the isothiocyanate include mustard oil.

(Bbacterial Culture that Fixes Nitrogen to Provide a Source of Nitrogen Oxide)

Examples of the bacterial culture that fixes nitrogen to provide a source of nitrogen oxide include xanthine oxidase, nitrate reductase and nitrite reductase.

(Nitrogen Heterocycle)

Examples of the nitrogen heterocycle include the following: pyridine, pyrimidine (for example, dipyridamole), pyrazine, triazine, purine, nicotinamide, nicotinate, nicotinamide, niacin (known as nicotinic acid), isoquinoline, imidazole, and derivatives and salts thereof. Such a nitrogen heterocycle may also be substituted. Such pyridine and isoquinoline also include 3-carbonyl-substituted compounds. For example, the nitrogen heterocycle is pyridine, pyrimidine or imidazole. Furthermore, the nitrogen heterocycle is an alkali or alkali earth metal salt or ester of nicotinic acid, and the ester encompasses esters, such as methyl nicotinate, ethyl nicotinate, propyl nicotinate, butyl nicotinate, pentyl nicotinate, hexyl nicotinate, methyl isonicotinate, isopropyl isonicotinate and isopentyl isonicotinate. Furthermore, the nitrogen heterocycle is an alkali or alkali earth metal salt or ester of nicotinamide, or imidazole. In addition, the nitrogen heterocycle includes pyridine, pyrimidine, histidine, N-acetylhistidine, 3-butyroylpyridine, 3-valeroylpyridine, 3-caproylpyridine, 3-heptoylpyridine, 3-capryloylpyridine, 3-formylpyridine, nicotinamide, N-ethyl nicotinamide, N,N-diethyl nicotinamide, isonicotinic acid hydrazide, 3-hydroxypyridine, 3-ethylpyridine, 4-vinylpyridine, 4-bromoisoquinoline, 5-hydroxyisoquinoline or 3-cyanopyridine.

(Carbon Monoxide-Donating Compound, Sulfur Monoxide-Donating Compound, Nitrous Oxide-Donating Compound, Ammonia-Donating Compound and Hydrogen Sulfide-Donating Compound)

Carbon monoxide (CO), sulfur monoxide (SO), nitrous oxide ($N_2O$), ammonia ($NH_3$) and hydrogen sulfide (HS) act as respective ligands for myoglobin. The carbon monoxide-donating compound, sulfur monoxide-donating compound, nitrous oxide-donating compound, ammonia-donating compound and hydrogen sulfide-donating compound refer to respective compounds donating such ligands (namely, carbon monoxide, sulfur monoxide, nitrous oxide, ammonia and hydrogen sulfide) or respective compounds acting as substrates to form such ligands, examples thereof include ligand/heme/transition metal complexes and ligand/ferrous protoporphyrin complexes, and include, for example, when the ligand is carbon monoxide, carbon monoxidelheme/transition metal complexes and carbon monoxide/ferrous protoporphyrin complexes. The carbon monoxide-donating compound, sulfur monoxide-donating compound, nitrous oxide-donating compound and hydrogen sulfide-donating compound also encompass respective polymeric materials having functional groups donating carbon monoxide, sulfur monoxide, nitrous oxide, ammonia and hydrogen sulfide, chemically bound to the polymer chains.

1.4 Application of Myoglobin-Containing Food Freshness Deterioration Suppressing Material or Myoglobin-Containing Food Discoloration Suppressing Material of the Present Invention The myoglobin-containing food freshness deterioration suppressing material or myoglobin-containing food discoloration suppressing material of the present invention, when being in contact with the surface of a myoglobin-containing food, can supply the antioxidant to the food, and can suppress freshness deterioration, and discoloration due to oxidation of myoglobin in the food.

In the present invention, the "myoglobin-containing food" includes fish meat, whale flesh, horse meat, beef and pork containing myoglobin. The fish from which the fish meat containing myoglobin originates is not limited, and may be fish belonging to the family Carangidae, Scombridae, Clupeidae, Scomberesocidae or Sparidae. In the family Carangidae, fish belonging to the genus *Seriola* of the subfamily Naucratinae (hereinafter, referred to as "*Seriola*") or fish belonging to the genus *Trachurus* of the subfamily Caranginae is particularly preferable. As the fish belonging to the genus *Seriola*, yellowtail (*Seriola quinqueradiata*) or ruderfish (*Seriola dumerili*) is particularly preferable. As the fish belonging to the genus *Trachurus* of the subfamily Caranginae, jack mackerel (*Trachurus japonicus*) is preferable. In the family Scombridae, fish belonging to the genus *Katsuwonus* of the family Thunnini or fish belonging to the genus *Thunnus* of the family Thunnini is preferable. As the fish belonging to the genus *Katsuwonus* of the family Thunnini, bonito (*Katsuwortus pelamis*) is preferable. In the family Clupeidae, fish belonging to the genus *Sardinops* of the subfamily Clupeinae is particularly preferable. As the fish belonging to the genus *Sardinops* of the subfamily Clupeinae, true sardine (*Sardinops melanostictus*) is preferable. In the family Scomberesocidae, fish belonging to the genus *Cololabis* is particularly preferable. As the fish belonging to the genus *Cololabis*, saury (*Cololabis saira*) is particularly preferable. In the family Sparidae, fish belonging to the genus *Pagrus* of the subfamily Pagrinae is particularly preferable. As the fish belonging to the genus *Pagrus* of the subfamily Pagrinae, red sea bream (*Pagrus major*) is particularly preferable. Herein, while yellowtail may traditionally differ in nominal designation in Japan depending on the stage of growth, the term "yellowtail" herein refers to species of organism classified to *Seriola quinqueradiata*, regardless of a traditional nominal designation. That is, the fish meat which can be used as the myoglobin-containing food in the present invention includes fish meat of yellowtail, bonito/Tunas, jack mackerel, true sardine, saury, and red sea bream.

The fish meat typically includes a fish fillet, loin whose surface is partially covered with skin, loin from which skin is stripped, and a slice of fish having a proper shape cut out from fish. These types of fish meat are preferably of fish belonging to the family Carangidae, and more preferably of fish belonging to the genus *Seriola*, such as yellowtail and rudderfish.

With reference to FIG. 18, a typical example of fish meat which can be of interest of the present invention is described. FIG. 18A shows a round 180 as the entire of fish. FIG. 18B illustrates a dress 181 which is fish meat where the head, gills, internal organs and fins are removed from the round 180. FIG. 18C shows a fillet 111 which is fish meat where both sides of fish with the backbone being interposed therebetween are cut out. When no skin is stripped, one surface of the fillet 111 is covered with skin and the other surface thereof is exposed. FIG. 18D shows loins 182 and 183 as fish meat, obtained by cutting one fillet 11 in the direction of the backbone formed, to separate it to dorsal and ventral sides. The loins 182 and 183 may be partially covered with skin, or the skin thereof may be stripped. In the Figure, loin from which skin is stripped is shown as the dorsal loin 182, and loin having skin is shown as the ventral loin 183. In the present invention, the fish meat is preferably a fillet 111 whose surface is partially covered with skin, loin 183 whose surface is partially covered with skin, loin 182 from which skin is stripped, or a slice of fish (for example, indicated by numerical reference 10 in FIG. 1A).

A specific method of using the myoglobin-containing food freshness deterioration suppressing material or myoglobin-containing food discoloration suppressing material of the present invention comprises, as described below, bringing the myoglobin-containing food freshness deterioration suppressing material or myoglobin-containing food discoloration suppressing material of the present invention into contact with the surface of a myoglobin-containing food in a food package in which the myoglobin-containing food is packaged.

2. Food Package, and Preservation and Transport Thereof

A first embodiment of the food package of the present invention comprises at least:
  the myoglobin-containing food freshness deterioration suppressing material or myoglobin-containing food discoloration suppressing material of the present invention, having the above characteristics;
  a packaging material; and
  a myoglobin-containing food;
  wherein the myoglobin-containing food freshness deterioration suppressing material or myoglobin-containing food discoloration suppressing material and the myoglobin-containing food are packaged by the packaging material so that a surface of the substrate, covered with the antioxidant, and/or a surface of the layer in which the antioxidant is supported, of the myoglobin-containing food freshness deterioration suppressing material or myoglobin-containing food discoloration suppressing material, are/is in contact with at least a part of the surface of the myoglobin-containing food. The interior of the packaging material is preferably degassed.

The shape of the packaging material is not limited, and may be a bag shape as shown in the Figures or can be any shape. For example, it may be a shape of a tray or a wrapping film. The tray is preferably a container which can be in contact with the myoglobin-containing food, and the wrapping film is preferably a packaging film which can be in contact with the myoglobin-containing food.

Figure 1B:
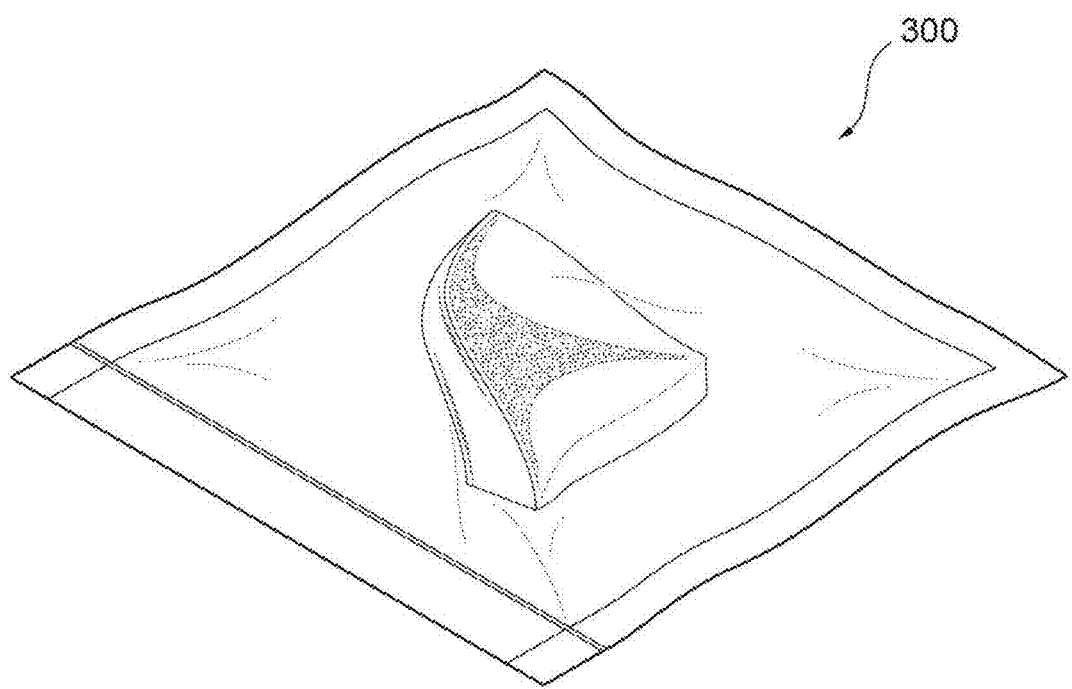
FIG. 1B is a schematic view illustrating one example of the food package of the present invention.

Specifically, as shown in FIGS. 1A and 1B, a food package 300 is prepared by packaging a film-shaped myoglobin-containing food freshness deterioration suppressing material or the myoglobin-containing food discoloration suppressing material 100 of the present invention and a myoglobin-containing food 10 (a slice of fish of yellowtail) by a packaging material 200 and degassing the interior of the packaging material 200. An antioxidant layer 101 (see FIG. 2) of each of the film-shaped myoglobin-containing food freshness deterioration suppressing material or the myoglobin-containing food discoloration suppressing material 100 is arranged so as to be in contact with the surface of the food 10. When the film-shaped myoglobin-containing food freshness deterioration suppressing material or the myoglobin-containing food discoloration suppressing material 100 and the food 10 are packaged by the packaging material 200, the interior of the packaging material 200 can be degassed for vacuum packaging, for example, tight packaging. Such tight packaging can discharge oxygen responsible for oxidation, thereby more effectively suppressing discoloration due to oxidation of myoglobin. The vacuum packaging method comprises placing the myoglobin-containing food in a bag-shaped packaging container through which air does not substantially permeate, and degassing the interior of the packaging container. The degassing step may be conducted, for example, by a nozzle degassing method (comprising evacuating air in a packaging container by a nozzle) and a chamber degassing method (comprising depressurizing a chamber by a vacuum packaging machine, degassing the interior of a packaging container, and then sealing a mouth portion). Vacuum packaging is mostly performed by the chamber degassing method. A manual or automatic rotary vacuum packaging machine can be used as the vacuum packaging machine. A water absorption sheet, a drip-adsorbing sheet, and the like can be, if necessary, added into the package, in addition to the myoglobin-containing food freshness deterioration suppressing material or myoglobin-containing food discoloration suppressing material of the present invention and the myoglobin-containing food.

A second embodiment of the food package of the present invention comprises at least:

a packaging material at least partially comprising the myoglobin-containing food freshness deterioration suppressing material or myoglobin-containing food discoloration suppressing material of the present invention, having the above characteristics; and a myoglobin-containing food;

wherein the myoglobin-containing food is packaged by the packaging material so that a surface of the substrate, covered with the antioxidant, and/or a surface of the layer in which the antioxidant is supported, of the myoglobin-containing food freshness deterioration suppressing material or myoglobin-containing food discoloration suppressing material comprised in the packaging material, are/is in contact with at least a part of the surface of the myoglobin-containing food. The interior of the packaging material is preferably degassed.

The packaging material at least partially comprising the myoglobin-containing food freshness deterioration suppressing material or myoglobin-containing food discoloration suppressing material can have any shape, and may, for example, have a shape of a bag, a tray, or a wrapping film, as long as it at least partially comprises the myoglobin-containing food freshness deterioration suppressing material or myoglobin-containing food discoloration suppressing material. The tray is preferably a container which can be in contact with the myoglobin-containing food, and the wrapping film is preferably a packaging film which can be in contact with the myoglobin-containing food.

Figure 10:
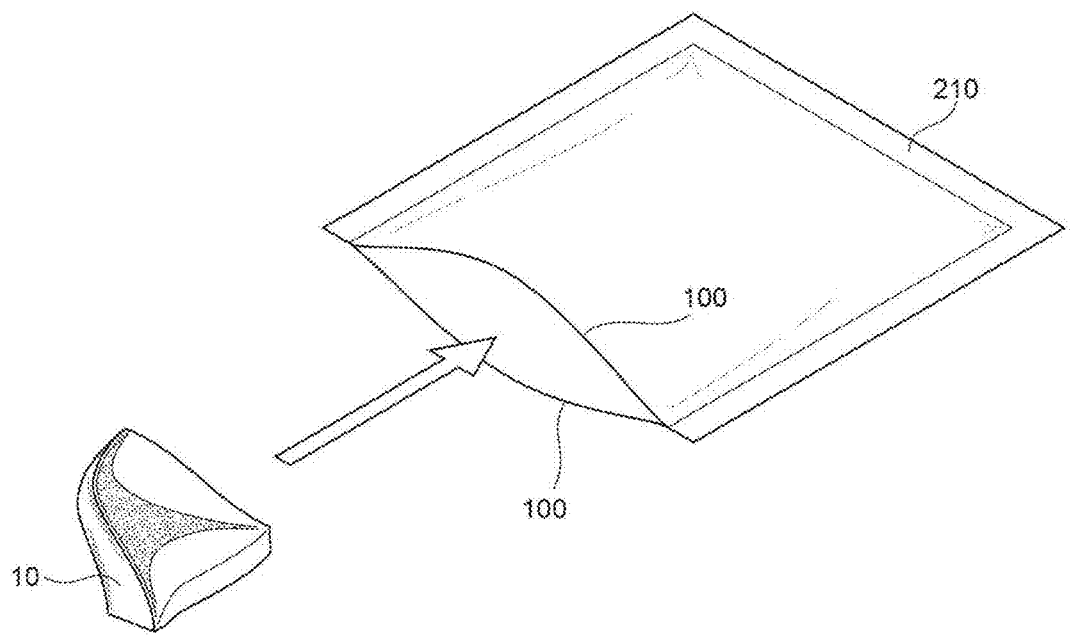
FIG. 10 is a schematic view for describing another example of the structure of the food package of the present invention.

For example, the second embodiment, as shown in FIG. 10, can use a bag-shaped packaging material 210 to package a myoglobin-containing food therein. The bag-shaped packaging material 210 is prepared by arranging two film-shaped myoglobin-containing food freshness deterioration suppressing materials or myoglobin-containing food discoloration suppressing materials 100 so as to allow a surface containing the antioxidant to face the interior of a bag, and then sealing the three sides. In the second embodiment, no additional myoglobin-containing food freshness deterioration suppressing material or myoglobin-containing food discoloration suppressing material 100, besides the packaging material 210, is necessary. However, such an additional material 100 may be provided (see, for example, a specific example shown in FIGS. 12A and 12B). The interior of the packaging material 210 can be appropriately degassed to package the food 10 under tight sealing, providing a food package 300 having the same appearance as that of the food package 300 of the first embodiment shown in FIG. 1B. In the second embodiment, a vacuum packaging method can be used, and additional elements, such as a water absorption sheet and a drip-adsorbing sheet, can be included in the package, in the same manner as in the first embodiment.

In the food packages of the first embodiment and the second embodiment, at least a part of the surface of the myoglobin-containing food may be covered with the myoglobin-containing food freshness deterioration suppressing material or myoglobin-containing food discoloration suppressing material. When the myoglobin-containing food is a fish fillet or loin partially having skin, it is preferable that at least a surface covered with skin of the fillet or loin is covered with the myoglobin-containing food freshness deterioration suppressing material or myoglobin-containing food discoloration suppressing material. When the myoglobin-containing food is a fish fillet or loin partially having skin, it is more preferable that the entire surface of the fillet or loin is covered with the myoglobin-containing food freshness deterioration suppressing material or myoglobin-containing food discoloration suppressing material, from a reason described later.

The food packages of the first embodiment and the second embodiment can be performed in combination. A food package according to a combination of the first embodiment and the second embodiment comprises at least:

a packaging material at least partially comprising the myoglobin-containing food freshness deterioration suppressing material or myoglobin-containing food discoloration suppressing material of the present invention, having the above characteristics;

an additional myoglobin-containing food freshness deterioration suppressing material or myoglobin-containing food discoloration suppressing material of the present invention, having the above characteristics, different from that comprised in the packaging material; and a myoglobin-containing food;

wherein the additional myoglobin-containing food freshness deterioration suppressing material or myoglobin-containing food discoloration suppressing material and the myoglobin-containing food are packaged by the packaging material so that a surface of the substrate, covered with the antioxidant, and/or a surface of the layer in which the antioxidant is supported, of the myoglobin-containing food freshness deterioration suppressing material or myoglobin-containing food discoloration suppressing material comprised in the packaging material, are/is in contact with at least a part of the surface of the myoglobin-containing food, and the additional myoglobin-containing food freshness deterioration suppressing material or myoglobin-containing food discoloration suppressing material and the myoglobin-containing food are packaged by the packaging material so that a surface of the substrate, covered with the antioxidant, and/or a surface of the layer in which the antioxidant is supported, of the additional myoglobin-containing food freshness deterioration suppressing material or the myoglobin-containing food discoloration suppressing material, are/is in contact with at least a part of the surface of the myoglobin-containing food.

Also in the combination of the first embodiment and the second embodiment, the interior of the packaging material is preferably degassed.

Hereinafter, with reference to FIG. 11A to FIG. 13B, additional specific examples of the food package 300 of the present invention according to the first embodiment or the second embodiment, or the combination thereof are described. Hereinafter, the "myoglobin-containing food freshness deterioration suppressing material or myoglobin-containing food discoloration suppressing material" is simply designated as "myoglobin-containing food freshness deterioration suppressing material".

Figure 11A:
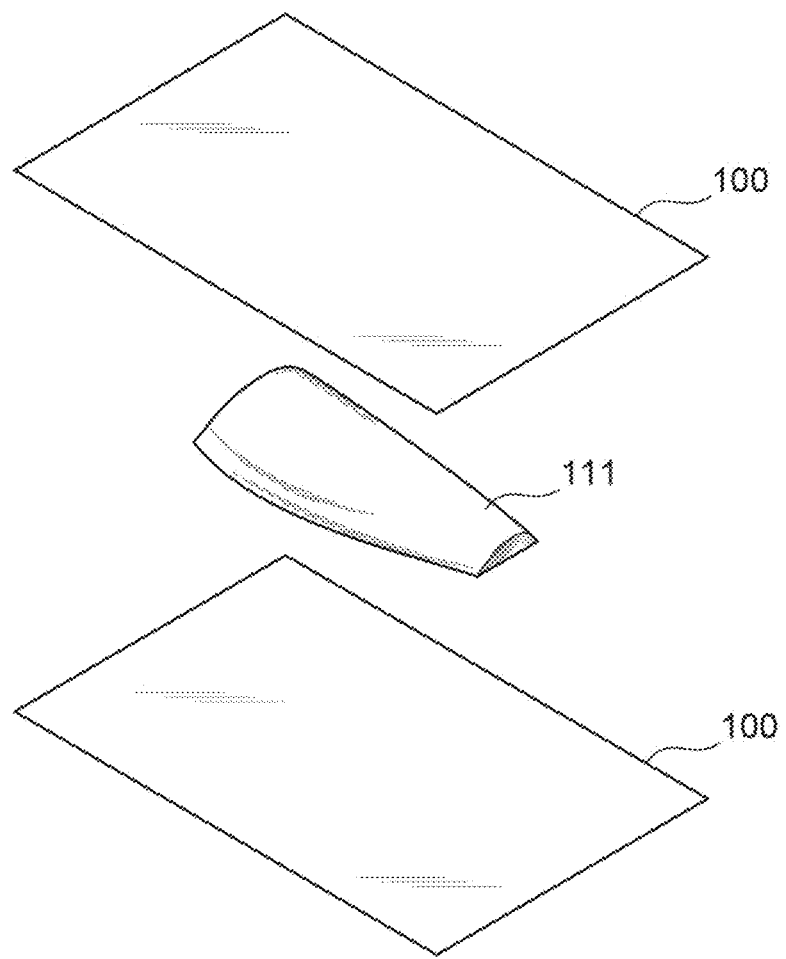
FIG. 11A is a schematic view for describing one example of the structure of the food package of the present invention.
Figure 11B:
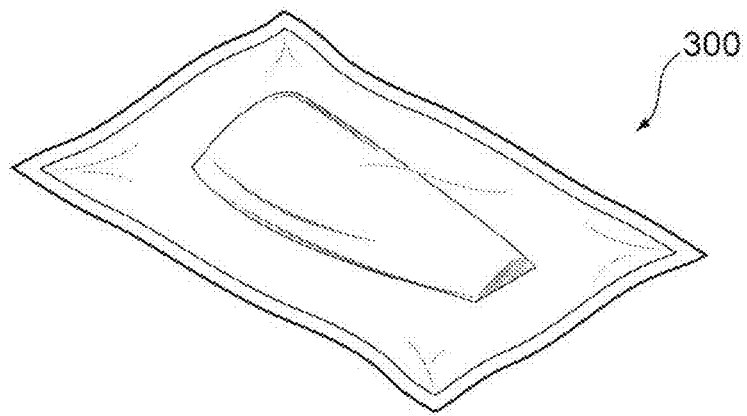
FIG. 11B is a schematic view illustrating one example of the food package of the present invention.

FIG. 11A and FIG. 11B show one specific example of the food package 300 according to the second embodiment. The specific example is an example where two film-shaped myoglobin-containing food freshness deterioration suppressing materials 100 are arranged so as to allow antioxidant layers 101 to face each other, a myoglobin-containing food 111 is interposed between the layers, and the peripheries of the myoglobin-containing food freshness deterioration suppressing materials 100 are closed by a procedure such as heat-sealing to provide a food package 300. The example shown in the Figures is an example where the two myoglobin-containing food freshness deterioration suppressing materials 100 are combined to form a packaging material, but is not limited thereto, and may be an example where an integrated continuous myoglobin-containing food freshness deterioration suppressing material 100 not separated forms a packaging material, or an example where three or more myoglobin-containing food freshness deterioration suppressing materials 100 are combined to form a packaging material. In addition, an example may be adopted where a bag or tube partially opened is prepared in advance by one or more myoglobin-containing food freshness deterioration suppressing materials 100 forming a packaging material, a myoglobin-containing food 111 is then arranged therein, and the opening of the bag or tube is closed to form a food package 300.

In the specific example of the food package 300 shown in FIG. 11A and FIG. 11B, a thick fish fillet or loin shown in FIGS. 11A and 11B can be used as the myoglobin-containing food 111. The fish fillet or loin may comprise skin (may include scale) on a part of the surface thereof. A fillet or loin of fish belonging to the family Carangidae (in particular, the genus *Seriola*) generally abundantly comprises dark colored flesh A in the vicinity of skin, as shown in the cross-section of the fillet in FIG. 4. When the myoglobin-containing food 111 is then a fish fillet or loin having skin, it is preferably arranged so that the antioxidant layers 101 of the myoglobin-containing food freshness deterioration suppressing materials 100 are each in contact with, at least, a surface of the fillet or loin covered with skin. That is, a portion of the packaging material, in contact with a surface of the fillet or loin, not having skin, does not necessarily comprise the antioxidant, and the portion may be other packaging material comprising no antioxidant layer, for example, a substrate film 105. A surface of the fillet or loin, closer to skin, however, is easily oxidized and the antioxidant in contact with the surface is easily deactivated, and therefore the myoglobin-containing food freshness deterioration suppressing materials 100 are preferably arranged so that the entire surface of the fillet or loin is in contact with the antioxidant layers 101.

Figure 12A:
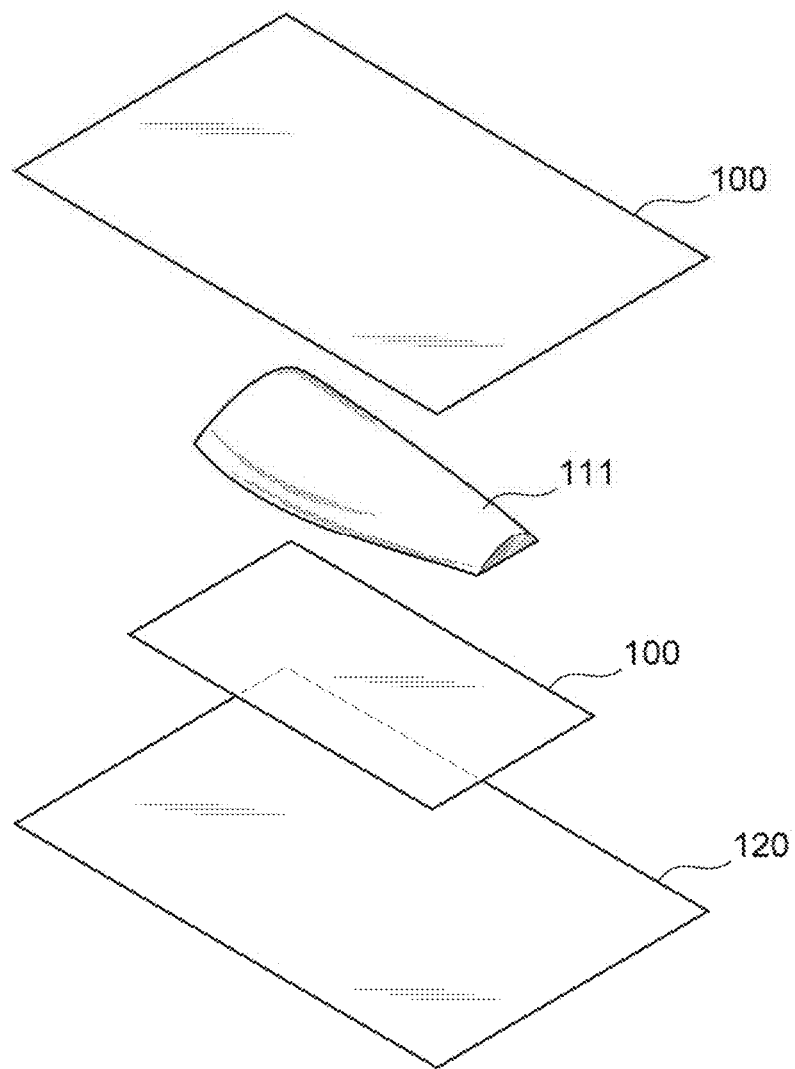
FIG. 12A is a schematic view for describing one example of the structure of the food package of the present invention.
Figure 12B:
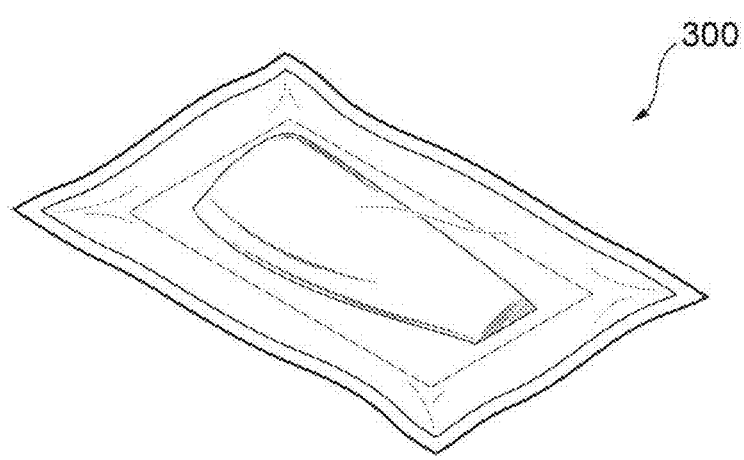
FIG. 12B is a schematic view illustrating one example of the food package of the present invention.

FIG. 12A and FIG. 12B show one specific example of the food package 300 according to the combination embodiment of the first embodiment and the second embodiment. The specific example is an example of a food package 300 in which a myoglobin-containing food 111 is packaged by a packaging material formed from a film-shaped myoglobin-containing food freshness deterioration suppressing material 100 and a film 120 comprising no antioxidant layer. In this example, an antioxidant layer 101 of the myoglobin-containing food freshness deterioration suppressing material 100 comprised in the packaging material is in contact with the myoglobin-containing food 111, and the periphery is sealed. Furthermore, an additional myoglobin-containing food freshness deterioration suppressing material 100 of the present invention, different from that comprised in the packaging material, is arranged so that an antioxidant layer 101 thereof is at least partially in contact with a surface of the myoglobin-containing food 111 (which surface does not contact with the myoglobin-containing food freshness deterioration suppressing material 100 comprised in the packaging material), and is packaged together with the myoglobin-containing food 111 by the packaging material. The periphery of the packaging material is closed by a procedure such as heat-sealing. The film 120 may any film that can be used for a food packaging material. For example, a substrate 105 which is the same as the substrate used in the myoglobin-containing food freshness deterioration suppressing material 100 except for comprising no antioxidant layer 101 can be used for the film 120. In the example shown in the Figures, one film-shaped myoglobin-containing food freshness deterioration suppressing material 100 and one film 120 are combined to form a packaging material, but the present invention is not limited to this embodiment. The myoglobin-containing food freshness deterioration suppressing material 100 and the film 120 may be integrally formed, or at least one of them is made of a plurality of films. In addition, an example may be adopted where a bag or tube partially opened is prepared in advance by the myoglobin-containing food freshness deterioration suppressing material 100 and the film 120 forming the packaging material, the myoglobin-containing food 111 and the additional myoglobin-containing food freshness deterioration suppressing material 100 are then arranged therein, and the opening of the bag or tube is closed to form the food package 300.

In the specific example of the food package 300 shown in FIG. 12A and FIG. 12B, the substrate in the myoglobin-containing food freshness deterioration suppressing material 100 comprised in the packaging material, and the substrate in the additional myoglobin-containing food freshness deterioration suppressing material 100 are different from each other. For example, a substrate 105 comprising, on the inner surface thereof, a layer of a polyolefin-based resin, preferably polyethylene, which is suitable for heat-sealing, can be used as the substrate 105 of the myoglobin-containing food freshness deterioration suppressing material 100 comprised in the packaging material, and a substrate 105 comprising a polyester-based resin, preferably polyethylene terephthalate, which is relatively inexpensive and high-strength, can be used as the substrate 105 of the additional myoglobin-containing food freshness deterioration suppressing material 100 different from that comprised in the packaging material.

A modification example of the specific example of the food package 300 shown in FIG. 12A and FIG. 12B includes an example without using the additional myoglobin-containing food freshness deterioration suppressing material 100 different from that comprised in the packaging material. The modification example is an example of the first embodiment. The modification example is suitable for the case where a partial surface of the myoglobin-containing food 111 (for example, a surface covered with skin of the fish fillet or loin having skin) is selectively brought into contact with the antioxidant layer 101.

Figure 13A:
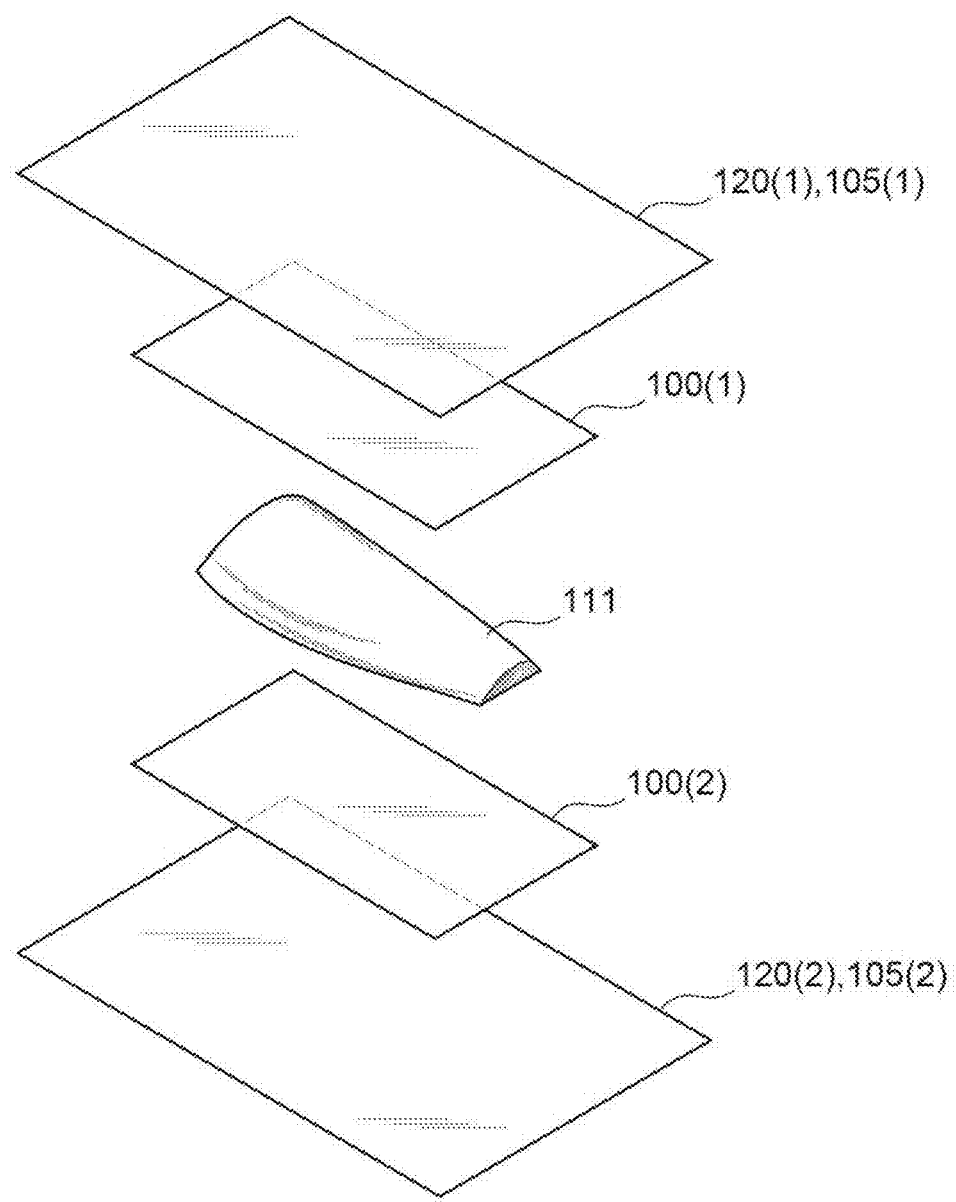
FIG. 13A is a schematic view for describing one example of the structure of the food package of the present invention.
Figure 13B:
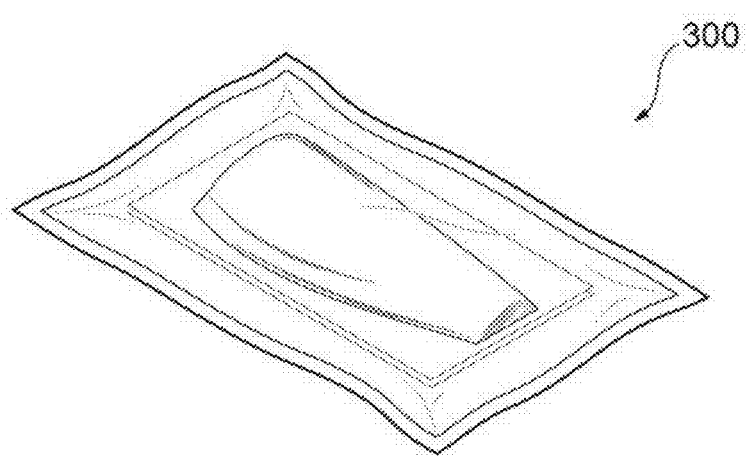
FIG. 13B is a schematic view illustrating one example of the food package of the present invention.

FIG. 13A and FIG. 13B show one specific example of the food package 300 of the first embodiment. The specific example is an example where a myoglobin-containing food 111, and two film-shaped myoglobin-containing food freshness deterioration suppressing materials 100 (1), 100 (2) are arranged so that antioxidant layers 101 of the two film-shaped myoglobin-containing food freshness deterioration suppressing materials 100 (1), 100 (2) are each in contact with the surface of the myoglobin-containing food 111, and are packaged by a packaging material formed by two films 120 (1), 120 (2). While numerical references 100 (1), 100 (2), and numerical references 120 (1), 120 (2) are each conveniently used in FIG. 13A in order to distinguish the two films, both numerical references 100 (1), 100 (2) are designated as "100" and both numerical references 120 (1), 120 (2) are designated as "120" when the two films are not required to be distinguished. The film 120 is not limited as long as it can be used as a food packaging material, and fir example, a substrate 105 which is the same as that for use in the myoglobin-containing food freshness deterioration suppressing material 100 except for comprising no antioxidant layer 101 can be used therefor. The example shown in the Figures is an example where the two films 120 are combined to form a packaging material, but is not limited thereto, and may be an example where an integrated continuous film 120 not separated forms a packaging material, or an example where three or more films 120 are combined to form a packaging material. In addition, an example may be adopted where a bag or tube partially opened is prepared in advance by one or more films 120 forming a packaging material, a myoglobin-containing food 111 and a myoglobin-containing food freshness deterioration suppressing material 100 are then arranged therein, and the opening of the bag or tube is closed to form a food package 300. Furthermore, the example shown in the Figures is an example where the two film-shaped myoglobin-containing food freshness deterioration suppressing materials 100 are used, but is not limited thereto, and may be an example where an integrated continuous film-shaped myoglobin-containing food freshness deterioration suppressing material 100 not separated, or three or more film-shaped myoglobin-containing food freshness deterioration suppressing materials 100 are in contact with a myoglobin-containing food 111. Each of the film-shaped myoglobin-containing food freshness deterioration suppressing materials 100 may have a bag or tube shape containing the myoglobin-containing food 111 inside.

A modification example of the specific example of the food package 300 shown in FIG. 13A and FIG. 13B includes an example where at least one of the two myoglobin-containing food freshness deterioration suppressing materials 100 (1), 100 (2) is omitted. The modification example is suitable for the case where a partial surface of the myoglobin-containing food 111 (for example, a surface covered with skin of the fish fillet or loin having skin) is selectively brought into contact with the antioxidant layer 101.

In each of the specific examples described in FIG. 11A to FIG. 13B and the modification examples thereof, a vacuum packaging method can be used, and additional elements, such as a water absorption sheet and a drip-adsorbing sheet, can be comprised in the package, in the same manner as in the first embodiment.

In the food package 300 according to the first embodiment, the second embodiment or the combination thereof, a part or all of the myoglobin-containing food freshness deterioration suppressing material 100 can be replaced with the myoglobin-containing food freshness deterioration suppressing material 400 including the first resin layer 401 in which the antioxidant is supported, shown in FIG. 3. For this case, the description with respect to the food package 300 according to the first embodiment, the second embodiment or the combination thereof, or the specific example thereof should be understood by replacing the antioxidant layer 101 of the myoglobin-containing food freshness deterioration suppressing material 100 with the first resin layer 401 supporting the antioxidant of the myoglobin-containing food freshness deterioration suppressing material 400.

The present invention also relates to a method for preserving and/or transporting the food package of the present invention, comprising a step of preserving and/or transporting the food package under a temperature condition of −30° C. to +10° C.

When the method comprises a step of preserving and/or transporting the food package under a temperature condition of −30° C. to −10° C., the step preferably comprises a first step of preserving the food package under a temperature condition of −5 to +8° C. for 0.1 to 10 hours, preferably 0.5 to 7 hours, further preferably 1 to 5 hours, and thereafter a second step of preserving and/or transporting it under a temperature condition of −30° C. to −10° C. The first step can be performed before the second step which is performed under a freezing condition. Performing the first step before the second step can further suppress deterioration in color of the myoglobin-containing food as compared with the case where the second step is directly performed. The reason is considered that performing the first step prior to the second step allows the antioxidant to efficiently permeate into the myoglobin-containing food, and increases the effect of the antioxidant. In addition, the myoglobin-containing food is sufficiently cooled in the first step and then frozen in the second step, and therefore the efficiency of freezing is high enough to allow the variation in freshness to be hardly caused in the myoglobin-containing food.

The food package frozen of the present invention is thawed by a proper thawing method, and is then used for an eating application. The thawing method that can be used may be a water thawing method (1), an air thawing method (2) or an electrical thawing method (3). The water thawing method (1) may, for example, be water-immersion thawing (running water thawing, foam thawing), spray thawing (watering), or steam thawing. The air thawing method (2) may, for example, be still air thawing, or flowing air thawing (air blast thawing). The electrical thawing method (3) may, for example, be ultrahigh frequency thawing (for example, frequencies of 13, 27, and 40 MHz), microwave thawing (microwave thawing, for example, a frequency of 2,450 MHz (in Japan)). Among them, thawing (still air thawing) by standing in a refrigerator (4° C.), thawing (water-immersion thawing) in flowing water or water, where water is allowed to be touched with a package frozen, or thawing (water-immersion thawing) in which frozen fish taken out from a package is immersed in salt water (1 to 2%, 4 to 40° C.) is preferable.

3. Quantitative Determination of Amount of Antioxidant Comprised in Myoglobin-Containing Food Freshness Deterioration Suppressing Material or Myoglobin-Containing Food Discoloration Suppressing Material of the Present Invention The amount of the antioxidant comprised in the myoglobin-containing food freshness deterioration suppressing material or myoglobin-containing food discoloration suppressing material of the present invention can be determined by extracting the antioxidant with a proper solvent, and analyzing the amount of the constitutive component of the antioxidant in the extraction liquid. The extraction method of the antioxidant and the measurement method of the constitutive component are not limited.

The myoglobin-containing food freshness deterioration suppressing material or myoglobin-containing food discoloration suppressing material of the present invention may comprise a composition comprising a plurality of components, such as a plant extract, as the antioxidant. If the ratio of the components present in this composition is known, the amount of the composition (antioxidant) can be calculated by conversion based on the measurement values of the components eluted from the material of the present invention.

The water-soluble rosemary extract comprises a large amount of rosmarinic acid. The oil-soluble rosemary extract comprises large amounts of carnosol and carnosic acid. Rosmarinic acid, carnosol and carnosic acid can be extracted by sufficiently immersing the myoglobin-containing food freshness deterioration suppressing material or myoglobin-containing food discoloration suppressing material in methanol, and the amounts thereof can be quantitatively determined by a common method, such as UHPLC (ultrahigh performance liquid chromatography). The following section describes quantitative determination of the amounts of rosmarinic acid, carnosol and carnosic acid in the myoglobin-containing food freshness deterioration suppressing material or myoglobin-containing food discoloration suppressing material in which one surface of a film-shaped or plate-shaped substrate is coated with the water-soluble rosemary extract or the oil-soluble rosemary extract. The following section also describes an example of converting the results of the quantitative determination into the amount of the water-soluble rosemary extract or the oil-soluble rosemary extract. But this example is merely exemplary.

3.1. Quantitative Determination of Amounts of Rosmarinic Acid, Carnosol and Carnosic Acid, and Plant Extract Comprising Them (1) Extraction Method (Elution Test Method)

A film-shaped or plate-shaped myoglobin-containing food freshness deterioration suppressing material cut to a size of 5 cm×5 cm is placed in a thick zipper bag of 12 cm×17 cm. Furthermore, 10 mL of methanol is added thereto by injection, and the chuck of the zipper bag is closed so that air is evacuated as much as possible. The bag is shaken by hand several times and the supernatant liquid is filtered by a non-aqueous 0.2-μm chromato disc. The filtrate is appropriately diluted and subjected to measurement.

(2) Measurement Method

The elution test solution is subjected to UHPLC measurement. The measurement conditions are as shown below, and the concentration of rosmarinic acid in the test solution is determined with the standard peak area obtained by chromatogram based on the calibration curve, and calculated as the content per unit area.

Amount of rosmarinic acid (g/m$^2$)=Measurement value (mg/L)×Amount of extraction liquid of 0.01 (L)/Sample area of 0.0025 (m$^2$)×Dilution factor/100

Herein, rosmarinic acid produced by Wako Pure Chemical Industries, Ltd. is used as the standard substance for the calibration curve.

Carnosol and carnosic acid can also be detected by UHPLC under the following conditions. The respective carnosol and carnosic acid concentrations in the test solution can be determined using the calibration curves to calculate the respective contents per unit area based on the same formula as that of rosmarinic acid.

When the content of rosmarinic acid, carnosol or carnosic acid in the rosemary extract is known, it can be converted to the content of the rosemary extract based on the content per unit area, measured, of rosmarinic acid, carnosol or carnosic acid. The present inventors have separately confirmed that the water-soluble rosemary extract (RM-21A base) used in Tests 2 and 3 contains rosmarinic acid in a concentration of 9.2% by mass, and the oil-soluble rosemary extract (RM-21B base) used in Test 2 contains carnosol in a concentration of 12% by mass and carnosic acid in a concentration of 7.4% by mass.

When the myoglobin-containing food freshness deterioration suppressing material or myoglobin-containing food discoloration suppressing material of the present invention contains the water-soluble rosemary extract or the oil-soluble rosemary extract, the content per unit area of the water-soluble rosemary extract or the oil-soluble rosemary extract can be obtained by conversion with the following formula based on the weight per unit area (g/m$^2$) of rosmarinic acid, carnosol or carnosic acid, measured by the above procedure. When the contents of rosmarinic acid, carnosol and carnosic acid in the extract are different, the amount of the extract by conversion can be similarly calculated depending on the contents.

Amount of water-soluble rosemary extract converted in terms of rosmarinic acid (g/m$^2$)=Amount of rosmarinic acid (g/m$^2$)/0.092

Amount of oil-soluble rosemary extract converted in terms of carnosol (g/m$^2$)=Amount of carnosol (g/m$^2$)/0.12

Amount of oil-soluble rosemary extract converted in terms of carnosic acid (g/m$^2$)=Amount of carnosic acid (g/m$^2$)/0.074

(3) UHPLC Measurement Conditions

Apparatus: ultrahigh performance chromatography apparatus: Nexera X2 (manufactured by Shimadzu Corporation)
Column: Kinetex 1.7 μm C18 100A (2.1 mmI.D.×50 mmL.) manufactured by Corporation
Column temperature: 40° C.
Mobile phase: 0.05% trifluoroacetic acid/acetonitrile=A/B
Mobile phase conditions:
 0 to 2 minutes=solvent B (acetonitrile), concentration: 20% to 45%
 2 minutes to 10 minutes=solvent B, concentration: 45%
 10 minutes to 10.1 minutes=solvent B, concentration: 45% to 20%
 10.1 minutes to 13 minutes=solvent B, concentration: 20%
Flow rate of mobile phase: 0.6 mL/min
Pump temperature: room temperature
Measurement time: 13 minutes
Amount of injection: 1 μL
Detector: PDA detector (210 nm)

EXAMPLES

1. Test 1

<Specimen Sampling>

Figure 4:
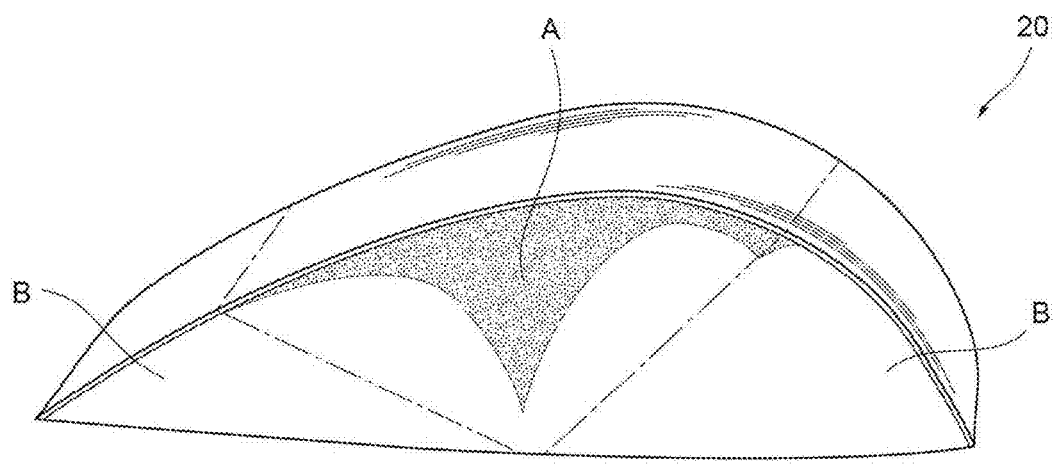
FIG. 4 is a view illustrating a first fish meat piece of yellowtail used in each of Examples and Comparative Examples in Test 1.

An unprocessed yellowtail weighing 3.5 kg was used. The yellowtail, delivered alive, was immediately killed and filleted into three slices. The fillet (about 1 kg) was cut in an approximately perpendicular direction to a longitudinal direction to obtain the first fish meat piece having an about 2 cm thickness (FIG. 4, 20). A part comprising the dark meat portion (FIG. 4, part A) from the first fish meat piece 20 was saved to prepare the second fish meat piece and the remaining parts (FIG. 4, parts B) were removed. Subsequently, the second fish meat piece (an about 2 cm thickness) was cut into two specimens (specimen A and specimen B) having an about 1 cm thickness each to be used for the following tests. The specimen A was used for a control test, whereas the specimen B was used for a test for confirming the effect of different discoloration suppressing agents under the condition of 4"C.

<Discoloration Suppressing Film>

An antioxidant was gravure printed on an LLDPE surface of a laminated film composed of LLDPE (Linear Low Density Polyethylene) and PA (Nylon 6) laminated through a PE (polyethylene) adhesion layer. This film was then cut to a square, 10 cm each side, and used as the discoloration suppressing film.

The laminated film of LLDPE and PA: the film used had a structure of the 60 μm thickness LLDPE (Linear Low Density Polyethylene) layer, the 20 μm thickness PE (polyethylene) adhesion layer and the 15 μm thickness PA (Nylon 6) layer laminated in this sequence. The LLDPE surface of the laminated film was not corona treated.

FIG. 2 is a schematic diagram showing the section of the obtained discoloration suppressing film. The discoloration suppressing film 100 consists of the antioxidant layer 101, the LLDPE (Linear Low Density Polyethylene) layer 102, the PE (polyethylene) adhesion layer 103 and the PA (Nylon 6) layer 104. The antioxidant layer 101 was formed by gravure printing in the following procedures.

Gravure printing procedures: the antioxidant was added to an ethanol aqueous solution (90% or 95% aqueous solution) to produce a slurry solution (a slurry solution concentration was adjusted so that the concentration of the antioxidant on the film shown in Table 1 was achieved after a later step of transferring the antioxidant onto the film) The slurry solution was affixed onto an image carrier to transfer the antioxidant on the film (roll printing). The film on which the antioxidant was transferred was subsequently dried with hot air at 90° C. to 130° C. for 2 to 3 seconds.

Rosemary extracts and a tea extract were used as the antioxidants.

The rosemary extract used was a commercial rosemary extract composition, Mitsubishi-Kagaku Foods Corporation "RM-21A", (rosemary extract/dextrin=10 mass %/90 mass %).

The rosemary extract contained in this composition was obtained by being extracted from leaves or flowers of rosemary (*Rosmarinus officinalis* L.) belonging to Lamiaceae and purified. The effective components are phenolcarboxylic acids (including rosmarinic acid) and flavonoids (including luteolins). The rosemary extract composition is a powder, easily dissolved in water, ethanol (an ethanol aqueous solution with a purity of 50% or less), propylene glycol (a propylene glycol aqueous solution with a purity of 80% or less) and insoluble in oils and fats.

The tea extract used was a commercial tea extract composition, Mitsubishi-Kagaku Foods Corporation "Sunfood 100", (tea extract 100%).

The tea extract in this composition is green tea polyphenol extracted from leaves of green tea (*Camellia sinensis* (L.) Kuntze) and purified.

The amount of the rosemary extract and the tea extract applied to the discoloration suppressing film and the concentration thereof in the aqueous solution are calculated when the entire weight of the above composition is considered the weight of the extract. In other words, when inactive components, such as dextrin, are contained in the composition, the inactive components are also considered as a part of the extract and the amount applied and the concentration are calculated based thereon.

<Vacuum Packing>

A laminated film consisting of a 60 μm thickness LLDPE (Linear Low Density Polyethylene) layer, a 20 μm thickness PE (polyethylene) adhesion layer and a 15 μm thickness PA (Nylon 6) laminated in this sequence was cut to be a 15 cm×15 cm square film piece, two such film pieces were prepared and arranged to oppose against each other with the LLDPE surface of each film piece facing inside, and three sides thereof were heat sealed to produce a 15 cm×15 cm three-side sealed bag (three-side sealed bag 200 shown in FIG. 1A), which was used as a bag for vacuum packing.

Vacuum-sealing was achieved at 0.1 atm (101 hPa) or less using a RENIACOM CO., LTD. vacuum packer chamber (RVM-C35).

<Measurement Method for a* Value>

A yellowtail piece specimen was placed on a scanner after a predetermined storage period has passed and an image was scanned in such a way that light does not come through gaps of the scanner. The captured image was measured for the visual chromaticity (a* value) using Adobe photoshop CS5. The measurement for the a* value was conducted at five spots per piece. The spots for the measurement were limited to the dark meat of the piece. The average value of measured values at the spots was used as the numerical value representing the color of the dark meat.

Example 1

The discoloration suppressing films 100, on which the rosemary extract composition was printed in an amount applied of 5.25 g/m$^2$, were affixed onto both cut surfaces of the yellowtail specimen 10 as schematically shown in FIG. 1A in such a way that the antioxidant layer 101 (the layer containing the rosemary extract) contacts the yellowtail specimen 10, and the film-affixed specimen was enclosed and vacuum-packed in the three-side sealed bag 200. FIG. 1B shows the vacuum-packed package 300.

Of the yellowtail specimen A and the yellowtail specimen B obtained from a single second fish meat piece, a package 300 enclosing the yellowtail specimen B, as the above yellowtail specimen 10, was stored immediately after the package 300 was formed under an atmosphere at 4° C. (refrigerator) for 5 days (120 hours). 120 hours later from the start of storage, the yellowtail specimen B was taken out from the vacuum-sealed package, measured for the a* value and observed for the shape.

Figure 5:
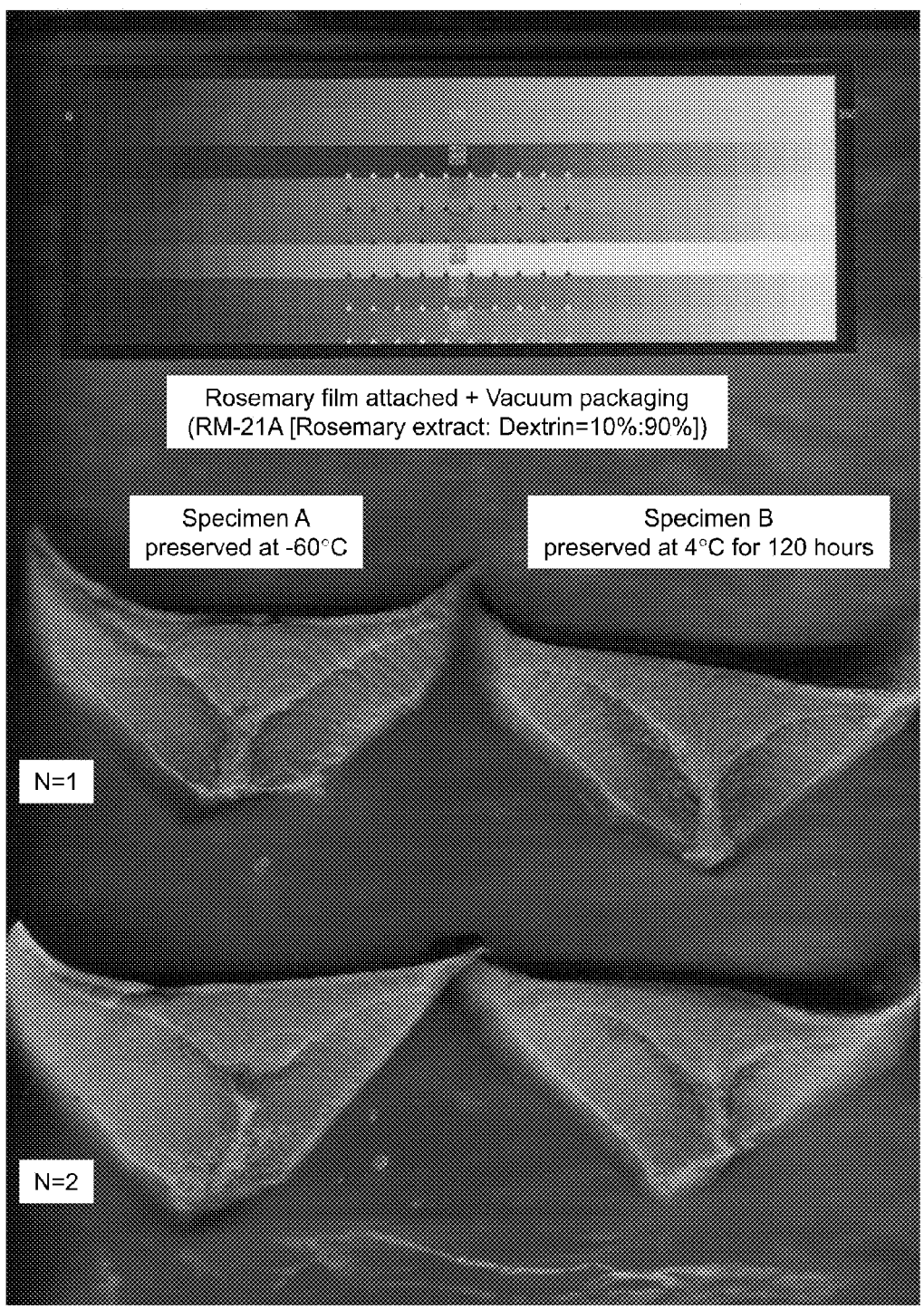
FIG. 5 is a photograph showing a yellowtail specimen (Example 1) before and after the preservation test in Test 1.

The yellowtail specimen A obtained from the same second fish meat piece as the yellowtail specimen B was enclosed, as a control test, in the three-side sealed bag 200 shown in FIG. 1A and stored immediately after vacuum-sealed at a temperature at which the metmyoglobin formation does not proceed (−60° C.). At the time of analyzing the yellowtail specimen B, the yellowtail specimen A was thawed under running tap water for 5 to 10 minutes and taken out from the vacuum-sealed package. The yellowtail specimen A was measured for the a* value and observed for the shape along with the yellowtail specimen B. The results are shown in Table 1 and FIG. 5.

Example 2

The discoloration suppressing films 100, on which the tea extract composition was printed in an amount applied of 2.60 g/m$^2$, were affixed onto both cut surfaces of the yellowtail specimen 10 as schematically shown in FIG. 1A in such a way that the antioxidant layer 101 (the layer containing the tea extract) contacts the yellowtail specimen 10, and the film-affixed specimen was enclosed and vacuum-packed in the three-side sealed bag 200. FIG. 1B shows the vacuum-packed package 300.

Of the yellowtail specimen A and the yellowtail specimen B obtained from a single second fish meat piece, a package 300 enclosing the yellowtail specimen B, as the above yellowtail specimen 10, was stored immediately after formed under an atmosphere at 4° C. (refrigerator) for 5 days (120 hours). 120 hours later from the start of storage, the yellowtail specimen B was taken out from the vacuum-sealed package, measured for the a* value and observed for the shape.

Figure 6:
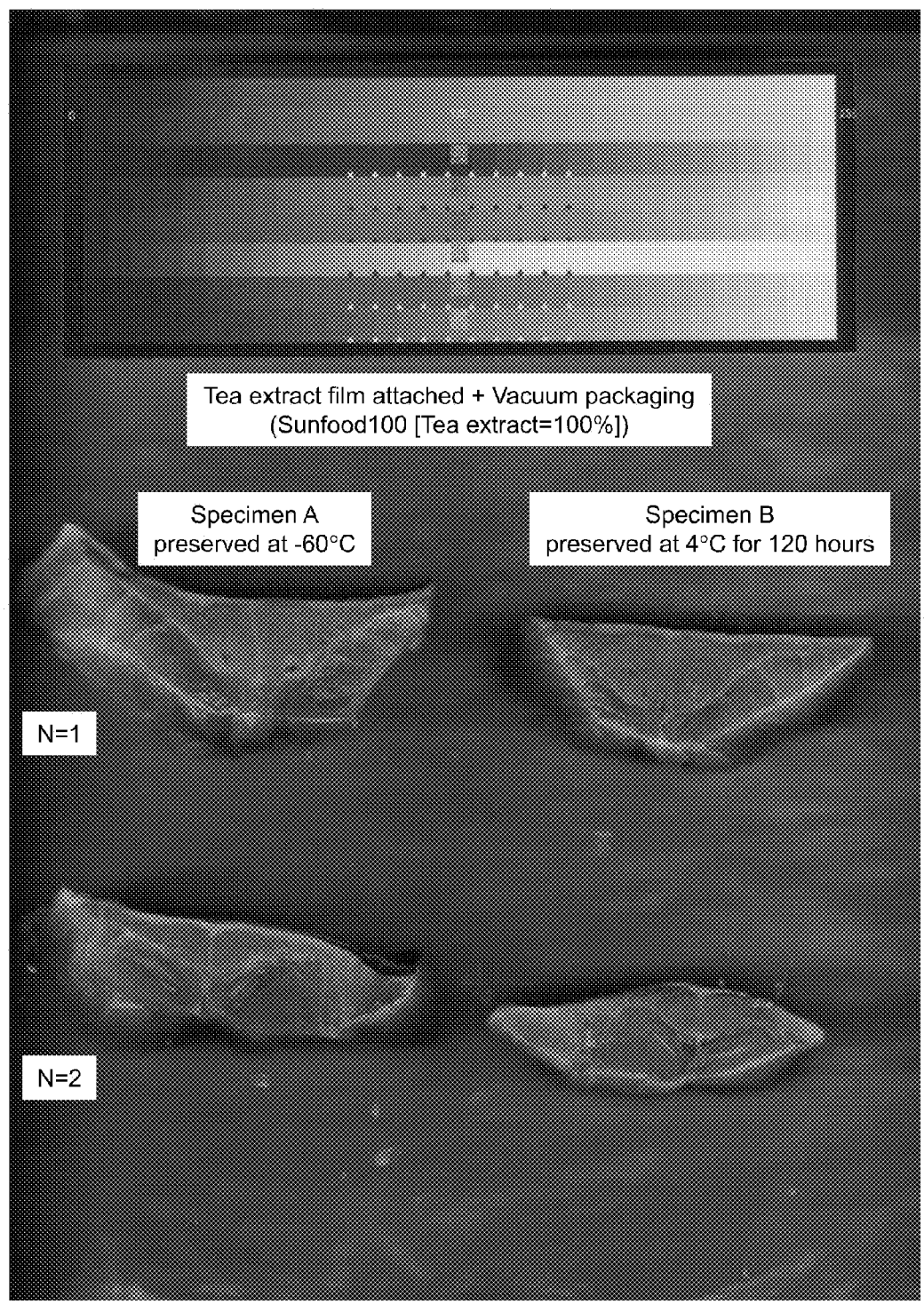
FIG. 6 is a photograph showing a yellowtail specimen (Example 2) before and after the preservation test in Test 1.

The yellowtail specimen A obtained from the same second fish meat piece as the yellowtail specimen B was enclosed, as a control test, in the three-side sealed bag 200 shown in FIG. 1A and stored immediately after vacuum-sealed at a temperature at which the metmyoglobin formation does not proceed (−60° C.) At the time of analyzing the yellowtail specimen B, the yellowtail specimen A was thawed under running tap water for 5 to 10 minutes and taken out from the vacuum-sealed package to measure the a* value and observe the shape along with the yellowtail specimen B. The results are shown in Table 1 and FIG. 6.

Comparative Example 1

Of the yellowtail specimen A and the yellowtail specimen B obtained from a single second fish meat piece, the yellowtail specimen B was left to stand in a container made of stainless steel together with a paper towel thoroughly wet with water for preventing from drying, sealed using a food wrapping plastic film and then stored under an atmosphere at 4° C. (refrigerator) for 5 days (120 hours). 120 Hours later from the start of storage, the yellowtail specimen B was measured for the a* value and observed for the shape.

Figure 7:
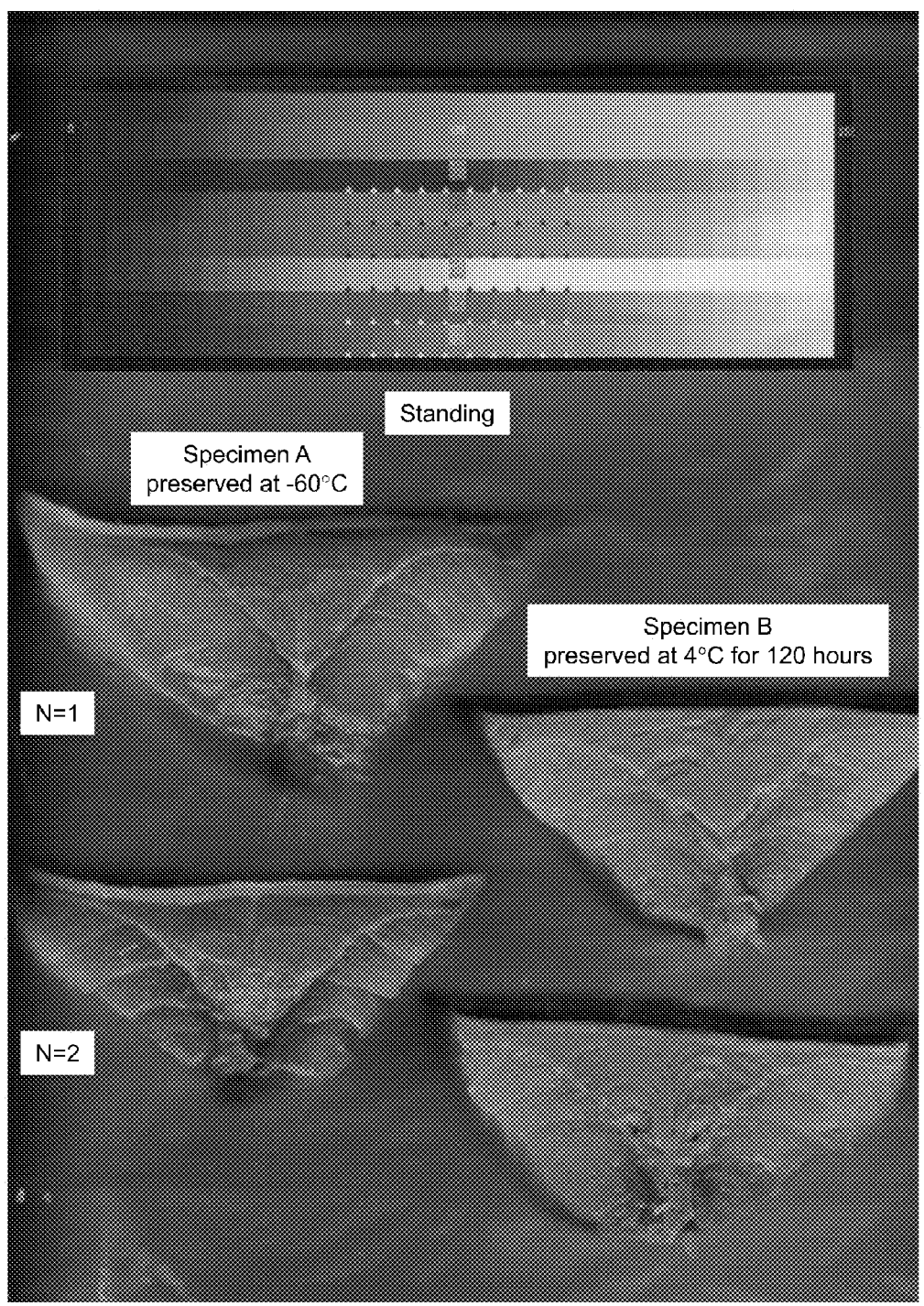
FIG. 7 is a photograph showing a yellowtail specimen (Comparative Example 1) before and after the preservation test in Test 1.

The yellowtail specimen A obtained from the same second fish meat piece as the yellowtail specimen B was enclosed, as a control test, in the three-side sealed bag 200 shown in FIG. 1A and stored immediately after vacuum-sealed at a temperature at which the metmyoglobin formation does not proceed (−60° C.). At the time of analyzing the yellowtail specimen B, the stored yellowtail specimen A was thawed under running tap water for 5 to 10 minutes and measured for the a* value and observed for the shape along with the yellowtail specimen B. The results are shown in Table 1 and FIG. 7.

Comparative Example 2

Of the yellowtail specimen A and the yellowtail specimen B obtained from a single second fish meat piece, the yellowtail specimen B was immersed at 4° C. for 20 hours in an aqueous solution of the rosemary extract composition (containing 0.1 mass % of the rosemary extract composition to the total amount of aqueous solution). After immersed, the yellowtail specimen B was taken out, lightly drained off water, subsequently vacuum-packed and stored under an atmosphere at 4° C. (refrigerator) for 100 hours. 100 hours later from the start of storage, the yellowtail specimen B was taken out from the vacuum-sealed package, measured for the a* value and observed for the shape. The vacuum-packing was achieved by the same method as in Example 1, except that two sheets of the discoloration suppressing film 100 were not used.

Figure 8:
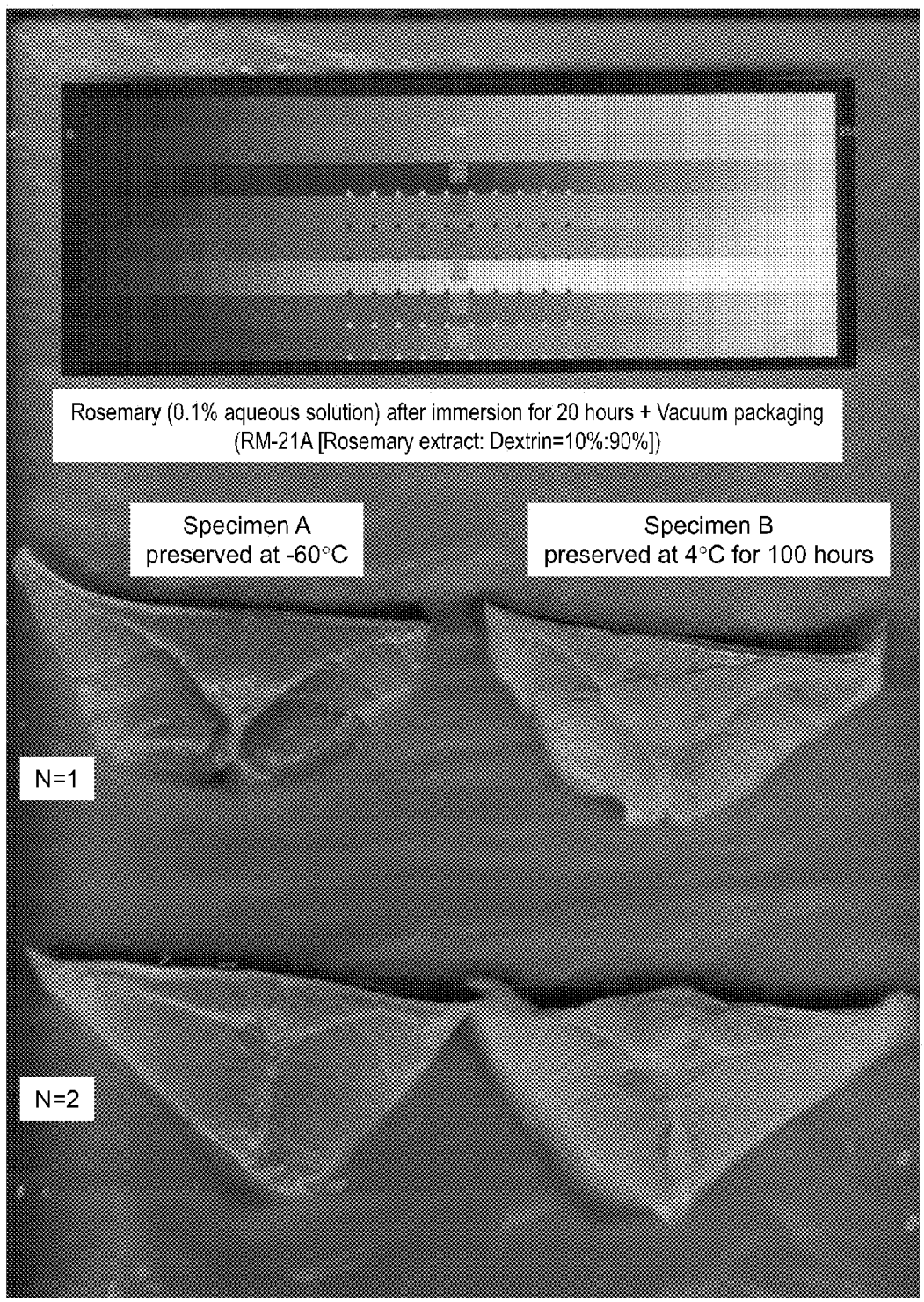
FIG. 8 is a photograph showing a yellowtail specimen (Comparative Example 2) before and after the preservation test in Test 1.

The yellowtail specimen A obtained from the same second fish meat piece as the yellowtail specimen B was enclosed, as a control test, in the three-side sealed bag 200 shown in FIG. 1A and stored immediately after vacuum-sealed at a temperature at which the metmyoglobin formation does not proceed (−60° C.). At the time of analyzing the yellowtail specimen B, the stored yellowtail specimen A was thawed under running tap water for 5 to 10 minutes and taken out from the vacuum-sealed package to measure the a* value and observe the shape along with the yellowtail specimen B. The results are shown in Table 1 and FIG. 8.

Comparative Example 3

Of the yellowtail specimen A and the yellowtail specimen B obtained from a single second fish meat piece, the yellowtail specimen B was immersed at 4° C. for 20 hours in an aqueous solution of the rosemary extract composition (containing 1 mass % of the rosemary extract composition to the total amount of aqueous solution). After immersed, the yellowtail specimen B was taken out, lightly drained off water, subsequently vacuum-packed and stored under an atmosphere at 4° C. (refrigerator) for 100 hours. 100 hours later from the start of storage, the yellowtail specimen B was taken out from the vacuum-sealed package, measured for the a* value and observed for the shape. The vacuum-packing was achieved by the same method as in Example 1, except that two sheets of the discoloration suppressing film 100 were not used.

Figure 9:
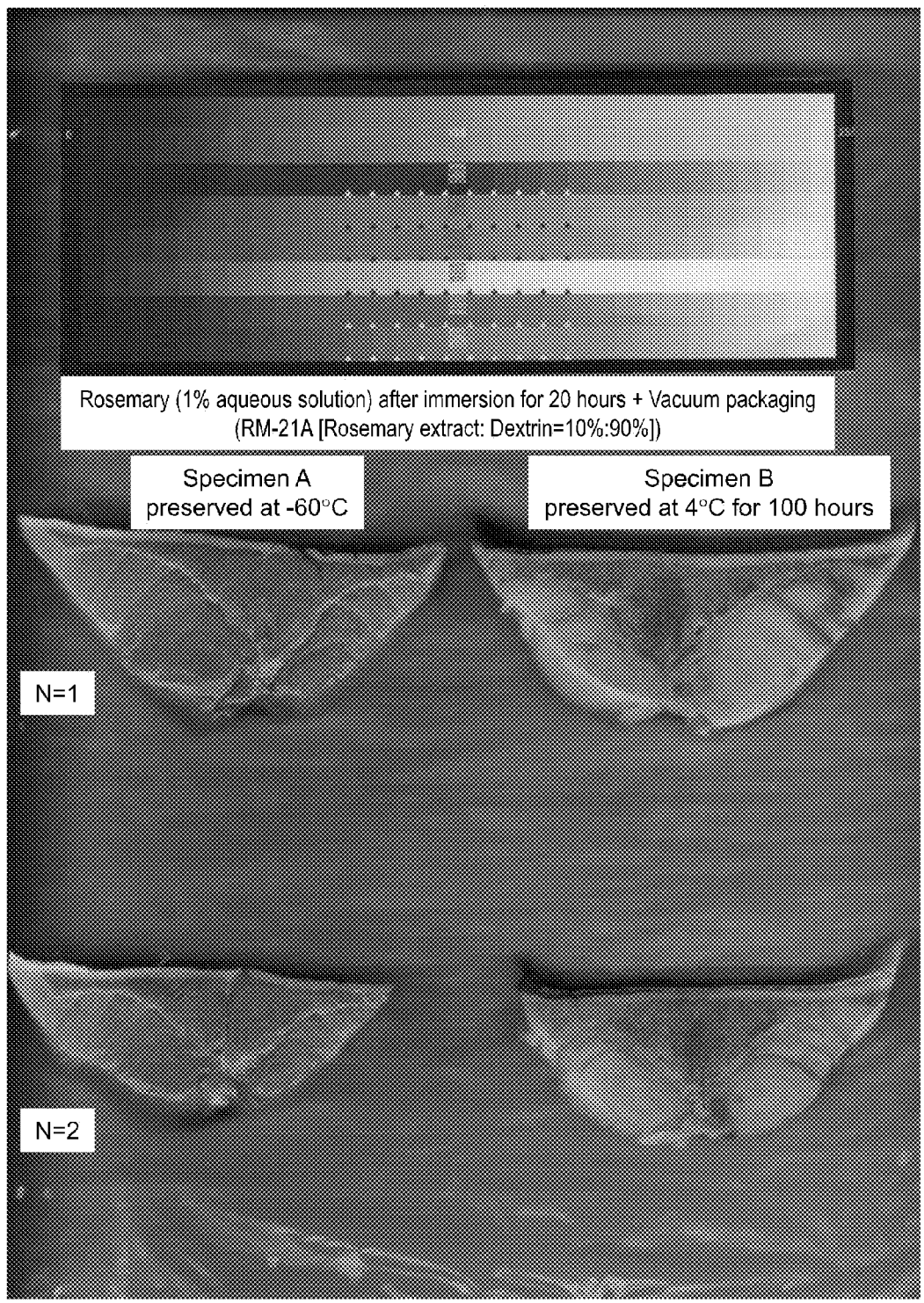
FIG. 9 is a photograph showing a yellowtail specimen (Comparative Example 3) before and after the preservation test in Test 1.

The yellowtail specimen A obtained from the same second fish meat piece as the yellowtail specimen B was enclosed, as a control test, in the three-side sealed bag 200 shown in FIG. 1A and stored immediately after vacuum-sealed at a temperature at which the metmyoglobin formation does not proceed (−60° C.). At the time of analyzing the yellowtail specimen B, the stored yellowtail specimen A was thawed under running tap water for 5 to 10 minutes and taken out from the vacuum-sealed package to measure the a* value and observe the shape along with the yellowtail specimen B. The results are shown in Table 1 and FIG. 9.

(Results)

TABLE 1

|  |  | Examples | | Comparative Examples | | |
|---|---|---|---|---|---|---|
|  |  | 1 | 2 | 1 | 2 | 3 |
| Method | | Vacuum-packed | | Left to stand | Vacuum-packed | |
|  | | Film affixed | | None | Immersed | |
| Antioxidant | | Rosemary extract | Tea extract | — | Rosemary extract | |
| Amount applied/ Concentration | | 5.25 g/m² | 2.60 g/m² | — | 0.1% Aqueous solution | 1% Aqueous solution |
| After storage for 120 h or 100 h at 4° C. | Discoloration suppressing performance (a* value) | Good | Good | Poor | Fair | Fair |
|  | Appearance of dark meat portion | Bright red | Bright red | Ocher | Light red | Light brown |
|  | Specimen shape | No change | No change | Shrank (small)[1] | Shrank (large)[2] | Shrank (large)[3] |

<Evaluation Method of Discoloration Suppressing Performance Based on a* Value>

In each of Examples and Comparative Examples, the a* values of the yellowtail specimen A and the yellowtail specimen B were determined and the a* value of the yellowtail specimen B was shown in the relative value when the a* value of the yellowtail specimen A (control test) was 100. The yellowtail specimen B was evaluated for the discoloration suppressing performance on a 3-point scale in accordance with the relative value of a* value.

Good: 80≤a* (relative value)
Fair: 50≤a* (relative value)<80
Poor: a* (relative value)<50

<Description on Shape Changes in Comparative Examples>
1) In Comparative Example 1, the specimen B after stored for 120 hours was shrunk compared with the specimen A after stored in the control test. However, the degree of shrinkage was smaller than Comparative Examples 2 and 3.
2) In Comparative Example 2, the specimen B after stored for 100 hours was shrunk compared with the specimen A after stored in the control test. The degree of shrinkage was greater than Comparative Example 1. The specimen B was also found to have been soggy (swollen) at the time of immersion completion in the rosemary extract aqueous solution.
3) In Comparative Example 3, the specimen B after stored for 100 hours was shrunk compared with the specimen A after stored in the control test. The degree of shrinkage was greater than Comparative Example 1. The specimen B was also found to have been soggy (swollen) at the time of immersion completion in the rosemary extract aqueous solution.

2. Test 2

2-1. Freshness Deterioration Supressing Material for Myoglobin-Containing Food (1) Base Material A laminated film 105, used as the base material, had a structure of a 60 μm thickness LLDPE (Linear Low Density Polyethylene) layer 102, a 20 μm thickness PE (polyethylene) adhesion layer 103 and a 15 μm thickness ON (oriented nylon) layer 104 laminated in this sequence as the laminated structure shown in FIG. 2. The LLDPE surface of the laminated film 105 was not corona treated. Hereinafter, the laminated film 105 on which an antioxidant layer 101 was not formed is sometimes referred to as "base material film". The specific gravity of this base material film is estimated to be about 92 $g/m^2$ from standard values of the resins constituting each layer.

(2) Antioxidant

The antioxidants used were rosemary extracts, a tea extract and an ascorbic acid. The following three kinds of rosemary extract were prepared.

Rosemary extract A: Mitsubishi-Kagaku Foods Corporation "RM-21.3 base" (water-soluble rosemary extract 100 mass %).

Rosemary extract B: Mitsubishi-Kagaku Foods Corporation "RM-21A", (water-soluble rosemary extract/dextrin=10 mass %/90 mass %).

Rosemary extract C: Mitsubishi-Kagaku Foods Corporation "RM-21B base" (oil-soluble rosemary extract 100 mass %).

The water-soluble rosemary extracts contained in the rosemary extracts A and B were both obtained by being extracted from leaves or flowers of rosemary (*Rosmarinus officinalis* L.) belonging to Lamiaceae and purified. The effective components are phenolcarboxylic acids (including rosmarinic acid) and flavonoids (including luteolin derivatives, such as luteolins and luteolin glucosides). The rosemary extract is a powder, easily dissolved in water, ethanol (an ethanol aqueous solution with a purity of 50% or less), propylene glycol (a. propylene glycol aqueous solution with a purity of 80% or less) and insoluble in oils and fats.

The oil-soluble rosemary extract contained in the rosemary extract C was obtained by being extracted from leaves or flowers of rosemary (*Rosmarinus officinalis* L.) belonging to Lamiaceae and purified. The effective component is phenolic diterpenoids (including rosmanol, carnosol and carnosic acid). This rosemary extract is a powder, easily dissolved in oils and fats but insoluble in water.

The tea extract used was a commercial tea extract, Mitsubishi-Kagaku Foods Corporation "Sunfood 100", (tea extract 100%).

The tea extract is green tea polyphenol extracted from leaves of green tea (*Camellia sinensis* (L.) Kuntze) belonging to Theaceae and purified. This tea extract is water-soluble.

The ascorbic acid used was FUSO CHEMICAL CO., LTD. "Vitamin C".

(3) Preparation of a Freshness Deterioration Suppressing Material for Myoglobin-Containing Food.

The antioxidant layer 101 was gravure printed and laminated on the LLDPE surface of the laminated film 105 to prepare the freshness deterioration suppressing material for myoglobin-containing food 100 in the form of film as shown in FIG. 2. The freshness deterioration suppressing material for myoglobin-containing food 100 is the film consisting of the antioxidant layer 101, the LLDPE layer 102, the PE adhesion layer 103 and the ON layer 104 laminated in this sequence. Hereinafter, this film 100 is sometimes referred to as "the film of the present invention".

Gravure printing procedures: the antioxidant was added to an ethanol aqueous solution (90% or 95% aqueous solution) to produce a slurry solution (a slurry solution concentration was adjusted so that the concentration of the antioxidant on the film shown in Table 7 was achieved after a later step of transferring the antioxidant onto the film.) The slurry solution was affixed onto an image carrier to transfer the antioxidant on the film (roll printing). The film on which the antioxidant was transferred was subsequently dried with hot air at 90° C. to 130° C. for 2 to 3 seconds.

The amount of the antioxidant applied (printed) to the film was calculated by the weight difference before and after gravure printing.

Amount applied (amount printed) [$g/m^2$]=film weight after gravure printing [$g/m^2$]−film weight before gravure printing [$g/m^2$]

In Table 7, the amount of the effective components applied in Examples 210 to 215, wherein the rosemary extract B was applied, is not the amount of the rosemary extract B applied but the amount of the water-soluble rosemary extract applied, contained in a 10 mass % concentration in the rosemary extract B. The amount of the water-soluble rosemary extract was converted from the amount of the rosemary extract B applied determined by the above formula.

The rosemary extract A, rosemary extract C, tea extract and ascorbic acid are the effective components in their entirety, and thus the amounts applied determined by the above formula are shown as the amounts of the effective components applied in Table 7.

2-2. Preparation of Specimen

An unprocessed yellowtail weighing about 5 kg was used. The yellowtail, delivered alive, was immediately killed and cut to obtain fillets of left and right (about 1.7 kg each). With each of the fillets, one of the main surfaces is covered by the skin and the other main surface has the fish meat exposed as the fillet 111 shown in FIGS. 13A and 13B. Hereinafter, the side covered with the skin of the fillet 111 is sometimes referred to as the "skin side" and the side with the exposed fish meat is sometimes referred to as the "meat side". In each test plot (Examples and Comparative Examples), one of the two fillets Obtained from the same individual was used as the sample to be treated under the conditions of each test plot. The other was used to determine the K0 value described later as a control sample to which the conditions of each test plot was not applied.

Hereinafter, the "fillet" whenever simply used refers to the above fillets obtained from a yellowtail.

2-3. Vacuum-Packing

The vacuum-sealing for vacuum-packing was achieved using a REMACOM CO., LTD. vacuum packer (RVM-300B) with the pressure inside the chamber at −100 kPa (−1.0 bar) (gauge pressure).

During vacuum-packing, the fillet (myoglobin-containing food) 111 was arranged between two sheets of the film 120 in which the antioxidant layer was not comprised, respectively on the skin side and the meat side thereof as shown in FIG. 13A and the margin was heat sealed to achieve the vacuum-sealing under the above conditions. In the present Test 2, two sheets of the base material film 105 on which the antioxidant layer 101 was not laminated were used as the film 120 in which the antioxidant layer was not comprised, and these films were arranged in such a way that the LLDPE layers 102 were opposed against each other. Moisture on the surface of the fillet 111 to be packed was wiped off using a paper towel at the time of vacuum-sealing. Hereinafter, an example of using the base material film 105 is described as the specific example of the film 120. The base material film 105 to be arranged on the skin side of the fillet 111 is denoted as the base material film 105 (1), whereas the base material film 105 to be arranged on the meat side is denoted as the base material film 105 (2). When the film 100 of the present invention contacts the skin side of the fillet 111, the film 100 of the present invention is further arranged between the skin side of the fillet 111 and the base material film 105 (1) in such a way that the antioxidant layer 101 thereof contacts the skin side surface of the fillet 111 and the vacuum-sealing was achieved. When the film 100 of the present invention contacts the meat side of the fillet 111, the film 100 of the present invention is further arranged between the meat side surface of the fillet 111 and the base material film 105 (2) in such a way that the antioxidant layer 101 thereof contacts the meat side surface of the fillet 111 and the vacuum-sealing was achieved. In FIG. 13A, the film 100 of the present invention arranged on the skin side of the fillet 111 is denoted as the film 100 (1) of the present invention, whereas the film 100 of the present invention arranged on the meat side is denoted as the film 100 (2) of the present invention. The films 100 (1), 100 (2) of the present invention, at this operation, were made smaller than the base material films 105 (1), 105 (2) arranged on the outer sides so that the margins on the LLDEP surfaces of two sheets of the base material films 105 (1), 105 (2) to be arranged on the outer sides can directly contact each other. FIG. 13B shows an example wherein the antioxidant layers 101 of the films 100 (1), 100 (2) of the present invention contact both of the skin side and meat side of the fillet 111.

2-4. Evaluations (1) Measurement of Swelling Ratio (Comparative Examples 203 to 205)

In the test plots of Comparative Examples 203 to 205 wherein the fillet was immersed in an aqueous solution of the rosemary extract, the "swelling ratio" was determined from the weight changes of the fillet.

Swelling ratio (%)=(weight g) after immersed/weight before immersed)×100

(2) Measurement of K Value

The K value is the freshness indicator of myoglobin-containing fish meat and indicates that the larger the value, the lower the freshness.

The K value obtained by measuring a sample treated as predetermined to suppress the freshness deterioration is K1 value, whereas the K value obtained by measuring a sample blank-treated with the predetermined treatment is K0 value. The details of samples used for measuring the K1 value and the K0 value are as described in (2-4) below.

The K0-K1 value is a valid indicator indicating the degree of suppression of freshness deterioration rendered by the predetermined treatment.

The K0-K1 values were evaluated using the following 3-point scale categorization.

When the K value is only either K0 value or K1 value, the 3-point scale evaluation was not conducted.

TABLE 2

|  | Poor | Good | Very good |
| --- | --- | --- | --- |
| K0-K1 Value | −5% or less | More than −5% and less than 1.0% | 1.0% or more |

K Value (%) was measured by the following method.

(2-1) Extraction Method

The fillet 111 as the sample was cut in an approximately perpendicular direction to a longitudinal direction to obtain the first fish meat piece 20 having an about 2 cm thickness shown in FIG. 4. 5 g of the parts B free of the dark meat portion (regular meat) were cut out from the first fish meat piece 20. 5 g of the parts B was put in a 100 mL stainless steel cup, manufactured by NISSEI Corporation, and 20 mL, of a 0.4 N perchloric acid aqueous solution was added thereto. The cup was set in Ace homogenizer AM-3, manufactured by NISSEI Corporation, and the contents thereof were homogenized (ground) at 10,000 rpm for 10 seconds. The obtained ground meat solution was moved to a 50 mL centrifuge tube and centrifuged at 25,000 G (14,400 rpm), 2° C. for 15 minutes using a KUBOTA Corporation high-speed refrigerated centrifuge 7930. 5 mL of the supernatant obtained by centrifuge was moved to a separate 50 mL centrifuge tube, 1 mL of a 2 N potassium carbonate aqueous solution was added thereto and shaken by hands 10 times. The resulting solution was centrifuged again at 25,000 G (14,400 rpm), 2° C. for 15 minutes using a KUBOTA Corporation high-speed refrigerated centrifuge 7930 and the supernatant was filtered using an aqueous 0.45 μm chromatodisc to measure the obtained elution test solution by HPLC.

(2-2) Measurement Method

The above elution test solution was measured by HPLC. The measurement conditions are as described below. Using the standard peak area obtained by the chromatogram, a hypoxanthine concentration (Hyp), an inosine concentration (Ino), an inosinic acid concentration (IMP), an adenosine monophosphate concentration (AMP), an adenosine diphosphate concentration (ADP) and an adenosine triphosphate concentration (ATP) in the test solution were determined respectively from the calibration curve and the K value was calculated using the following formula.

$K$ Value (%)=(Hyp+Ino)/(Hyp+Ino+$IMP$+$AMP$+$ADP$+$ATP$)×100

(2-3) HPLC Measurement Conditions

The HPLC measurement in the above (2-2) was performed under the following conditions.

Apparatus: Shimadzu Corporation LC-10Avp
Column: Shinwa Chemical Industries Ltd. STR ODS-II (150 mmL.×4.6 min I.D.)
Column temperature: 40° C.
Mobile phase: 100 mmoL/L phosphoric acid (triethylamine) buffer solution (pH 6.8)/acetonitrile=100/1 (v/v)
Mobile phase flow rate: 1.0 mL/min
Pump temperature: room temperature
Measurement time: 35 minutes
Injection volume: 20 μL
Detector: UV detector 260 nm (2-4) Samples for K1 and K0 Value Measurements In each test plot of Examples 201 to 222, one of the two fillets obtained from the same yellowtail individual was used to carry out each treatment described in detail under "2-5. Description of test plots" (1) to (6). The K value obtained by measuring the treated one of the fillets was used as the K1 value. The other fillet was subjected to the same treatment as in each test plot, except that the fillet was vacuum-packed in such a way that, without using the films 100 (1), 100 (2) of the present invention, the LLDPE layers 102 of the base material film 105 (1) and the base material film 105 (2) contact respectively the skin side and the meat side of the fillet 111 in the same manner as in Comparative Example 202. The K value measured from the other fillet sample was used as the K0 value.

In Comparative Example 201, the fillet treated as described in detail under "2-5. Description of test plot" (7) was measured for the K value which was used as the K1 value. In Comparative Example 201, the K0 value was not measured.

In Comparative Example 202, the fillet treated as described in detail under "2-5. Description of test plot" (8) was measured for the K value which was used as the K0 value. In Comparative Example 202, the K1 value was not measured.

In Comparative Examples 203 to 205, one of the two fillets obtained from the same yellowtail individual was used to carry out each treatment described in detail under "2-5. Description of test plots" (9) and the K value was measured to be used as the K1 value. The other fillet was subjected to the same treatment as in each Comparative Example, except that the immersion in the rosemary extract aqueous solution was not carried out. The K value measured from the other fillet sample was used as the K0 value.

In Comparative Example 206, the fillet treated as described in detail under "2-5. Description of test plot" (10) was measured for the K value which was used as the K0 value. The fillet treated in Comparative Example 206 was obtained from the same individual as the fillet used in Example 222. For this reason, the K0 value of Comparative Example 206 is equivalent to the K0 value of Example 222.

In Reference Example 201, the fillet treated as described in detail under "2-5. Description of test plot" (11) was measured for the K value which was used as the K1 value. In Reference Example 201, the K0 value was not measured.

In Reference Example 202, the fillet, immediately after blood was drained while alive, was measured for the K value which was used as the K1 value. In Reference Example 202, the K0 value was not measured.

(3) Sensory Evaluations

The specimen was evaluated for the shape, texture, smell, color and amount of drip in accordance with the following criteria.

(3-1) Specimen Shape

The specimen shape was evaluated based on changes from pre-stored state to the post-stored state of the fillet specimen.

(3-2) Texture

The texture was evaluated on the following 5-point scale. The texture of meat pieces cut out from the fillets in each test plot was evaluated on a 5-point scale with "5" representing the texture of a meat piece cut out from a fillet obtained immediately after blood was drained while a yellowtail was alive (Reference Example 202) and "1" representing the texture of a fish meat cut out from a CO-treated fillet (Reference Example 201) which had the worst texture among the meat pieces cut out from the fillets in each test plot.

TABLE 3

| 1 | 2 | 3 | 4 | 5 |
|---|---|---|---|---|
| Bad Very tender, sticky | Rather bad Tender | Fair | No abnormality Rather hard, slightly chewy | Good Hard, chewy, lean |

(3-3) Smell

The smell was evaluated on the following 5-point scale. The smell of the fillet used in each test plot was evaluated on a 5-point scale with "5" representing the smell of the fillet with the weakest fishy smell distinctive to the fish meat (Examples 201 to 204 207, 217, 222) and "1" representing the smell of the CO-treated fillet with the strongest fishy smell (Reference Example 201) among the fillets in each test plot. Note that "3" is equivalent to the smell of fillet obtained immediately after blood was drained while the yellowtail was alive (Reference Example 202).

TABLE 4

| 1 | 2 | 3 | 4 | 5 |
|---|---|---|---|---|
| Bad Very fishy smell, foul odor | Rather bad Very fishy smell | Fair Fishy smell | No abnormality Slightly fishy smell | Good No fishy smell, odorless |

(3-4) Color

The dark meat of a fillet was evaluated for the color on the following 7-point scale. The color of a meat piece cut out from the fillet in each test plot was evaluated on a 7-point scale with "7" representing the color of a meat piece cut out from the CO-treated fillet (Reference Example 201) and the color of a meat piece cut out from the fillet obtained immediately after blood was drained while the yellowtail was alive (Reference Example 202) and "1" representing the color of a meat piece cut out from the fillet with the worst color (Comparative Example 206) among the colors of meat pieces cut out from the fillets in each test plot.

TABLE 5

| 1 | 2 | 3 | 4 | 5 | 6 | 7 |
|---|---|---|---|---|---|---|
| Very bad Grayish brown, partly grayish brown | Bad Greenish brown | Rather bad Brown, partly brown | Slightly bad Discolored | No abnormality Light red | Good Red | Very good Bright red, pink |

(3-5) Amount of Drip

The amount of drip was defined, in Examples 201 to 221 and Comparative Examples 202 to 205, to be the combined amount of, when the fillet was taken out from the vacuum-packing bag onto a tray after stored for 24 hours or 22 hours at 4° C., a liquid oozed from the meat on the tray and a liquid oozed in the vacuum-packing bag. In Example 222, Comparative Example 206 and Reference Example 201, the amount of drip was defined to be the combined amount of, when the fillet was taken out from the vacuum-packing bag onto a tray after stored for 1 month at −25° C. and thawed for 15 hours at 4° C., a liquid oozed from the meat on the tray and a liquid oozed in the vacuum-packing bag. In Comparative Example 201, the amount of drip was defined to be the combined amount of, when a fillet was stored on a tray for 24 hours at 4° C. and taken out onto a separate new tray, a liquid oozed from the meat on the new tray and a liquid oozed on the original tray. In Reference Example 202, the amount of drip was considered absent since the fish was used immediately after blood was drained while alive.

The amount of drip was evaluated on the following 5-point scale. The amount of drip of fillet in each test plot was evaluated on a 5-point scale with a numerical value "5" representing the case of no drip from the fillet immediately after blood was drained while alive (Reference Example 202) and "1" representing the case of the fillet with the largest amount of drip among all the test plots (Comparative Example 206, Reference Example 201).

TABLE 6

| 1 | 2 | 3 | 4 | 5 |
|---|---|---|---|---|
| Large amount | Considerable amount | Small amount | Very small amount | None |

2-5. Description of Test Plots (1) Examples 201 to 209

The films 100 of the present invention provided with the antioxidant layer 101, which contains the rosemary extract A in an amount of 5 g/m², 5 g/m², 1 g/m², 0.5 g/m² on a basis of a water-soluble rosemary extract, were produced. The water-soluble rosemary extract (RM-21A base) was confirmed by the present inventors to contain rosmarinic acid in a concentration of 9.2 mass %, and the extracts in an amount of 5 g/m², 2.5 g/m², 1 g/m² and 0.5 g/m² are respectively equivalent to, on a rosmarinic acid basis, 460 mg/m², 230 mg/m², 92 mg/m², 46 mg/m².

In Examples 201, 203, 205, 208, the base film 105 (1) and the base film 105 (2) were arranged on the skin side and the meat side of the fillet 111 in such a way that each of the LLDPE layers 102 faces inside, the film 100 (1) of the present invention was arranged between the base material film 105 (1) and the fillet 111 in such a way that the antioxidant layer 101 contacts the skin side of the fillet 111, and the fillet 111 was vacuum-packed in such a way that, without using the film 100 (2) of the present invention, the LLDPE layer 102 of the base material film 105 (2) contacts the meat side of the fillet 111 to obtain the food package 300 of the present invention.

In Examples 204, 207, 209, the base film 105 (1) and the base film 105 (2) were arranged on the skin side and the meat side of the fillet 111 in such a way that each of the LLDPE layers 102 faces inside, the film 100 (1) of the present invention was arranged between the base material film 105 (1) and the fillet 111 in such a way that the antioxidant layer 101 contacts the skin side of the fillet 111, the film 100 (2) of the present invention was arranged between the base material film 105 (2) and the fillet 111 in such a way that the antioxidant layer 101 contacts the meat side of the fillet 111, and the fillet 111 was vacuum-packed to obtain the food package 300 of the present invention.

In Example 206, the base film 105 (1) and the base film 105 (2) were arranged on the skin side and the meat side of the fillet 111 in such a way that each of the LLDPE layers 102 faces inside and that, without using the film 100 (1) of the present invention, the LLDPE layer 102 of the base material film 105 (1) contacts the skin side of the fillet 111, and the film 100 (2) of the present invention was arranged between the base material film 105 (2) and the fillet 111 in such a way that the antioxidant layer 101 contacts the meat side of the fillet 111, and the fillet 111 was vacuum-packed to obtain the food package 300 of the present invention.

Each of the fillets 111 in the state of being vacuum-packed was stored for 24 hours at 4° C. After stored, the package was opened and evaluated for each item shown in Table 7.

(2) Examples 210 to 215

The films 100 of the present invention provided with the antioxidant layer 101, which contains the rosemary extract B (RM-21A) in an amount of 0.5 g/m², 0.25 g/m², 0.1 g/m² when converted to the water-soluble rosemary extract (RM-21A base) (equivalent to 46 mg/m², 23 mg/m², 9.2 mg/m² respectively on a rosmarinic acid basis), were produced and used for the foil owing vacuum-packing.

In Examples 210, 212, 214, the base material film 105 (1), the film 100 (1) of the present invention, the fillet 111 and the base material film 105 (2) were arranged in this sequence as in Example 201 and vacuum-packed in such a way that the skin side of the fillet 111 contacts the antioxidant layer 101 of the film 100 (1) of the present invention and the meat side contacts the LLDPE layer 102 of the base material film 105 (2).

In Examples 211, 213, 215, the base material film 105 (1), the film 100 (1) of the present invention, the fillet 111, the film 100 (2) of the present invention and the base material film 105 (2) were arranged in this sequence as in Example 202 and vacuum-packed in such a way that the skin side and the meat side of the fillet 111 contact the antioxidant layers 101 of the films 100 (1), 100 (2) of the present invention.

The samples of each test plot were stored and evaluated in the same manner as in Examples 201 to 209.

(3) Examples 216 and 217

The films 100 of the present invention provided with the antioxidant layer 101, which contains the rosemary extract C in an amount of 1 g/m² on a basis of an oil-soluble rosemary extract, were produced and used for the following vacuum-packing. The oil-soluble rosemary extract (RM-21B base) was confirmed by the present inventors to contain carnosol in a concentration of 12 mass % and carnosic acid in a concentration of 7.4 mass %, and the extract in an amount of 1 g/m² is equivalent to 120 mg/m² on a camosol basis and 74 mg/m² on a carnosic acid basis.

In Example 216, the base material film 105 (1), the film 100 (1) of the present invention, the fillet 111 and the base material film 105 (2) were arranged in this sequence as in Example 201 and vacuum-packed in such a way that the skin side of the fillet 111 contacts the antioxidant layer 101 of the film 100 (1) of the present invention and the meat side contacts the LLDPE layer 102 of the base material film 105 (2).

In Example 217, the base material film 105 (1), the film 100 (1) of the present invention, the fillet 111, the film 100 (2) of the present invention and the base material film 105 (2) were arranged in this sequence as in Example 202 and vacuum-packed in such a way that the skin side and the meat side of the fillet 111 contact the antioxidant layers 101 of the films 100 (1), 100 (2) of the present invention.

The samples of each test plot were stored and evaluated in the same manner as in Examples 201 to 209.

(4) Examples 218 to 219

The film 100 of the present invention provided with the antioxidant layer 101, which contains the tea extract in an amount of 2.5 g/m$^2$, was produced and used for the following vacuum-packing.

In Example 218, the base material film 105 (1), the film 100 (1) of the present invention, the fillet 111 and the base material film 105 (2) were arranged in this sequence as in Example 201 and vacuum-packed in such a way that the skin side of the fillet 111 contacts the antioxidant layer 101 of the film 100 (1) of the present invention and the meat side contacts the LLDPE layer 102 of the base material film 105 (2).

In Example 219, the base material film 105 (1), the film 100 (1) of the present invention, the fillet 111, the film 100 (2) of the present invention and the base material film 105 (2) were arranged in this sequence as in Example 202 and vacuum-packed in such a way that the skin side and the meat side of the fillet 111 contact the antioxidant layers 101 of the films 100 (1), 100 (2) of the present invention.

The samples of each test plot were stored and evaluated in the same manner as in Examples 201 to 209.

(5) Examples 220 and 221

The films 100 of the present invention provided with the antioxidant layer 101, which contains ascorbic acid in an amount of 2 g/m$^2$, were produced and used for the following vacuum-packing.

In Example 220, the base material film 105 (1), the film 100 (1) of the present invention, the fillet 111 and the base material film 105 (2) were arranged in this sequence as in Example 201 and vacuum-packed in such a way that the skin side of the fillet 111 contacts the antioxidant layer 101 of the film 100 (1) of the present invention and the meat side contacts the LLDPE layer 102 of the base material film 105 (2).

In Example 221, the base material film 105 (1), the film 100 (1) of the present invention, the fillet 111, the film 100 (2) of the present invention and the base material film 105 (2) were arranged in this sequence as in Example 202 and vacuum-packed in such a way that the skin side and the meat side of the fillet 111 contact the antioxidant layers 101 of the films 100 (1), 100 (2) of the present invention.

The samples of each test plot were stored and evaluated in the same manner as in Examples 201 to 209.

(6) Example 222

In Example 222 the fillet in the state of being vacuum-packed in the same procedure as in Example 207 was stored for 1 hour at 4° C. Subsequently, the fillet was stored for 1 month at −25° C. and thawed over a period of 15 hours at 4° C. After thawed, the package was opened and evaluated for each item shown in Table 7.

(7) Comparative Example 201

The fillet was left to stand on a tray, the tray was sealed using a food wrapping plastic film and stored for 24 hours at 4° C., and subsequently evaluated for each item shown in Table 7.

(8) Comparative Example 202

In Comparative Example 202, the base material film 105 (1), the fillet 111 and the base material film 105 (2) were arranged in this sequence, and vacuum-packed in such a way that the LLDPE layers 102 of the base material film 105 (1) and the base material film 105 (2) contact the skin side and the meat side of the fillet 111.

The fillet in the state of being vacuum-packed was stored and evaluated in the same manner as in Examples 201 to 209.

(9) Comparative Examples 203 to 205

Aqueous solutions containing the rosemary extract A in water in the form of a water-soluble rosemary extract in 0.01 mass %, 0.1 mass % and 1 mass % were prepared.

In Comparative Examples 203, 204 and 205, the fillet was immersed respectively in the aqueous solutions containing 0.01 mass %, 0.1 mass % and 1 mass % of the rosemary extract A for 2 hours at 4° C. After immersed, the fillet was taken out from the aqueous solution and vacuum-packed in such a way that the LIDPE layers 102 of the base material film 105 (1) and the base material film 105 (2) respectively contact the skin side and the meat side of the fillet 111 as in Comparative Example 202.

The fillet 111 in the state of being vacuum-packed was stored for 22 hours at 4° C. After stored, the package was opened and evaluated for each item shown in Table 7.

(10) Comparative Example 206

In Comparative Example 206, the fillet in the state of being vacuum-packed in the same procedure as in Comparative Example 202 was stored for 1 month at −25° C. and thawed over a period of 15 hours at After thawed, the package was opened and evaluated for each item shown in Table 7.

(11) Reference Example 201

The CO-treated fillet can be prepared by the following method. An unprocessed yellowtail weighing 5.0 kg is used. The yellowtail, delivered alive, is immediately killed and filleted into three slices. The obtained fillet (about 1.5 kg) is immersed in a 20% saline solution for 15 minutes, then immersed in fresh water for 10 minutes and dried. Subsequently, smoke is injected using a needle, the fillet is stored in the smoke-injected bag for 2 hours at 4° C. and taken out of the bag.

In Reference Example 201, the CO-treated fillet prepared by the above procedure was vacuum-packed in such a way that the LLDPE layers 102 of the base material film 105 (1) and the base material film 105 (2) respectively contact the skin side and the meat side of the fillet 111 as in Comparative Example 202.

The vacuum-packed fillet of Reference Example 201 was stored for 1 month at −25° C. and thawed over a period of 15 hours at 4° C. After thawed, the package was opened and evaluated for each item shown in Table 7.

(12) Reference Example 202

The yellowtail immediately after blood was drained while alive was evaluated for each item shown in Table 7.

2-6. Results

The evaluation results of each test plot are shown in Table 7. The sensory evaluations (texture, smell, color, amount of drip), as the overall evaluation, were categorized as follows.

Very good: 16 points or more
Good: 13 to 15 points
Poor: 12 points or less

Overall evaluation (points)=texture (1 to 5)+smell (1 to 5)+color (1 to 7)+amount of drip (1 to 5)

In Example 202, the K0 value was 10.7%, the K1 value was 7.3% and the K0-K1 value was 3.4. In Example 204, the K0 value was 13.8%, the K1 value was 9.7% and the K0-K1 value was 4.1. In Example 207, the K0 value was 10.0%, the K1 value was 8.0% and the K0-K1 value was 2.0. In Example 219, the K0 value was 11.0%, the K1 value was 10.0% and the K0-K1 value was 1.0. In Example 221, the K0 value was 10.5%, the K1 value was 8.4% and the K0-K1 value was 2.1. In Example 222, the K0 value was 6.2%, the K1 value was 5.1% and the K0-K1 value was 1.1. In Comparative Example 205, the K0 value was 9.0%, the K1 value was 15.5% and the K0-K1 value was −6.5. In Reference Example 201, the K1 value was 31.1%. In Reference Example 202, the K1 value was 1.6%.

Figure 14A:
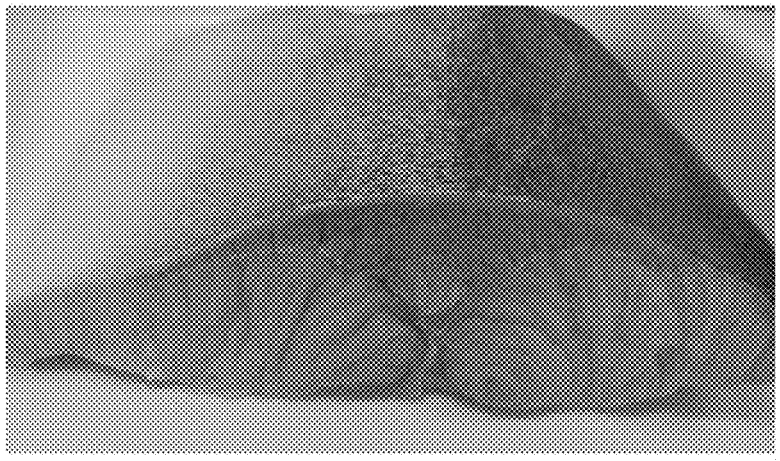
FIGS. 14A-14C include photographs of fillets after an immersion treatment with an aqueous antioxidant solution for 2 hours, according to Comparative Examples 203, 204 and 205, in Test 2.
Figure 14B:
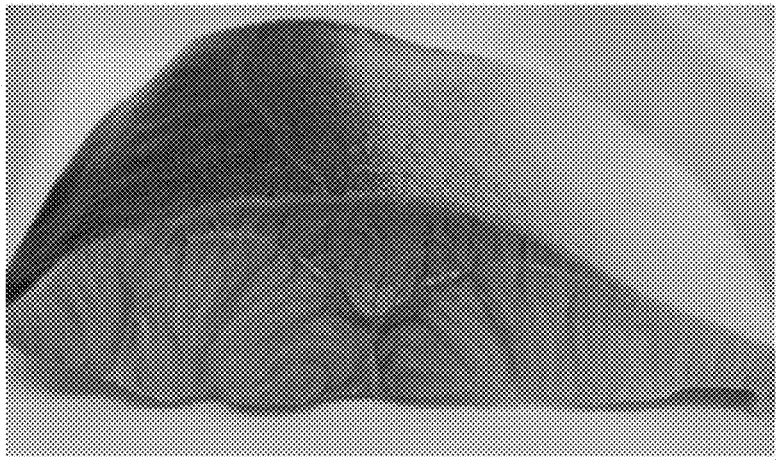
Figure 14C:
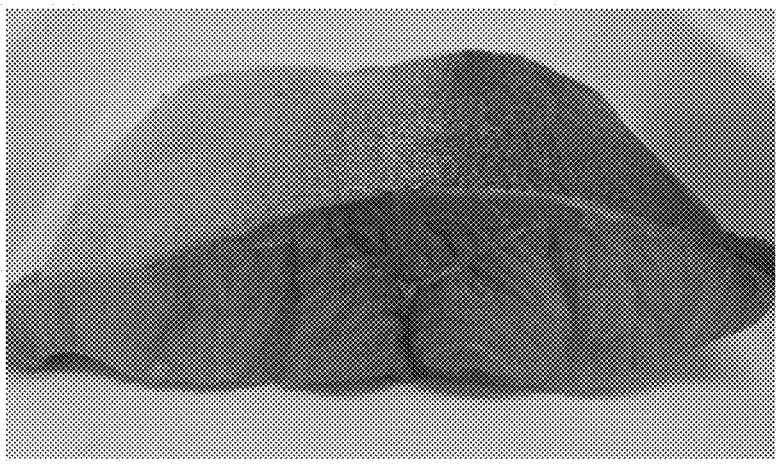

In each test plot of Examples 201 to 222, it has been verified that the deterioration of fillet freshness was suppressed by the use of the film 100 of the present invention. In particular, when the fillet was vacuum-packed in such a way that the antioxidant layers 101 contact both surfaces of the fillet as in Examples 202, 204, 207, 217, 219, 221, 222, the K value which is the freshness indicator or/and the overall evaluation values of sensory evaluations had comparatively high results, notably suppressing the deterioration of freshness. However, the freshness deterioration was not suppressed as evident from the overall evaluations of sensory evaluations in Comparative Example 201 wherein the fillet was left to stand on the tray and Comparative Example 202 and Comparative Example 206 wherein the vacuum-packing was achieved without using the film 100 of the present invention. In Reference Example 201 wherein the fillet was CO-treated, the color retained even after stored in a freezer but the freshness deterioration was not suppressed. In Comparative Examples 203, 204, 205 wherein the fillet was immersed in the aqueous solution of the rosemary extract and subsequently vacuum-packed, the fillet was confirmed to have been swollen due to the aqueous solution. The images of fillets after stored in Comparative Examples 203, 204, 205 are shown for reference in FIGS. 14A, 14B, 14C, respectively. The swelling of fillets can also be confirmed from these images.

In Examples 201, 202, the contents of antioxidant rosemary extract A were so large that the fillets were confirmed to have been colored to yellow. In Examples 203, 204, the fillets were confirmed to have been yellow-tinted although not as much as in Examples 201, 202.

TABLE 7

| | | | Examples | | | | | | | | |
|---|---|---|---|---|---|---|---|---|---|---|---|
| | | | 201 | 202 | 203 | 204 | 205 | 206 | 207 | 208 | 209 |
| | Storage conditions | | Vacuum-packed Film affixed Refrigerated (4° C.), 24 h | | | | | | | | |
| Antioxidant | Effective component | | Rosemary extract A | | | | | | | | |
| | Amount of effective component applied/concentration | | 5 g/m² | | 2.5 g/m² | | 1 g/m² | | | 0.5 g/m² | |
| | Affixed surface | Skin side | Affixed | Affixed | Affixed | Affixed | Affixed | — | Affixed | Affixed | Affixed |
| | | Meat side | — | Affixed | — | Affixed | — | Affixed | Affixed | — | Affixed |
| Evaluation results | Swelling ratio [%] | | — | — | — | — | — | — | — | — | — |
| | K Value | K0-K1 (3-point scale evaluation) | Good | Very good | Good | Very good | Good | Good | Very good | Good | Good |
| | Sensory evaluations | Specimen shape | No change | No change | No change | No change | No change | No change | No change | No change | No change |
| | | Texture (5-point scale evaluation) | 4 | 4 | 4 | 4 | 3 | 3 | 4 | 3 | 3 |
| | | Smell (5-point scale evaluation) | 5 | 5 | 5 | 5 | 4 | 4 | 5 | 4 | 4 |
| | | Color (7-point scale evaluation) | 4 Yellow | 4 Yellow | 4 Yellowish | 4 Yellowish | 6 Red | 6 Red | 7 Bright red | 6 Red | 6 Red |
| | | Amount of drip (5-point scale evaluation) | 4 | 4 | 4 | 4 | 4 | 4 | 4 | 3 | 3 |
| | | Overall evaluation | 17 Points Very good | 17 Points Very good | 17 Points Very good | 17 Points Very good | 17 Points Very good | 17 Points Very good | 20 Points Very good | 16 Points Very good | 16 Points Very good |

TABLE 7-continued

| | | | Examples | | | | | | | |
|---|---|---|---|---|---|---|---|---|---|---|
| | | | 210 | 211 | 212 | 213 | 214 | 215 | 216 | 217 |
| | Storage conditions | | Vacuum-packed<br>Film affixed<br>Refrigerated (4° C.), 24 h | | | | | | | |
| Antioxidant | Effective component | | Rosemary extract B | | | | | | Rosemary extract C | |
| | Amount of effective component applied/concentration | | 0.5 g/m² | 0.25 g/m² | | 0.1 g/m² | | | 1 g/m² | |
| | Affixed surface | Skin side | Affixed | Affixed | Affixed | Affixed | Affixed | Affixed | Affixed | Affixed |
| | | Meat side | — | Affixed | — | Affixed | — | Affixed | — | Affixed |
| Evaluation results | | Swelling ratio [%] | — | — | — | — | — | — | — | — |
| | K Value | K0-K1 (3-point scale evaluation) | Good | Good | Good | Good | Good | Good | Good | Good |
| | Sensory evaluations | Specimen shape | No change | No change | No change | No change | No change | No change | No change | No change |
| | | Texture (5-point scale evaluation) | 3 | 3 | 3 | 3 | 3 | 3 | 3 | 4 |
| | | Smell (5-point scale evaluation) | 4 | 4 | 4 | 4 | 4 | 4 | 4 | 5 |
| | | Color (7-point scale evaluation) | 6 Red | 6 Red | 5 Light red | 5 Light red | 5 Light red | 5 Light red | 5 Light red | 5 Light red |
| | | Amount of drip (5-point scale evaluation) | 3 | 3 | 3 | 3 | 3 | 3 | 3 | 3 |
| | | Overall evaluation | 16 Points Very good | 16 Points Very good | 15 Points Good | 15 Points Good | 15 Points Good | 15 Points Good | 15 Points Good | 17 Points Very good |

| | | | Examples | | | | |
|---|---|---|---|---|---|---|---|
| | | | 218 | 219 | 220 | 221 | 222 |
| | Storage conditions | | Vacuum-packed<br>Film affixed<br>Refrigerated (4° C.), 24 h | | | | Frozen (−25° C.), 1 month |
| Antioxidant | Effective component | | Tea extract | | Ascorbic acid | | Rosemary Extract A |
| | Amount of effective component applied/concentration | | 2.5 g/m² | | 2 g/m² | | 1 g/m² |
| | Affixed surface | Skin side | Affixed | Affixed | Affixed | Affixed | Affixed |
| | | Meat side | — | Affixed | — | Affixed | Affixed |
| Evaluation results | | Swelling ratio [%] | — | — | — | — | — |
| | K Value | K0-K1 (3-point scale evaluation) | Good | Very good | Good | Very good | Very good |
| | Sensory evaluations | Specimen shape | No change | No change | No change | No change | No change |
| | | Texture (5-point scale evaluation) | 3 | 4 | 3 | 4 | 4 |
| | | Smell (5-point scale evaluation) | 4 | 4 | 4 | 4 | 5 |
| | | Color (7-point scale evaluation) | 6 Red | 7 Bright red | 5 Light red | 5 Light red | 6 Red |
| | | Amount of drip (5-point scale evaluation) | 3 | 4 | 3 | 3 | 3 |
| | | Overall evaluation | 16 Points Very good | 19 Points Very good | 15 Points Good | 16 Points Very good | 18 Points Very good |

| | | | Comparative Examples | | | | | | Reference Examples | |
|---|---|---|---|---|---|---|---|---|---|---|
| | | | 201 | 202 | 203 | 204 | 205 | 206 | 201 | 202 |
| | Storage conditions | | Left to stand<br><br>Refrigerated (4° C.), 24 h | Vacuum-packed<br><br> | Vacuum-packed<br>Immersed (4° C., 2 h)<br>Refrigerated (4° C.), 22 h | | | Vacuum-packed<br><br>Frozen (−25° C.), 1 month | Vacuum-packed<br><br>Frozen (−25° C.), 1 month | Immediately after blood drainage while alive | Immediately after blood drainage while alive |

TABLE 7-continued

| Antioxidant | Effective component | | None | None | Rosemary extracts | | | None | CO-treatment | — |
|---|---|---|---|---|---|---|---|---|---|---|
| | Amount of effective component applied/concentration | | | | 0.01% Aqueous solution | 0.1% Aqueous solution | 1% Aqueous solution | | | |
| | Affixed surface | Skin side | — | — | — | — | — | — | — | — |
| | | Meat side | — | — | — | — | — | — | — | — |
| Evaluation results | Swelling ratio [%] | | — | — | 102 | 102 | 102 | — | — | — |
| | K Value | K0-K1 (3-point scale evaluation) | — | — | Good | Good | Poor | — | — | — |
| | Sensory evaluations | Specimen shape | Shrank (small) | No change | Swollen (large) soggy | Swollen (large) soggy | Swollen (large) soggy | Loose | Notably loose | — |
| | | Texture (5-point scale evaluation) | 2 | 3 | 2 | 2 | 2 | 2 | 1 | 5 |
| | | Smell (5-point scale evaluation) | 2 | 2 | 4 | 4 | 4 | 2 | 1 | 3 |
| | | Color (7-point scale evaluation) | 3 Partly brown | 3 Party brown | 3 Partly brown | 3 Partly brown | 4 Yellow | 1 Partly grayish brown | 7 Pink | 7 Bright red |
| | | Amount of drip (5-point scale evaluation) | 3 | 3 | 2 | 2 | 2 | 1 | 1 | 5 |
| | | Overall evaluation | 10 Points Poor | 11 Points Poor | 11 Points Poor | 11 Points Poor | 12 Points Poor | 6 Points Poor | 10 Points Poor | 20 Points Very good |

3. Test 3

3-1. Film

The film A and the film B used in the present test are as follows, respectively.

(1) Film A

The film A is the same film as used in the above Examples 205 to 207 and has the structure of film 100 of the present invention shown in FIG. 2. Specifically, the film A is provided with, as the base material, a laminated film 105 having the structure of a 60 μm thickness LLDPE (Linear Low Density Polyethylene) layer 102, a 20 μm thickness PE (polyethylene) adhesion layer 103 and a 15 μm thickness ON (oriented nylon) layer 104 laminated in this sequence and an antioxidant layer 101 composed of the rosemary extract on the surface of the LLDPE layer 102 of the laminated film 105. The surface of LLDPE layer 102 is not corona treated.

Mitsubishi-Kagaku Foods Corporation "RM-21A base" was used as the rosemary extract.

The antioxidant layer 101 composed of the rosemary extract was formed by the printing method described under "2-1. Freshness deterioration suppressing material for myoglobin-containing food" (3) in Test 2. The amount of the rosemary extract applied (printed) was calculated by the conversion method of the water-soluble rosemary extract (RM-21A base) described in the section "3.1. Determination of rosmarinic acid, carnosol and carnosic acid, and a plant extract containing the same" under "Description of Embodiments."

Film A (1) to be used for the elution test to the skin side surface of the fillet piece below (an amount applied of 0.71 g/m²), Film A (2) to be used for the elution test to the meat side surface of the fillet piece below (an amount applied of 0.67 g/m²) and Film A (3) to be used for the elution test to water (an amount applied of 0.70 g/m²) were prepared as the films A.

(2) Film B

The film B has the structure of the film 100 of the present invention shown in FIG. 15. Specifically, the film B is provided with, as the base material 105, a single layer film consisting of a 30 μm thickness PET (polyethylene terephthalate) and an antioxidant layer 101 composed of the rosemary extract on one surface of the base material 105. The surface of base material 105, on which the antioxidant layer 101 is formed, is not corona treated.

The rosemary extracts used, the method for forming the antioxidant layer and the method for measuring the amount of the rosemary extract applied are the same as the Film A.

Film B (1) to be used for the elution test to the skin side surface of the fillet piece below (an amount applied of 1.04 g/m²), Film B (2) to be used for the elution test to the meat side surface of the fillet piece below (an amount applied of 1.09 g/m²) and Film B (3) to be used for the elution test to water (an amount applied of 1.00 g/m²) were prepared as the films B.

3-2. Yellowtail Fillet

A fillet, weighing about 1.5 kg with one side covered with the skin and the other side had the meat exposed, was prepared from a yellowtail in the same way as Test 2. The fillet was cut to a 10 cm-width in an approximately perpendicular direction to a longitudinal direction to obtain a specimen in the form of fillet piece.

3-3. Antioxidant Elution Test (1) Evaluation on Amount of Antioxidant Eluted to the Skin Side Surface or the Meat Side Surface of the yellowtail fillet The film A or the film B cut out to size 5 cm×5 cm was affixed onto the above fillet piece in such a way that the antioxidant layer 101 contacted the skin side or the meat side of the fillet piece. The fillet piece onto which the film A or B was affixed was enclosed in a vacuum-packing bag composed of a film consisting of a 60 μm thickness LLDPE (Linear Low Density Polyethylene) layer, a 20 μm thickness PE (polyethylene) adhesion layer and a 15 μm thickness ON (oriented nylon) laminated in this sequence with the LLDPE layer arranged to face inside, and vacuum-sealed.

The vacuum-sealing was achieved using a REMACOM CO., LTD. vacuum packer chamber (RVM-300B) with the pressure inside the chamber at −100 kPa (−1.0 bar) (gauge pressure). The obtained vacuum-packing bags were stored under an atmosphere at 4° C., opened 10 minutes, 1 hour, 3 hours, 6 hours and 24 hours later and the film A or film B was removed from the fillet piece. Amounts of the rosemary extract remaining on the film A or film B removed at each time were measured by the procedure described later. The difference obtained by subtracting a measured residual amount of the rosemary extract from the amount of rosemary extract pre-applied on the film A or film B was considered an amount of the rosemary extract eluted into the fillet piece when the film A or film B contacted the fillet for a predetermined period of time. The amount of the rosemary extract eluted is shown in the amount per unit area of the film A or film B.

(2) The Antioxidant Elution Test to Water

The film A or film B, 5 cm×5 cm, was immersed at 4° C. in a polypropylene pan (dimension: length×width× height=320 mm×230 mm×52 mm) filled with 1000 mL of distilled water, removed 10 seconds, 10 minutes, 30 minutes, 1 hour, 3 hours, 6 hours and 24 hours later and dried. Amounts of the rosemary extract remaining on the removed film A or film B were measured by the procedure described later. The difference obtained by subtracting a measured residual amount of the rosemary extract from the amount of rosemary extract pre-applied on the film A or film B was considered an amount of the rosemary extract eluted into water when the film A or film B was immersed in water for a predetermined period of time. The amount of the rosemary extract eluted is shown in the amount per unit area of the film A or film B.

3-4. Method of Measuring Amount Eluted

Amounts of the rosemary extract remaining on the film A or film B after each of the elution tests were measured by the following procedure.

(1) The Elution Method

The 5 cm×5 cm film A or film B after each of the elution tests was put in a 12 cm×17 cm thick zipper bag. Subsequently, 10 mL of methanol was added and the zipper was closed in such a manner that the air was removed as much as possible. The bag was shaken by hands several times and the supernatant was filtered using a non-aqueous 0.2 μm chromatodisc. The filtrate, without being diluted, was measured by UHPLC under the following conditions.

(2) Measurement Method (2-1): Method for Creating Calibration Curve

A 100 ppm standard solution was diluted with methanol using an automatic dilutor to create a 4-point calibration curve at 50 ppm, 10 ppm, 5 ppm and 2 ppm.

(2-2): Calculation Method

The amount of rosmarinic acid remaining on the film A or film B per unit area was determined from the measured value of the rosmarinic acid concentration by UHPLC using the following formula.

Amount of rosmarinic acid (mg/m$^2$)=measured value (mg/L)×extracted volume 10 (mL)/sample area 0.0025 (m$^2$)×dilution rate/1000

The present inventors, as described earlier, separately confirmed that the rosemary extract A (RM-21A base) used, i.e., the water-soluble rosemary extract, contained rosmarinic acid in a concentration of 9.2 mass %. Accordingly, the amount of water-soluble rosemary extract per unit area was calculated using the following formula based on the amount of rosmarinic acid per unit area (mg/m$^2$) calculated above.

Amount of water-soluble rosemary extract converted from the rosmarinic acid (g/m$^2$)=amount of rosmarinic acid (mg/m$^2$)/0.092/1000

(3) UHPLC Measurement Conditions

Apparatus: Shimadzu Corporation Ultra high-performance liquid chromatograph Nexera. X2
Column: Kinetex 1.7 μm C18 100A (50 mmL.×2.1 mm I.D.)
Column temperature: 40° C.
Mobile phase: 0.05% trifluoroacetic acid/acetonitrile=A/B
Mobile phase conditions:
  0 to 1 minute=solvent B (=acetonitrile) concentration 20%
  1 minute to 2 minutes=solvent B concentration from 20% to 45%
  2 minutes to 10 minutes=solvent B concentration 45%
  10 minutes to 10.1 minutes=solvent B from concentration 45% to 20%
  10.1 minutes to 13 minutes=solvent B concentration 20%
Mobile phase flow rate: 0.6 mL/min
Pump temperature: room temperature
Measurement time: 13 minutes
Injection volume: 1 μL
Detector: rosmarinic acid (PDA=210 nm)

3-5. Results (1) Elution into Yellowtail Fillet

Figure 16A:
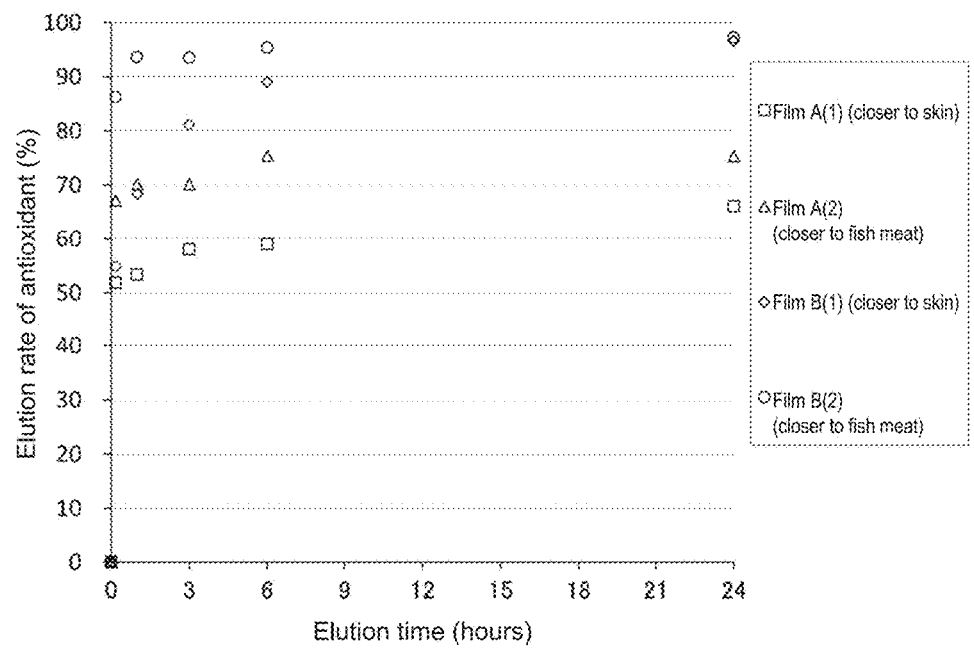
FIGS. 16A and 16B include graphs illustrating the results of the elution test in Test 3.

Table 8 shows the amount (upper row) of the antioxidant eluted to the skin side surface or the meat side surface of the yellowtail fillet and the elution ratio (bottom row) thereof evaluated by the method described in "3-3. Antioxidant elution test" (1). In Table 8, 0.17 hours under Elution time refers to 10 minutes. The elution ratio shown in Fable 8 is also depicted as a graph in FIG. 16A.

It is verified that both film A and film B, when contact the skin side surface and the meat side surface of the fillet, can provide the fillet with a half or more of the applied antioxidant in a comparatively short time of 10 minutes and the elution ratio increases up to 6 hours but tends to slow down thereafter. With the film B in which the antioxidant layer 100 was formed on the PET surface, the most part of the pre-applied antioxidant was eluted after 24 hours have passed, whereas with the film A in which the antioxidant layer 100 was formed on the LLDPE surface, the elution ratio was about 70% even after 24 hours have passed. Both film A and film B were confirmed that, when contacted the meat side surface of the fillet, the amount of the antioxidant eluted tended to be larger.

TABLE 8

| | | | Elution into fish fillet pieces | | | | | | |
|---|---|---|---|---|---|---|---|---|---|
| | | | <Amount eluted [g/m$^2$]> | | | | | | |
| Film | Surface with antioxidant | Affixed fillet surface | Amount applied [g/m$^2$] | \multicolumn{6}{c}{Elution time (h)} |
| | | | | 0 | 0.17 | 1 | 3 | 6 | 24 |
| A(1) | LLDPE | Skin | 0.71 | 0.00 | 0.37 | 0.38 | 0.41 | 0.42 | 0.47 |
| A(2) | LLDPE | Meat | 0.67 | 0.00 | 0.45 | 0.47 | 0.47 | 0.51 | 0.51 |

TABLE 8-continued

| | | Elution into fish fillet pieces | | | | | | | |
|---|---|---|---|---|---|---|---|---|---|
| B(1) | PET | Skin | 1.04 | 0.00 | 0.57 | 0.71 | 0.85 | 0.93 | 1.01 |
| B(2) | PET | Meat | 1.09 | 0.00 | 0.94 | 1.02 | 1.02 | 1.04 | 1.06 |

| | | | <Elution ratio [%]> | | | | | |
|---|---|---|---|---|---|---|---|---|
| | Surface with | Affixed fillet | | Elution time (h) | | | | |
| Film | antioxidant | surface | 0 | 0.17 | 1 | 3 | 6 | 24 |
| A(1) | LLDPE | Skin | 0 | 52 | 53 | 58 | 59 | 66 |
| A(2) | LLDPE | Meat | 0 | 67 | 70 | 70 | 75 | 75 |
| B(1) | PET | Skin | 0 | 55 | 68 | 81 | 89 | 97 |
| B(2) | PET | Meat | 0 | 86 | 94 | 94 | 95 | 97 |

(2) Elution Into Water

Figure 16B:
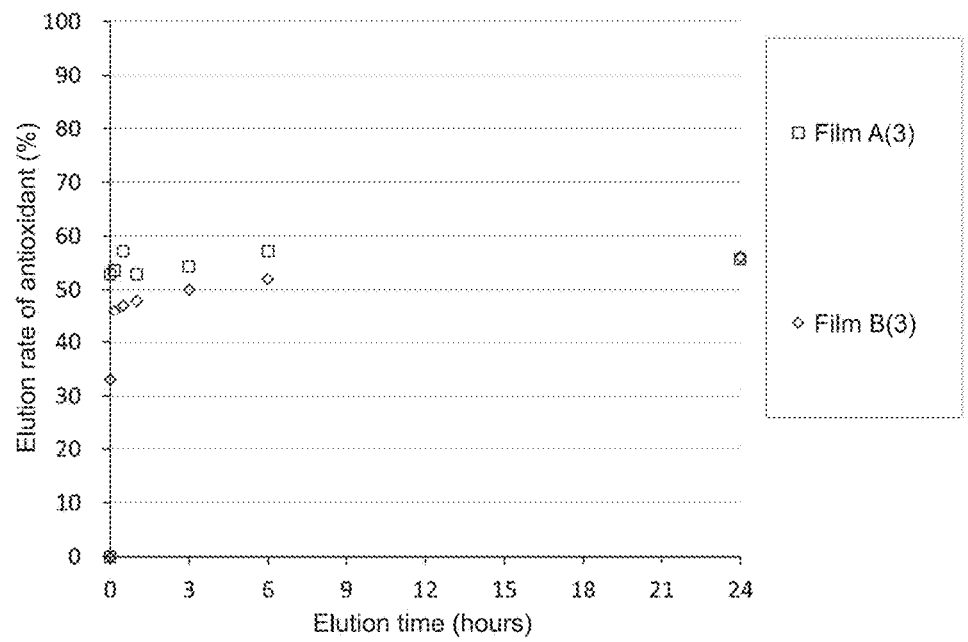

Table 9 shows the amount (upper row) of the antioxidant eluted into water and the elution ratio (bottom row) thereof evaluated by the method described in 3-3 (2). In Table 9, 0.003 hours under Elution time refers to 10 seconds, 0.17 hours refers to 10 minutes and 0.50 hours refers to 30 minutes. The elution ratio shown in Table 9 is also depicted as a graph in FIG. 16B.

It is verified that both film A and film B, when contact water, can elute a half or more of the applied antioxidant in a comparatively short time of 10 seconds and the elution ratio increases up to 6 hours but tends to slow down thereafter.

TABLE 9

| | | Elution into water | | | | | | | |
|---|---|---|---|---|---|---|---|---|---|
| | | <Amount eluted [g/m²]> | | | | | | | |
| | Surface with | Amount applied | | Elution time (h) | | | | | |
| Film | antioxidant | [g/m²] | 0 | 0.003 | 0.17 | 0.50 | 1 | 3 | 6 | 24 |
| A(3) | LLDPE | 0.70 | 0.00 | 0.37 | 0.38 | 0.40 | 0.37 | 0.38 | 0.40 | 0.39 |
| B(3) | PET | 1.00 | 0.00 | 0.33 | 0.46 | 0.47 | 0.48 | 0.50 | 0.52 | 0.56 |

| | | <Elution ratio [%]> | | | | | | | |
|---|---|---|---|---|---|---|---|---|---|
| | Surface with | | Elution time (h) | | | | | | |
| Film | antioxidant | 0 | 0.003 | 0.17 | 0.50 | 1 | 3 | 6 | 24 |
| A(3) | LLDPE | 0 | 53 | 54 | 57 | 53 | 54 | 57 | 56 |
| B(3) | PET | 0 | 33 | 46 | 47 | 48 | 50 | 52 | 56 |

Advantageous Effects of Invention

The freshness deterioration suppressing material for myoglobin-containing food of the present invention can efficiently suppress the freshness deterioration since the suppressing material can selectively contact a desired part where discoloration, foul smell, texture deterioration and the amount of drip need to be suppressed in myoglobin-containing food items.

The discoloration suppressing material for myoglobin-containing food of the present invention can efficiently suppress the discoloration since the suppressing material can selectively contact a desired surface where discoloration needs to be suppressed in myoglobin-containing food items.

The use of the freshness deterioration suppressing material for myoglobin-containing food and the discoloration suppressing material for myoglobin-containing food of the present invention enables the antioxidant to contact a myoglobin-containing food item without changing the shape of the food item.

The method for suppressing the freshness deterioration or discoloration of myoglobin-containing food by the use of the freshness deterioration suppressing material for myoglobin-containing food or the discoloration suppressing material for myoglobin-containing food of the present invention is simpler, more hygienic and less likely to affect the taste of a food item than the method of immersing a food item in an antioxidant solution. The method also does not need a solvent, such as water, and thus the production of liquid wastes is suppressed.

The use of the freshness deterioration suppressing material for myoglobin-containing food and the discoloration suppressing material for myoglobin-containing food of the present invention can suppress the freshness deterioration or the discoloration of myoglobin-containing food items without the need of specific facilities.

The food package of the present invention enables the storage or the transport of a packed myoglobin-containing food item without freshness deterioration or the discoloration caused by oxidation even under conditions with a temperature exceeding −30° C.

INDUSTRIAL APPLICABILITY

The present invention relates to the freshness deterioration suppressing material for myoglobin-containing food, the food package containing the suppressing material and the method for storing or transporting the food package, for suppressing the freshness deterioration, such as discoloration, foul smell and texture deterioration, and for suppressing the amount of drip from myoglobin-containing food items.

All publications, patents and patent applications cited herein shall be incorporated per se by references in the specification.

The invention claimed is:

1. A myoglobin-containing food freshness deterioration suppressing material for suppressing freshness deterioration of a myoglobin-containing food, comprising:
   a substrate comprising a polymer; and
   a layer of an antioxidant,
   the antioxidant comprising a polyphenol compound or ascorbic acid; wherein
   the layer of the antioxidant covers at least a part of the surface of the substrate;
   the material comprises 0.01 g/m$^2$ or more and 20 g/m$^2$ or less of the antioxidant relative to the area of the part of the surface of the substrate covered by the layer of the antioxidant and
   at least the part of the surface of the substrate covered with the layer of the antioxidant is formed by a layer of at least one resin selected from the group consisting of a polyester-based resin, a polyamide-based resin, a polyolefin-based resin, and a polyvinyl-based resin.

2. A myoglobin-containing food freshness deterioration suppressing material for suppressing freshness deterioration of a myoglobin-containing food, comprising:
   a substrate comprising a polymer; and
   a layer of an antioxidant; wherein
   the layer of the antioxidant covers at least a part of the surface of the substrate;
   the antioxidant comprises a polyphenol compound or ascorbic acid;
   at least the part of the surface of the substrate covered by the layer of the antioxidant is formed by a layer of at least one resin selected from the group consisting of a polyester-based resin, a polyamide-based resin, a polyolefin-based resin, and a polyvinyl-based resin; and
   at least one of the following conditions is satisfied:
   (I) the antioxidant comprises 0.92 mg/m$^2$ or more and 1840 mg/m$^2$ or less of rosmarinic acid relative to the area of the part of the surface of the substrate covered by the layer of the antioxidant;
   (II) the antioxidant comprises 1.2 mg/m$^2$ or more and 2400 mg/m$^2$ or less of carnosol relative to the area of the part of the surface of the substrate covered by the layer of the antioxidant;
   (III) the antioxidant comprises 0.74 mg/m$^2$ or more and 1480 mg/m$^2$ or less of carnosic acid relative to the area of the part of the surface of the substrate covered by the layer of the antioxidant; and
   (IV) the antioxidant comprises 0.01 g/m$^2$ or more and 20 g/m$^2$ or less of ascorbic acid relative to the area of the part of the surface of the substrate covered by the layer of the antioxidant.

3. The myoglobin-containing food freshness deterioration suppressing material according to claim 1, wherein the antioxidant comprises a rosemary extract and/or a tea extract comprising a polyphenol compound.

4. The myoglobin-containing food freshness deterioration suppressing material according to claim 2, wherein the antioxidant comprises a rosemary extract and/or a tea extract comprising a polyphenol compound.

5. The myoglobin-containing food freshness deterioration suppressing material according to claim 3, wherein the antioxidant comprises a water-soluble rosemary extract comprising a polyphenol compound.

6. The myoglobin-containing food freshness deterioration suppressing material according to claim 4, wherein the antioxidant comprises a water-soluble rosemary extract comprising a polyphenol compound.

7. The myoglobin-containing food freshness deterioration suppressing material according to claim 1, wherein when the mass of the antioxidant per square meter area of the part in which the antioxidant is present, of the surface of the substrate, is defined as T, and
   one plate- or film-shaped sample piece of a square 5 cm on a side, of the myoglobin-containing food freshness deterioration suppressing material, is immersed in a volume of 1000 mL of distilled water at a temperature of 4° C.,
   the following characteristics are exhibited:
   a mass of 0.05 T or more per square meter area of the part, of the antioxidant, is eluted from the substrate into the distilled water at 10 seconds after the start of immersion, and
   a mass of 0.15 T or more per square meter area of the part, of the antioxidant, is eluted from the substrate into the distilled water 30 minutes after the start of immersion.

8. The myoglobin-containing food freshness deterioration suppressing material according to claim 2, wherein when the mass of the antioxidant per square meter area of the part in which the antioxidant is present, of the surface of the substrate, is defined as T, and
   one plate- or film-shaped sample piece of a square 5 cm on a side, of the myoglobin-containing food freshness deterioration suppressing material, is immersed in a volume of 1000 mL of distilled water at a temperature of 4° C.,
   the following characteristics are exhibited:
   a mass of 0.05 T or more per square meter area of the part, of the antioxidant, is eluted from the substrate into the distilled water at 10 seconds after the start of immersion, and
   a mass of 0.15 T or more per square meter area of the part, of the antioxidant, is eluted from the substrate into the distilled water 30 minutes after the start of immersion.

9. A food package comprising at least:
   the myoglobin-containing food freshness deterioration suppressing material according to claim 1;
   a packaging material; and
   a myoglobin-containing food; wherein
   the myoglobin-containing food freshness deterioration suppressing material and the myoglobin-containing food are packaged by the packaging material so that at least a portion of the surface of the substrate covered with the layer of the antioxidant contacts at least a part of a surface of the myoglobin-containing food.

10. A food package comprising at least:
    the myoglobin-containing food freshness deterioration suppressing material according to claim 2;
    a packaging material; and
    a myoglobin-containing food; wherein
    the myoglobin-containing food freshness deterioration suppressing material and the myoglobin-containing food are packaged by the packaging material so that at least a portion of the surface of the substrate covered with the layer of the antioxidant contacts at least a part of a surface of the myoglobin-containing food.

11. A food package comprising at least:
a packaging material comprising the myoglobin-containing food freshness deterioration suppressing material according to claim 1; and
a myoglobin-containing food; wherein
the myoglobin-containing food is packaged by the packaging material so that at least a portion of the surface of the substrate covered with the layer of the antioxidant contacts at least a part of a surface of the myoglobin-containing food.

12. A food package comprising at least:
a packaging material comprising the myoglobin-containing food freshness deterioration suppressing material according to claim 2; and
a myoglobin-containing food; wherein
the myoglobin-containing food is packaged by the packaging material so that at least a portion of the surface of the substrate covered with the layer of the antioxidant contacts at least a part of a surface of the myoglobin-containing food.

13. A food package comprising at least:
a packaging material comprising the myoglobin-containing food freshness deterioration suppressing material according to claim 1;
an additional myoglobin-containing food freshness deterioration suppressing material according to claim 1; and
a myoglobin-containing food; wherein
the myoglobin-containing food freshness deterioration suppressing material and the myoglobin-containing food are packaged by the packaging material so that at least a portion of the surface of the substrate covered with the layer of the antioxidant contacts at least a part of a surface of the myoglobin-containing food, and
the additional myoglobin-containing food freshness deterioration suppressing material and the myoglobin-containing food are packaged by the packaging material so that at least a portion of the surface of the substrate covered with the antioxidant contacts at least a part of a surface of the myoglobin-containing food.

14. A food package comprising at least:
a packaging material comprising the myoglobin-containing food freshness deterioration suppressing material according to claim 2;
an additional myoglobin-containing food freshness deterioration suppressing material according to claim 2; and
a myoglobin-containing food; wherein
the myoglobin-containing food freshness deterioration suppressing material and the myoglobin-containing food are packaged by the packaging material so that at least a portion of the surface of the substrate covered with the antioxidant contacts at least a part of a surface of the myoglobin-containing food, and
the additional myoglobin-containing food freshness deterioration suppressing material and the myoglobin-containing food are packaged by the packaging material so that at least a portion of the surface of the substrate covered with the antioxidant contacts at least a part of a surface of the myoglobin-containing food.

15. The food package according to claim 9, wherein the myoglobin-containing food is fish meat containing myoglobin.

16. The food package according to claim 10, wherein the myoglobin-containing food is fish meat containing myoglobin.

17. The food package according to claim 11, wherein the myoglobin-containing food is fish meat containing myoglobin.

18. The food package according to claim 12, wherein the myoglobin-containing food is fish meat containing myoglobin.

19. The food package according to claim 13, wherein the myoglobin-containing food is fish meat containing myoglobin.

20. The food package according to claim 14, wherein the myoglobin-containing food is fish meat containing myoglobin.

21. The food package according to claim 15, wherein the fish meat is meat of fish belonging to the family Carangidae.

22. The food package according to claim 16, wherein the fish meat is meat of fish belonging to the family Carangidae.

23. The food package according to claim 17, wherein the fish meat is meat of fish belonging to the family Carangidae.

24. The food package according to claim 18, wherein the fish meat is meat of fish belonging to the family Carangidae.

25. The food package according to claim 19, wherein the fish meat is meat of fish belonging to the family Carangidae.

26. The food package according to claim 20, wherein the fish meat is meat of fish belonging to the family Carangidae.

27. The food package according to claim 15, wherein
the fish meat is a fillet whose surface is partially covered with skin, loin whose surface is partially covered with skin, loin from which skin is stripped, or a slice of fish, and
the packaging is made in the packaging material so that at least a portion of the surface of the substrate covered with the layer of the antioxidant of the myoglobin-containing food freshness deterioration suppressing material comprised in the packaging material and/or the myoglobin-containing food freshness deterioration suppressing material separate from the packaging material, are/is in contacts at least a part of the surface covered with skin of the fillet, at least a part of the surface covered with skin of the loin whose surface is partially covered with skin, at least a part of the surface from which skin is stripped of the loin from which skin is stripped, or at least a part of the surface of the slice of fish.

28. The food package according to claim 16, wherein
the fish meat is a fillet whose surface is partially covered with skin, loin whose surface is partially covered with skin, loin from which skin is stripped, or a slice of fish, and
the packaging is made in the packaging material so that at least a portion of the surface of the substrate covered with the layer of the antioxidant of the myoglobin-containing food freshness deterioration suppressing material comprised in the packaging material and/or the myoglobin-containing food freshness deterioration suppressing material separate from the packaging material contacts at least a part of the surface covered with skin of the fillet, at least a part of the surface covered with skin of the loin whose surface is partially covered with skin, at least a part of the surface from which skin is stripped of the loin from which skin is stripped, or at least a part of the surface of the slice of fish.

29. The food package according to claim 17, wherein
the fish meat is a fillet whose surface is partially covered with skin, loin whose surface is partially covered with skin, loin from which skin is stripped, or a slice of fish, and
the packaging is made in the packaging material so that at least a portion of the surface of the substrate covered with the layer of the antioxidant of the myoglobin-containing food freshness deterioration suppressing material comprised in the packaging material and/or the myoglobin-containing food freshness deterioration suppressing material separate from the packaging material contacts at least a part of the surface covered with skin of the fillet, at least a part of the surface covered with skin of the loin whose surface is partially covered with skin, at least a part of the surface from which skin is stripped of the loin from which skin is stripped, or at least a part of the surface of the slice of fish.

30. The food package according to claim 18, wherein
the fish meat is a fillet whose surface is partially covered with skin, loin whose surface is partially covered with skin, loin from which skin is stripped, or a slice of fish, and
the packaging is made in the packaging material so that at least a portion of the surface of the substrate covered with the antioxidant of the myoglobin-containing food freshness deterioration suppressing material comprised in the packaging material and/or the myoglobin-containing food freshness deterioration suppressing material separate from the packaging material contacts at least a part of the surface covered with skin of the fillet, at least a part of the surface covered with skin of the loin whose surface is partially covered with skin, at least a part of the surface from which skin is stripped of the loin from which skin is stripped, or at least a part of the surface of the slice of fish.

31. The food package according to claim 19, wherein
the fish meat is a fillet whose surface is partially covered with skin, loin whose surface is partially covered with skin, loin from which skin is stripped, or a slice of fish, and
the packaging is made in the packaging material so that at least a portion of the surface of the substrate covered with the antioxidant of the myoglobin-containing food freshness deterioration suppressing material comprised in the packaging material and/or the myoglobin-containing food freshness deterioration suppressing material separate from the packaging material, are/is in contacts at least a part of the surface covered with skin of the fillet, at least a part of the surface covered with skin of the loin whose surface is partially covered with skin, at least a part of the surface from which skin is stripped of the loin from which skin is stripped, or at least a part of the surface of the slice of fish.

32. The food package according to claim 20, wherein
the fish meat is a fillet whose surface is partially covered with skin, loin whose surface is partially covered with skin, loin from which skin is stripped, or a slice of fish, and
the packaging is made in the packaging material so that at least a portion of the surface of the substrate covered with the antioxidant of the myoglobin-containing food freshness deterioration suppressing material comprised in the packaging material and/or the myoglobin-containing food freshness deterioration suppressing material separate from the packaging material contacts at least a part of the surface covered with skin of the fillet, at least a part of the surface covered with skin of the loin whose surface is partially covered with skin, at least a part of the surface from which skin is stripped of the loin from which skin is stripped, or at least a part of the surface of the slice of fish.

33. A method for preserving and/or transporting the food package according to claim 9, comprising:
a step of preserving and/or transporting the food package under a temperature condition of −30° C. to +10° C.

34. A method for preserving and/or transporting the food package according to claim 10, comprising:
a step of preserving and/or transporting the food package under a temperature condition of −30° C. to +10° C.

35. A method for preserving and/or transporting the food package according to claim 11, comprising:
a step of preserving and/or transporting the food package under a temperature condition of −30° C. to +10° C.

36. A method for preserving and/or transporting the food package according to claim 12, comprising:
a step of preserving and/or transporting the food package under a temperature condition of −30° C. to +10° C.

37. A method for preserving and/or transporting the food package according to claim 13, comprising:
a step of preserving and/or transporting the food package under a temperature condition of −30° C. to +10° C.

38. A method for preserving and/or transporting the food package according to claim 14, comprising:
a step of preserving and/or transporting the food package under a temperature condition of −30° C. to +10° C.

* * * * *